(12) United States Patent
Fujii et al.

(10) Patent No.: US 11,313,526 B2
(45) Date of Patent: Apr. 26, 2022

(54) LIGHTING UNIT AND LIGHTING FIXTURE

(71) Applicant: Mitsubishi Electric Corporation, Tokyo (JP)

(72) Inventors: Yusuke Fujii, Tokyo (JP); Satoru Okagaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/054,175

(22) PCT Filed: Sep. 25, 2018

(86) PCT No.: PCT/JP2018/035349
§ 371 (c)(1),
(2) Date: Nov. 10, 2020

(87) PCT Pub. No.: WO2019/220656
PCT Pub. Date: Nov. 21, 2019

(65) Prior Publication Data
US 2021/0190279 A1    Jun. 24, 2021

(30) Foreign Application Priority Data

May 18, 2018  (JP) .............................. JP2018-096074
Jul. 10, 2018  (JP) .............................. JP2018-130358

(51) Int. Cl.
*F21S 8/00* (2006.01)
*F21V 7/00* (2006.01)
(Continued)

(52) U.S. Cl.
CPC ................. *F21S 8/033* (2013.01); *F21S 2/00* (2013.01); *F21S 8/02* (2013.01); *F21V 7/0008* (2013.01);
(Continued)

(58) Field of Classification Search
CPC .............................. G02B 6/0041; F21S 8/006
See application file for complete search history.

(56) References Cited

U.S. PATENT DOCUMENTS

2008/0186726 A1   8/2008 Okada
2010/0014022 A1   1/2010 Nagata et al.
(Continued)

FOREIGN PATENT DOCUMENTS

JP    2008-186786 A    8/2008
JP    2011-187300 A    9/2011
(Continued)

OTHER PUBLICATIONS

Extended European search report dated May 20, 2021, in corresponding European patent Application No. 18918700.8, 8 pages.
(Continued)

*Primary Examiner* — Alexander K Garlen
(74) *Attorney, Agent, or Firm* — Xsensus LLP

(57) ABSTRACT

A lighting unit includes a first light source to emit first light; and a diffusive body including a first incidence surface that allows the first light to enter, a diffusive part that includes nanoparticles, guides the entered first light and makes the first light be scattered by the nanoparticles into first scattered light, and an emission surface that emits the first scattered light, wherein the first incidence surface is formed on a first edge part of the diffusive body, the first scattered light is emitted from a first region of the emission surface, and a correlated color temperature of the first scattered light is higher than a correlated color temperature of the first light.

20 Claims, 32 Drawing Sheets

(51) Int. Cl.
  *F21S 2/00* (2016.01)
  *F21S 8/02* (2006.01)
  *F21V 8/00* (2006.01)
  *H05B 47/11* (2020.01)

(52) U.S. Cl.
  CPC ......... *G02B 6/0041* (2013.01); *G02B 6/0055* (2013.01); *G02B 6/0068* (2013.01); *H05B 47/11* (2020.01)

(56) References Cited

U.S. PATENT DOCUMENTS

| | | | | |
|---|---|---|---|---|
| 2010/0109576 A1* | 5/2010 | Ijzerman | ............... | G02B 6/0063 315/312 |
| 2011/0194270 A1* | 8/2011 | Di Trapani | ............... | F21V 3/00 362/2 |
| 2012/0306861 A1* | 12/2012 | Minami | ............... | G02B 30/27 345/419 |
| 2014/0133125 A1 | 5/2014 | Di Trapani et al. | | |
| 2015/0316231 A1 | 11/2015 | Di Trapani | | |
| 2016/0062029 A1* | 3/2016 | Hsiao | ............... | G02B 6/0063 362/606 |
| 2016/0109641 A1* | 4/2016 | Yeom | ............... | G02B 6/0065 362/606 |
| 2017/0051893 A1 | 2/2017 | Di Trapani | | |
| 2017/0146204 A1* | 5/2017 | Di Trapani | ............... | G02B 3/0062 |
| 2018/0246270 A1* | 8/2018 | Di Trapani | ............... | G02B 6/0013 |

FOREIGN PATENT DOCUMENTS

| | | |
|---|---|---|
| JP | 2011-228078 A | 11/2011 |
| JP | 2015-207554 A | 11/2015 |
| JP | 2015-535135 A | 12/2015 |
| JP | 2016-514340 A | 5/2016 |
| WO | 2008/038539 A1 | 4/2008 |
| WO | 2009/156347 A1 | 12/2009 |
| WO | 2009/156348 A1 | 12/2009 |
| WO | 2013/008600 A1 | 1/2013 |
| WO | 2015/128201 A1 | 9/2015 |

OTHER PUBLICATIONS

International Search Report and Written Opinion dated Dec. 18, 2018 for PCT/JP2018/035349 filed on Sep. 25, 2018, 7 pages including English Translation of the International Search Report.

* cited by examiner

FIG. 28

| TIME SLOT | LOW COLOR TEMPERATURE WHITE | HIGH COLOR TEMPERATURE WHITE | GREEN | ORANGE |
|---|---|---|---|---|
| EARLY MORNING, NIGHTFALL | △ | ○ | △ | △ |
| DAYTIME | ○ | ○ | ○ | × |
| NIGHT | △ | ○ | △ | × |

FIG. 29

| TIME SLOT | LOW COLOR TEMPERATURE WHITE | HIGH COLOR TEMPERATURE WHITE | GREEN | ORANGE |
|---|---|---|---|---|
| EARLY MORNING, NIGHTFALL | △ | ○ | △ | ○ |
| DAYTIME | ○ | ○ | ○ | × |
| NIGHT | △ | ○ | △ | × |

FIG. 30

| TIME SLOT | LOW COLOR TEMPATURE WHITE | | HIGH COLOR TEMPATURE WHITE | | GREEN | | ORANGE | |
|---|---|---|---|---|---|---|---|---|
| | 10a | 10b | 10a | 10b | 10a | 10b | 10a | 10b |
| EARLY MORNING, NIGHTFALL | △ | △ | ○ | ○ | × | × | △ | △ |
| DAYTIME | ○ | ○ | ○ | ○ | ○ | ○ | × | × |
| NIGHT | △ | △ | ○ | ○ | △ | △ | × | × |

FIG. 31

| TIME SLOT | LOW COLOR TEMPATURE. WHITE | | HIGH COLOR TEMPATURE WHITE | | GREEN | | ORANGE | |
|---|---|---|---|---|---|---|---|---|
| | 10a | 10b | 10a | 10b | 10a | 10b | 10a | 10b |
| EARLY MORNING, NIGHTFALL | △ | △ | ○ | △ | × | × | × | ○ |
| DAYTIME | ○ | ○ | ○ | ○ | ○ | ○ | × | × |
| NIGHT | △ | △ | ○ | ○ | △ | △ | × | × |

LIGHTING UNIT AND LIGHTING FIXTURE

CROSS-REFERENCE TO RELATED APPLICATIONS

The present application is based on PCT filing PCT/JP2018/035349, filed Sep. 25, 2018, which claims priority to JP 2018-096074, filed May 18, 2018, and JP 2018-130358, filed Jul. 10, 2018, the entire contents of each are incorporated herein by reference. This application is related to U.S. patent application Ser. No. 17/432,097, entitled LIGHTING DEVICE, WINDOW WITH A LIGHTING FUNCTION, AND BUILDING PRODUCT FOR A WINDOW, filed on Aug. 19, 2021, and is hereby incorporated by reference.

TECHNICAL FIELD

The present invention relates to a lighting unit and a lighting fixture.

BACKGROUND ART

For example, a lighting system 1 described in Patent Reference 1 includes a screen structure 14 and a lamp shade structure 10 having a base body 12. The base body 12 includes a diffuse light generation body 20. The diffuse light generation body 20 works as a Rayleigh diffuser, absorbs substantially no light in the visible light region, and more efficiently diffuses colliding light at shorter wavelengths compared to long wavelength components. A first light source 2 and the lamp shade structure 10 are arranged in a camera obscure 16.

PRIOR ART REFERENCE

Patent Reference

Patent Reference 1: Japanese Patent Application Publication No. 2015-207554

SUMMARY OF THE INVENTION

Problem to be Solved by the Invention

However, in the lighting system 1 described in the Patent Reference 1, the first light source 2 for emitting light having strong directivity is arranged at a position deviated from the center of the diffuse light generation body 20 in a vertical direction and a horizontal direction and irradiates a top surface of the diffuse light generation body 20 with the light overall at an angle of approximately 60 degrees (this angle is referred to as a principal ray direction). Accordingly, the thickness of the lighting fixture increases.

Means for Solving the Problem

A lighting unit according to the present invention includes: a first light source to emit first light; and a diffusive body including a first incidence surface that allows the first light to enter, a diffusive part that includes nanoparticles, guides the entered first light and makes the first light be scattered by the nanoparticles into first scattered light, and an emission surface that emits the first scattered light, wherein the first incidence surface is formed on a first edge part of the diffusive body, the first scattered light is emitted from a first region of the emission surface, and a correlated color temperature of the first scattered light is higher than a correlated color temperature of the first light.

A lighting unit according to the present invention includes: a first light source to emit first light; and a diffusive body including a first incidence surface that allows the first light to enter, a diffusive part that includes nanoparticles, guides the entered first light and makes the first light be scattered by the nanoparticles into first scattered light, and a first reflecting surface that reflects the first light guided without being scattered by the nanoparticles into first reflected light. The first incidence surface is formed on a first edge part of the diffusive body. The first reflecting surface is formed in a second edge part where the first light guided through the diffusive part reaches. The first scattered light is emitted from a first emission region. The first reflected light is emitted from a second emission region different from the first emission region. A correlated color temperature of the first scattered light is higher than

Effect of the Invention

The present invention realizes thinning of the lighting unit. a correlated color temperature of the first light.

BRIEF DESCRIPTION OF THE DRAWINGS

FIG. 28 is a configuration diagram showing a configuration of a lighting fixture according to a modification 9.

FIG. 29 is a configuration diagram showing a configuration of a lighting fixture according to the modification 9.

FIG. 30 is a configuration diagram showing a configuration of a lighting fixture according to a modification 10.

FIG. 31 is a configuration diagram showing a configuration of a lighting fixture according to the modification 10.

MODE FOR CARRYING OUT THE INVENTION

Figure 1:
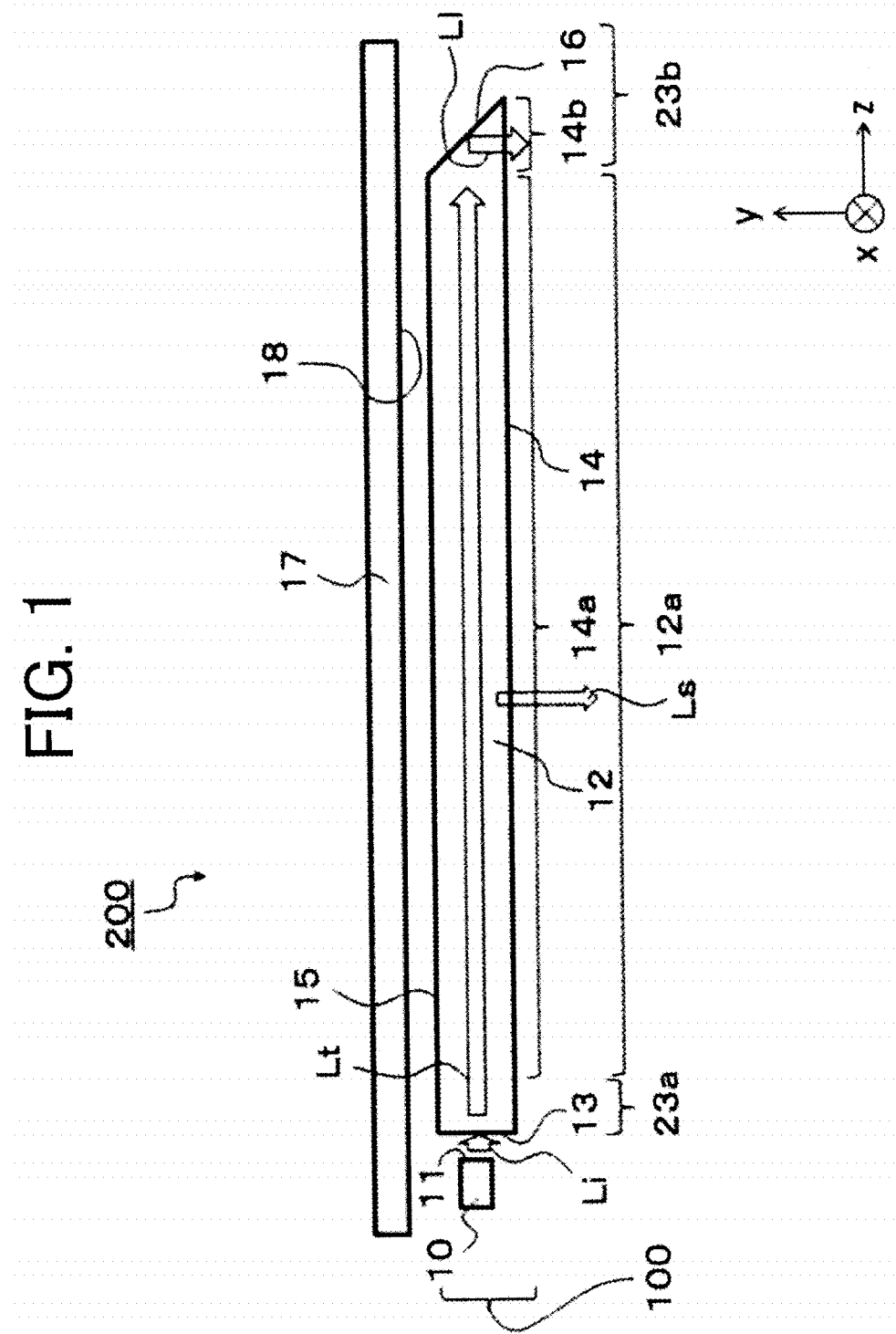
FIG. 1 is a configuration diagram showing a configuration of a lighting fixture according to a first embodiment.

In the Patent Reference 1, a lighting system including a light source and a lamp shade structure is described. The light source provides non-diffuse light having directivity and a first correlated color temperature. The lamp shade structure includes a base body and a screen structure. The base body is irradiated from one side with the light from the light source. The screen structure is placed on a side opposite to the irradiated side of the base body. The base body includes a diffuse light generation body that generates diffuse light having a second correlated color temperature higher than the first correlated color temperature. The diffuse light generation body allows at least part of non-diffuse light having directivity of rays to pass through. The screen structure has a side wall having a light scattering surface that is spatially inclined. The light scattering surface is irradiated with at least part of partially divergent rays when the light source is in operation and thereby provides an irradiation screen serving the function of a scattered light source. The lighting system further includes a non-irradiation screen that is not directly irradiated with the partially divergent rays, and a shadow/light transition line is formed between the non-irradiation screen and the irradiation screen when the lighting system is in operation.

In a lighting fixture described in the following embodiment, diffuse light Ls is emitted from, a region 14a of an emission surface 14. Illuminating light Ll is emitted from a region 14b of the emission surface 14. The region 14b is a region different from the region 14a. The region 14b is, for example, a region in an edge part 23b on a +z-axis side of the emission surface 14. The region 14b is a region on the emission surface 14. Further, the region 14b faces a reflecting surface 16. The diffuse light Ls is referred to also as light Ls. The illuminating light is referred to also as reflected light Ll. Further, the illuminating light Ll is referred to also as light Ll.

The regions 14a and 14b are emission regions that emit light.

As above, the region 14a from which the diffuse light Ls is emitted and the region 14b from which the illuminating light Ll is emitted are divided from each other in a lighting unit 100 and a lighting fixture 200. This makes it possible to secure the region 14a simulating a blue sky irrespective of the form of the lighting fixture 200.

For example, when the region 14a simulating a blue sky and the region 14b simulating sunlight are not divided from each other, securing the region 14a simulating a blue sky becomes difficult due to influence of light simulating sunlight. This difficulty increases especially in small-sized lighting fixtures. In contrast, in the lighting fixture 200, the region 14a simulating a blue sky can be secured with no influence of the illuminating light Ll even in cases where the lighting fixture 200 is a small-sized lighting fixture. Further, even when the lighting fixture 200 is in a long and thin rectangular shape, the region 14a simulating a blue sky can be secured with no influence of the illuminating light Ll.

Incidentally, a region from, which both the diffuse light Ls and the illuminating light Ll are emitted may exist between the region 14a and the region 14b. The illuminating light Ll is the light simulating sunlight.

As above, a low-profile lighting fixture 200 emitting the diffuse light Ls simulating a blue sky and the illuminating light Ll simulating sunlight can be realized. Further, a low-profile lighting unit 100 can be realized.

A diffusive body 12 is in a plate-like shape, for example. The diffusive body 12 is in a plate-like shape having two surfaces facing each other and connected to each other by a side face, for example. The region 14a is formed on one surface of the plate-like shape of the diffusive body 12, for example. The region 14b is formed on the surface of the plate-like shape of the diffusive body 12 on which the region 14a is formed, for example. Further, a back surface 15 is formed on the other surface of the plate-like shape of the diffusive body 12, for example.

Incidentally, the region 14a and the region 14b do not have to be on the same surface. There can be a step or the like between the region 14a and the region 14b. Specifically, the plate-like shape has a stem on one surface. The region 14b is formed on the side of the surface of the plate-like shape of the diffusive body 12 on which the region 14a is formed, for example.

The plate-like shape is not limited to a flat plate shape. The plate-like shape can also be a curved shape. For example, the plate-like shape can be a shape obtained by cutting out a surface of a spherical shape into a plate-like shape. For example, the plate-like shape can be a shape obtained by cutting out a side face of a cylindrical shape into a plate-like shape. For example, the plate-like shape can be a shape obtained by cutting out a side face of a barrel shape into a plate-like shape. The side face of the body of a barrel is in a cylinder-like shape having a swollen central part.

Alternatively, the diffusive body 12 is in a bar-like shape, for example. The bar is a generic name for columnar bodies. A columnar body has a shape obtained by connecting two base surfaces with a side face. The region 14a is formed on the side face of the bar-like shape of the diffusive body 12, for example. The region 14b is formed on the face of the bar-like shape of the diffusive body 12 on which the region 14a is formed, for example. The region 14b is formed on the side of the face of the bar-like shape of the diffusive body 12 on which the region 14a is formed, for example.

(Description of Coordinates in Drawings)

In each embodiment described below, coordinate axes of an xyz orthogonal coordinate system are shown in each drawing to facilitate the description.

A z-axis is parallel to an optical axis of a light source 10. A +z-axis direction is a direction in which the light source 10 emits light Li.

A y-axis is parallel to a direction in which the lighting fixture 200 emits the light Ls and Ll. The y-axis is in a vertical direction of the lighting fixture 200. A −y-axis direction is the direction in which the lighting fixture 200 emits the light Ls and Ll.

An x-axis is orthogonal to a yz plane.

First Embodiment

A first embodiment will be described below with reference to FIG. 1 to FIG. 9. In the drawings referred to below, the reduction scale of dimensions can be varied among components.

(Configuration of Lighting Fixture 200)

Figure 2:
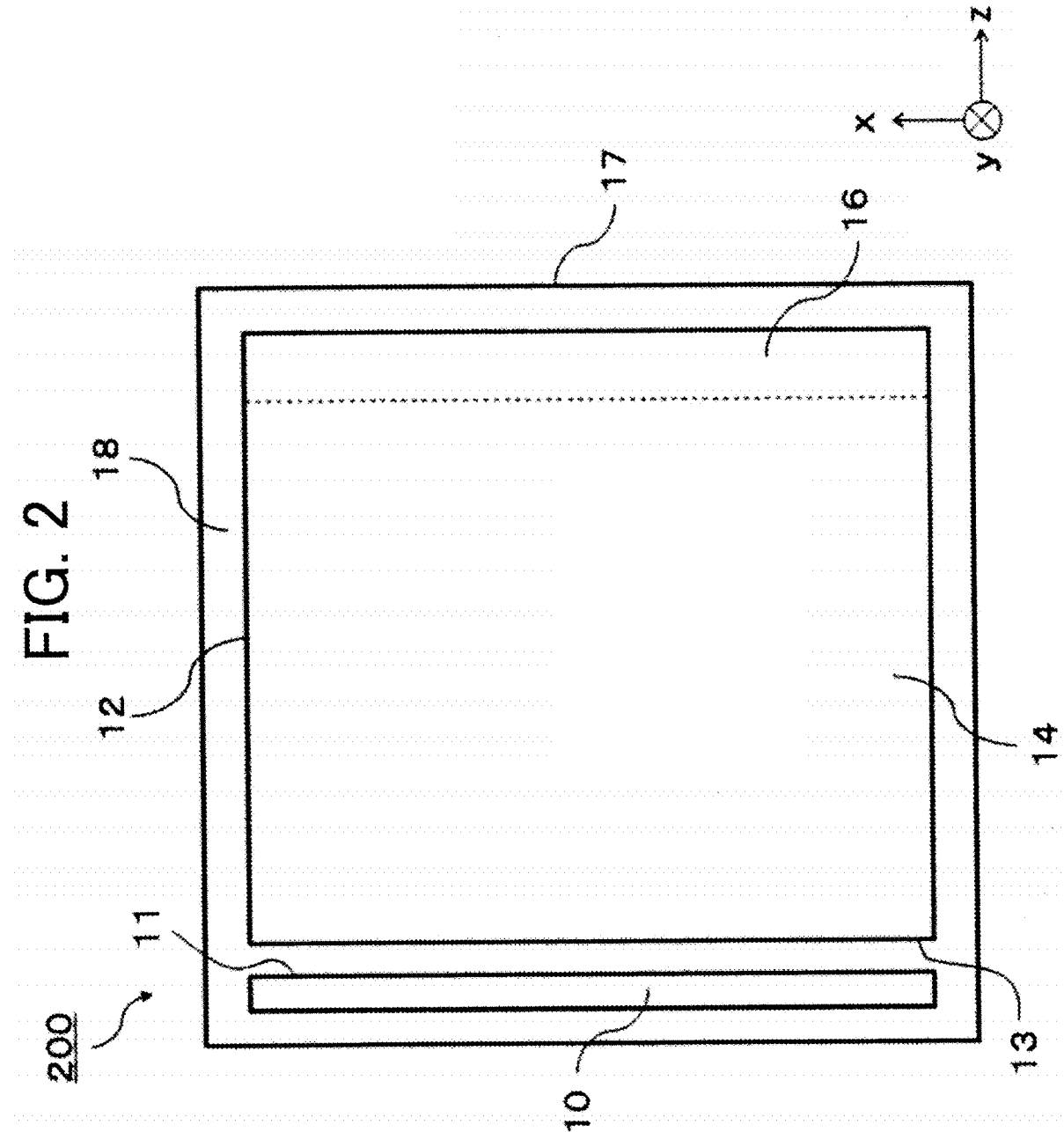
FIG. 2 is a configuration diagram showing the configuration of the lighting fixture according to the first embodiment.

The configuration of the lighting fixture 200 will be described below with reference to FIG. 1 and FIG. 2. FIG. 1 is a configuration diagram showing a schematic configuration of the lighting fixture 200 according to the first embodiment. FIG. 2 is a configuration diagram showing a schematic configuration of the lighting fixture 200 according to the first embodiment.

The lighting fixture 200 includes the light source 10 and the diffusive body 12. The lighting fixture 200 can include a light absorber 17. Further, the lighting unit 100 includes the light source 10 and the diffusive body 12. The lighting unit 100 is formed with the light source 10 and the diffusive body 12 at a pair.

((Light Source 10))

Figure 3:
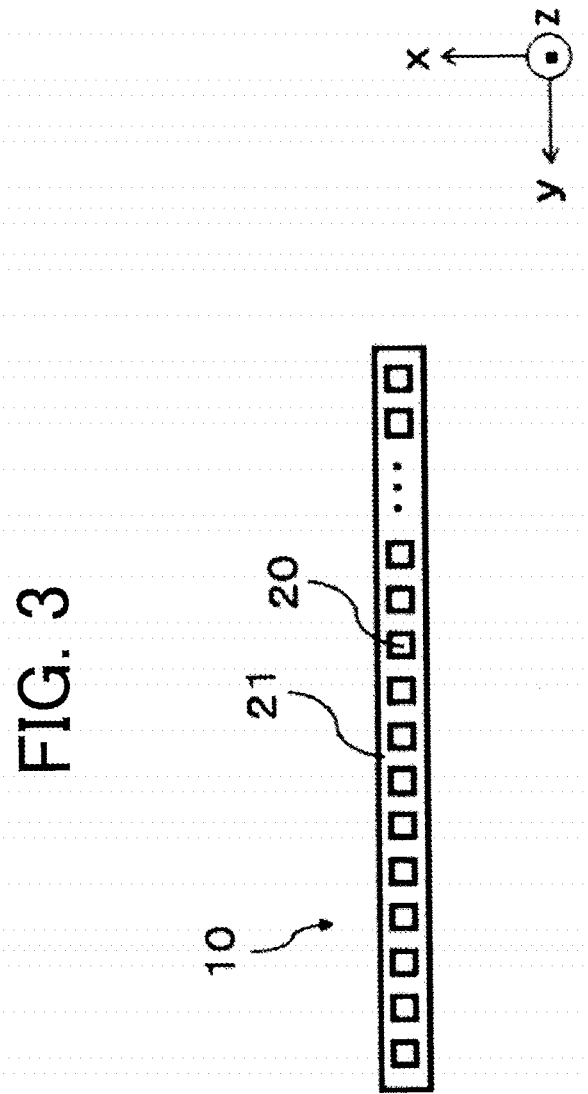
FIG. 3 is a configuration diagram showing an example of a light source according to the first embodiment.

FIG. 3 is a configuration diagram showing a schematic configuration of the light source 10 according to the first embodiment.

The light source 10 generates the light Li. The light source 10 emits the light Li. The light source 10 emits light of white color, for example. The light source 10 is a light source that generates the light Li at a first correlated color temperature. The first correlated color temperature is 6500 K, for example. The "correlated color temperature" means the color temperature of black body radiation that looks the closest to the color of the illuminant.

Incidentally, in the description of the embodiment, terms like "first" and "second" are used for the purpose of facilitating the description. Thus, there is no problem even if the description is given by using "first" and "second" replaced with each other, for example.

The light source 10 is an LED light source, for example. In the light source 10, a plurality of LED elements 20 is arrayed on a substrate 21, for example. The plurality of LED elements 20 is arrayed in the y-axis direction, for example. The color temperature of light generated by each LED element 20 is the same as each other, for example. The color temperature of the light generated by each LED element 20 may also differ from each other. The light generated by the LED elements 20 may be in three colors of red, green and blue. The LED element 20 is an example of a light-emitting element.

The light source 10 may also be configured to include one LED element 20, for example. In this case, the LED element 20 is handled equally to the light source 10. Then, a plurality of light sources 10 is arrayed.

Further, in consideration of ZEB (Zero Energy Building), it is also possible to implement the light source 10 by Guiding external light (sunlight) or the like. For guiding the external light, an optical fiber, a light Guide body or the like can be used. In this case, an end face of the optical fiber emitting light serves as a light emission surface 11, for example.

"ZEB" means a building that reduces the annual usage of primary energy to zero or to a level infinitesimally close to zero. The primary energy means an energy source directly obtained from nature, such as fossil fuel or solar heat. Electricity or town gas obtained by processing such energy source is referred co as secondary energy.

The color of the light Li emitted from the light source 10 may also be color other than white color. For example, the light source 10 can include a white LED and a green-based LED. An example in which the light emitted from the light source 10 includes light of white color, light of green color and light of orange color will be described later.

The light source 10 has the light emission surface 11 for emitting the light Li. The light emission surface 11 is arranged to face an incidence surface 13 of the diffusive body 12, for example. The light source 10 is arranged along the incidence surface 13 of the diffusive body 12, for example. For example, a plurality of light sources 10 is arranged along the incidence surface 13 of the diffusive body 12. For example, a plurality of LED elements 20 is arranged along the incidence surface 13 of the diffusive body 12.

((Diffusive Body 12))

Figure 4:
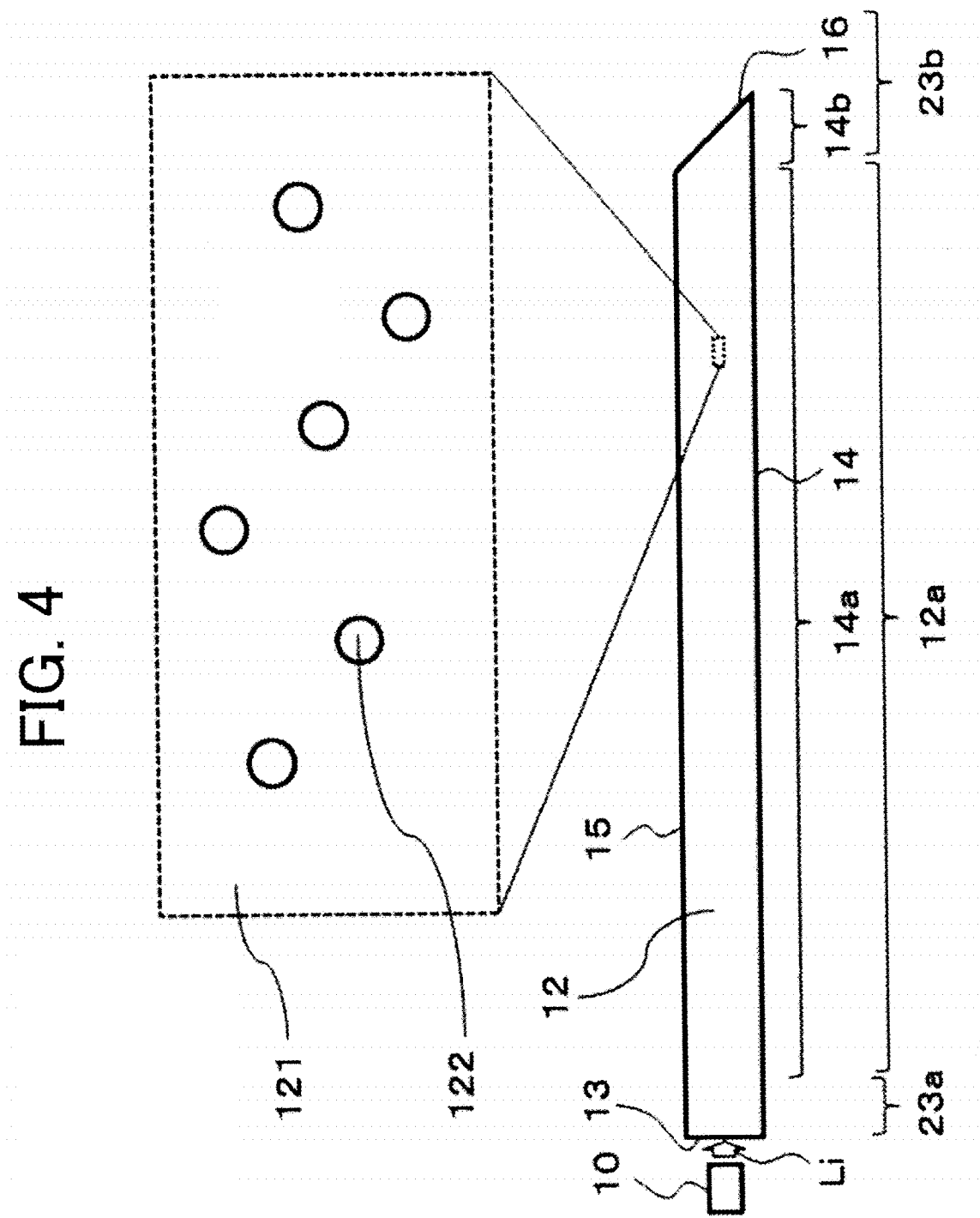
FIG. 4 is a configuration diagram showing a configuration of a diffusive body according to the first embodiment.

FIG. 4 is a diagram for explaining the diffusive body 12 according to the first embodiment.

The diffusive body 12 has the incidence surface 13, the emission surface 14 and the reflecting surface 16. The diffusive body 12 can have the back surface 15. The diffusive body 12 is in a plate-like shape, for example. Alternatively, the diffusive body 12 is in a bar-like shape, for example. The light Li emitted by the light source 10 enters the diffusive body 12. The diffusive body 12 guides the entered light Li.

The diffusive body 12 includes a diffusive part 12a. The diffusive part 12a includes nanoparticles as particles 122. The diffusive part 12a guides the entered light Lt and makes the light Lt be scattered by the particles 122 to change the light Lt into scattered light Ls. An emission region 14a is formed in the diffusive part 12a. The light Lt is the light Li being guided in the diffusive body 12. The emission region 14a is referred to also as the region 14a.

The incidence surface 13 allows the light Li to enter. The incidence surface 13 allows the light Li emitted by the light source 10 to enter. The incidence surface 13 is arranged to face the light emission surface 11 of the light source 10. The diffusive body 12 is arranged on the +z-axis side of the light source 10.

The incidence surface 13 is formed on an edge part 23a of the diffusive part 12a. The incidence surface 13 is formed on the edge part 23a on the −z-axis side of the diffusive body 12. The edge part 23a includes a side face of the plate-like shape of the diffusive body 12, for example. In cases where the diffusive body 12 is in a bar-like shape, the edge part 23a includes a base surface of the bar-like shape.

The emission surface 14 emits the light Ls scattered by the particles 122. The emission surface 14 emits the light Lt that has been Guided in the diffusive body 12. The emission surface 14 emits reflected light Ll reflected from the reflecting surface 16. The emission surface 14 is formed on the −y-axis side of the diffusive body 12. The emission surface 14 is arranged in parallel with a zx plane, for example. The emission surface 14 is formed on one surface of the plate-like shape of the diffusive body 12.

The back surface 15 faces the emission surface 14. The back surface 15 is formed on the +y-axis side of the diffusive body 12. The back surface 15 is arranged in parallel with the zx plane, for example. The light Lt that entered the diffusive body 12 is guided in the diffusive body 12 while being reflected by the emission surface 14 and the back surface 15. The light Lt that entered the diffusive body 12 is guided by means of reflection, for example. The light Lt is guided by means of reflection. The reflection mentioned here is total reflection, for example.

The reflecting surface 16 reflects the light Lt that has been guided in the diffusive body 12. The reflecting surface 16 reflects the light Lt in the −y-axis direction. The reflecting surface 16 is inclined to be pointed towards the emission surface 14 side, for example.

The reflecting surface 16 is formed in at least one edge part of the diffusive body 12 excluding the incidence surface 13. The edge part includes an end face of the diffusive body 12. The reflecting surface 16 is formed in the edge part 23b of the diffusive body 12. The reflecting surface 16 is formed in the edge part 23b on the +z-axis side of the diffusive body 12. In the first embodiment, the reflecting surface 16 is provided only in the edge part 23b opposing the incidence surface 13 for the sake of simplicity. The edge part 23b includes the reflecting surface 16. However, the reflecting surface 16 can also be provided in an edge part other than the edge part 23b opposing the incidence surface 13.

The edge part 23b is a part where the light Lt guided through the diffusive part 12a reaches. The region 14b is formed in the edge part 23b. The edge part 23b includes the region 14b.

The reflecting surface 16 is formed in the edge part 23b. The reflecting surface 16 is formed in the edge part 23b where the light Lt guided through the diffusive part 12a reaches. The reflecting surface 16 reflects the light Lt guided without being scattered by the particles 122 into the reflected light Ll.

The edge part 23b includes a side face of the plate-like shape of the diffusive body 12, for example. In cases where the diffusive body 12 is in a bar-like shape, the edge part 23b includes a base surface of the bar-like shape.

The reflecting surface 16 is a diffusive reflecting surface, for example. The diffusive reflecting surface is obtained by white color painting, for example. In the first embodiment, the reflecting surface 16 is a diffusive reflecting surface, for example. However, the reflecting surface 16 is not limited to a diffusive reflecting surface but can also be a mirror surface or a total reflection surface.

The diffusive body 12 includes a base material 121 and the particles 122.

The particles 122 are particles on the order of nanometers. The particles 122 are particles whose grain diameter is on the order of nanometers. Namely, the particles 122 are nanoparticles. The "nanoparticles" are particles having size on the order of nanometers [nm]. The nanoparticles generally mean particles that are 1 nm to some hundred nm in size.

The particle 122 can have a spherical shape or a different shape. Preferably, the grain diameter of the particles 122 is in a range from 60 nm to 150 nm. Namely, the grain diameter of the particles 122 is preferably larger than or equal to 60 nm and smaller than or equal to 150 nm.

The particles 122 are inorganic oxide, for example. The inorganic oxide is ZnO, $TiO_2$, $SiO_2$, $Al_2O_3$ or the like.

The base material 121 contains the particles 122. The particles 122 have been added to the base material 121. The base material 121 is material that allows light to pass through.

The base material 121 is solid matter, for example. The base material 121 is formed of, for example, resin film using a thermoplastic polymer, thermosetting resin, photopolymerization resin or the like. As the resin film, it is possible to use an acrylic polymer, an olefinic polymer, a vinyl-based polymer, a cellulosic polymer, an amide-based polymer, a fluoric polymer, an urethane-based polymer, a silicone-based polymer, an imide-based polymer or the like.

The base material 121 is liquid, for example. The base material 121 is liquid that allows light to pass through. The base material 121 can be water. The liquid has been filled into a container. The base material 121 can be gel-like material. The gel-like material has been filled into a container. The container is formed of material that allows light to pass through. The container filled with liquid or gel-like material is formed of material that allows light to pass through. The container is formed by using an acrylic polymer as the material, for example.

((Light Absorber 17))

The light absorber 17 absorbs light. The light absorber has the property of absorbing light. The light absorber 17 is black in color, for example. The light absorber 17 is obtained by painting with black color, for example.

The light absorber 17 is arranged to face the back surface 15 of the diffusive body 12. The light absorber 17 is arranged on the +y side with respect to the diffusive body 12. The light absorber 17 is arranged on a side opposite to the region 14a with respect to the diffusive body 12. The light absorber 17 is arranged on the back surface 15 side with respect to the diffusive body 12. The light absorber 17 absorbs light emerging from the back surface 15 of the diffusive body 12. The light absorber 17 inhibits the light emerging from the back surface 15 of the diffusive body 12 from being emitted from the emission surface 14. The light emerging from the back surface 15 includes the light Lt. The light emerging from the back surface 15 includes the light Ls.

(Effect of Lighting Fixture 200)

((Rayleigh Scattering))

Figure 5:
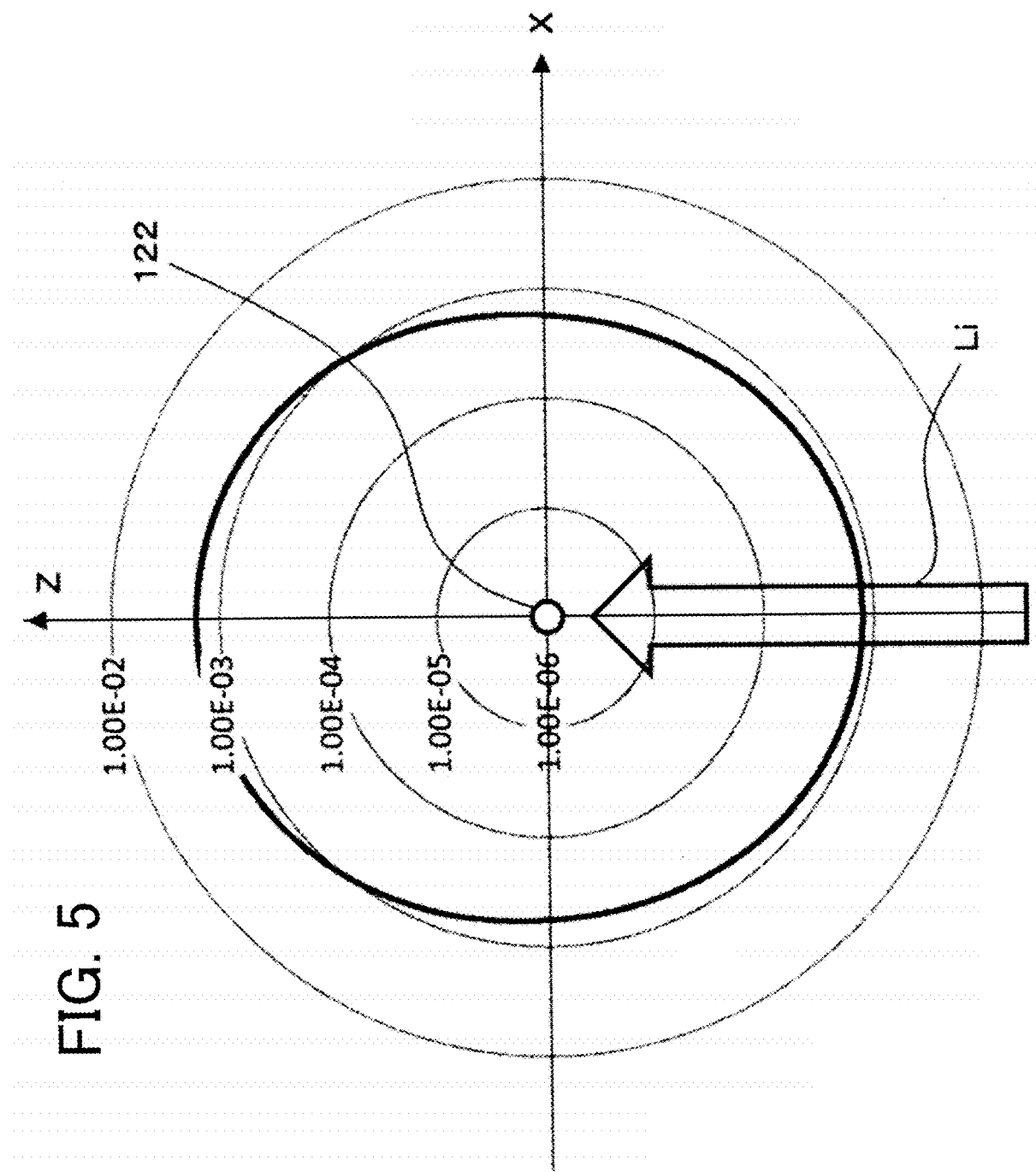
FIG. 5 is an explanatory diagram showing an example of scattered light intensity angular distribution of Rayleigh scattering by a single particle according to the first embodiment.

Rayleigh scattering as one of scattering phenomena of light will be explained below with reference to FIG. 5. FIG. 5 is a diagram showing an example of an intensity angular distribution of scattered light of Rayleigh scattering by a single particle 122 according to the first embodiment.

In the explanation, the light colliding with the particle 122 is assumed to be the light Li emitted from the light source 10, for example. The light colliding with the particle 122 may also be the light Lt guided in the diffusive body 12. The vertical axis Z is an axis parallel to the traveling direction of the light Li. The light Li is traveling in the +Z-axis direction. The horizontal axis X is an axis orthogonal to the vertical axis Z.

When the grain diameter of the particle is smaller than the wavelength of visible light, Rayleigh scattering occurs upon collision of a ray with the particle. The wavelength of the visible light is in a range from 380 nm to 780 nm, for example. Specifically, Rayleigh scattering occurs when a size parameter α represented by the grain diameter d of the particle and the wavelength λ of the light satisfies the following expression (1):

$$\alpha \ll \frac{\pi \cdot d}{\lambda} \tag{1}$$

where "·" denotes multiplication.

In Rayleigh scattering, a scattering cross section σ is represented by the following expression (2) by using the grain diameter d, the wavelength λ of the light and a relative refractive index m: The relative refractive index m is represented by the ratio $(n_{122}/n_{121})$ of the refractive index $n_{122}$ of the particle 122 to the refractive index $n_{121}$ of the base material 121. The scattering cross section σ is a parameter indicating the probability of occurrence of scattering.

$$\sigma = \frac{8\pi}{3} \cdot \frac{d^6}{\lambda^4} \cdot \frac{(m^2-1)^2}{(m^2+2)^2} \quad (2)$$

According to the expression (2), the scattering cross section σ in Rayleigh scattering is inversely proportional to the fourth power of the wavelength λ of the light. Thus, in Rayleigh scattering, the probability of scattering increases with the decrease in the wavelength of the light. For example, when a ray is incident upon a particle of constant grain diameter d and refractive index n, the probability of scattering of blue light is approximately four times higher than that of red light. The wavelength λ of the blue light is 450 nm, for example. The wavelength λ of the red light is 650 nm, for example.

FIG. 5 shows an intensity distribution of unpolarized scattered light. The grain diameter d of the particle 100 nm. The particle refractive index n is 1.43. The refractive index of the base material is 1.33. The wavelength X of the light is 450 nm.

As shown in FIG. 5, the scattered light in Rayleigh scattering radiates in all directions. Accordingly, even when light enters the diffusive body 12 through an end face of the diffusive body 12, the light can be extracted through the emission surface 14 orthogonal to the end face. In the first embodiment, this end face is the incidence surface 13.

((Generation of Scattered Light Simulating Blue Sky))

Figure 6:
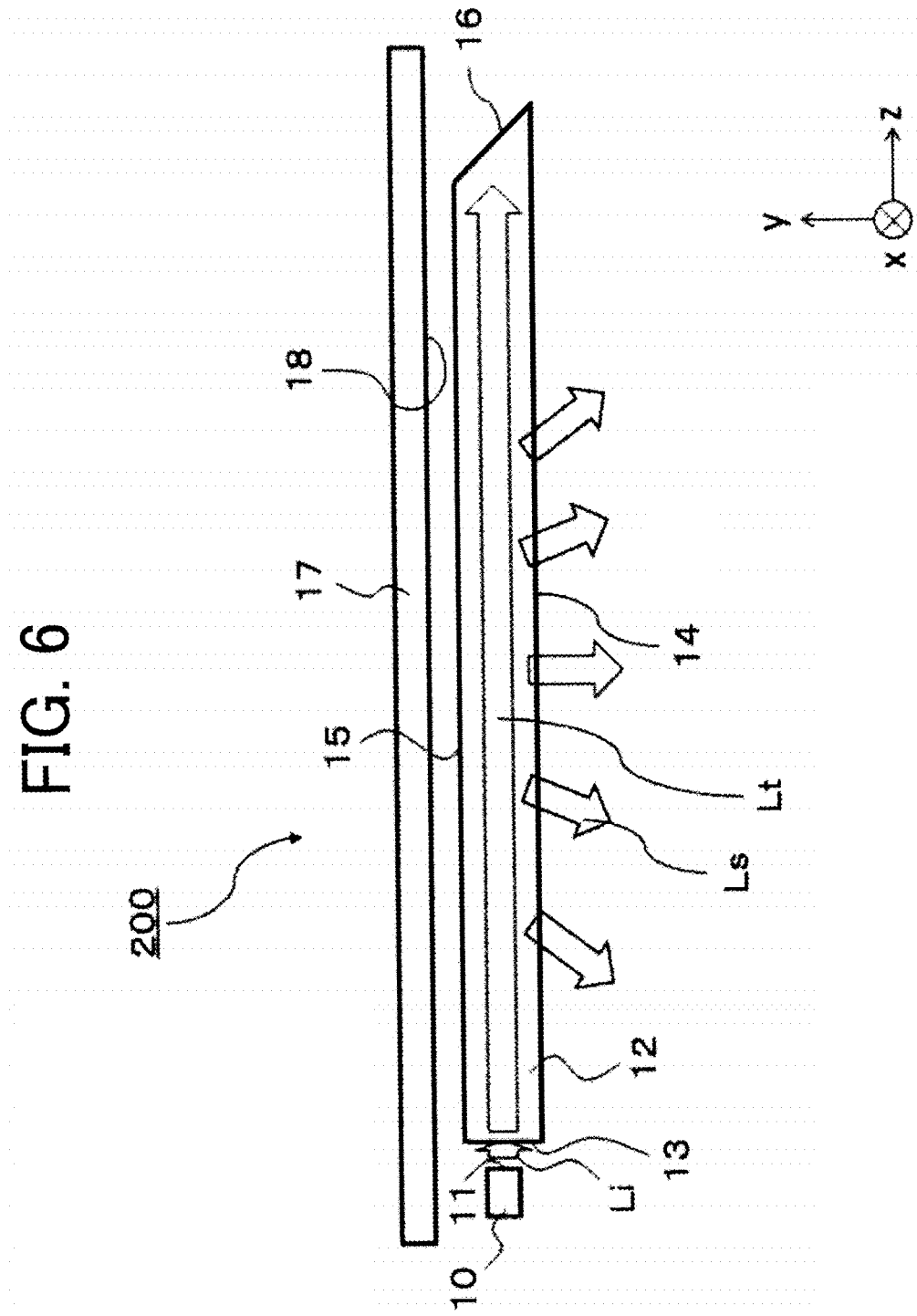
FIG. 6 is a diagram showing a generation principle of diffuse light simulating a blue sky in the diffusive body according to the first embodiment.

A generation principle of the scattered light simulating a blue sky will be described below with reference to FIG. 6. FIG. 6 is a diagram for explaining the generation principle of the diffuse light simulating a blue sky in the diffusive body 12 according to the first embodiment.

As shown in FIG. 6, the light Li emitted from the light source 10 enters the diffusive body 12 through the incidence surface 13. The light Li that entered through the incidence surface 13 is guided in the diffusive body 12 as the light Lt. Part of the light Lt collides with a particle 122. The light Lt colliding with the particle 122 is scattered in all directions.

In the scattered light, light incident upon the emission surface 14 at an incidence angle less than a critical angle is emitted from the emission surface 14 as the diffuse light Ls. The critical angle is the minimum incidence angle at which the total reflection occurs when light heads for a place where the refractive index is low from a place where the refractive index is high.

Here, according to the expression (2), in Rayleigh scattering, the probability of scattering increases with the decrease in the wavelength of the light. Accordingly, the correlated color temperature of the scattered light Ls becomes higher than the correlated color temperature of the light Li emitted from the light source 10. For example, the first correlated color temperature is the correlated color temperature of the light Li emitted from the light source 10. For example, a second correlated color temperature is the correlated color temperature of the scattered light Ls.

The correlated color temperature of the scattered light Ls is higher than the correlated color temperature of the light Li. Further, as mentioned earlier, "first" and "second" are terms that are tentatively attached for the purpose of describing the embodiment.

In cases where the light Li has spectral distribution throughout the whole range of visible light, light of blue color is scattered preferentially. The light Li is white light, for example. The light source 10 includes a white LED, for example. Therefore, appropriately designing the light source 10 and the diffusive body 12 enables the diffuse light Ls to have the same correlated color temperature as a real blue sky.

Further, the scattered light of Rayleigh scattering radiates in all directions. Accordingly, the scattered light Ls is emitted also from the back surface 15. Light incident upon the back surface 15 at an incidence angle less than the critical angle is emitted from the back surface 15. The light emitted from, the back surface 15 is absorbed by the light absorber 17. The light emitted from, the back surface 15 is absorbed by a light absorption surface 18. The light absorption surface 18 is provided on the light absorber 17.

Due to the absorption of the light emitted from the back surface 15 to the back side of the diffusive body 12, an observer viewing the lighting fixture 200 feels that the depth of the diffusive body 12 is extended to infinity. Then, the observer has the feeling of looking up to a real blue sky. The lighting fixture 200 generates the diffuse light Ls simulating a blue sky as described above.

For example, if light that has traveled to the back surface 15 side is reflected and emitted from the emission surface 14, the observer can see the structure on the back surface 15 side of the lighting fixture 200. By providing the light absorber 17, the structure on the back surface 15 side of the lighting fixture 200 can be made hard to see.

Further, if external light enters the diffusive body 12 through the emission surface 14 and is reflected on the back surface 15 side, for example, the external light and the scattered light Ls are superimposed together and emitted from the emission surface 14. In this case, the blue color of the scattered light Ls changes. This makes the simulation of a blue sky difficult. The light absorber 17 is capable of reducing the discoloration of the scattered light Ls.

Incidentally, when the lighting fixture 200 is used in an environment where no external light enters, the light absorber 17 can be left out By using a light reflector 50 which will be described later instead of the light absorber 17, the light amount of the scattered light Ls can be increased. Here, the external light is sunlight or the like.

For example, the emission surface 14 side with respect to the diffusive body 12 will be referred to as a front side. Further, the back surface 15 side with respect to the diffusive body 12 will be referred to as a back side.

((Generation of Illuminating Light Simulating Sunlight))

Figure 7:
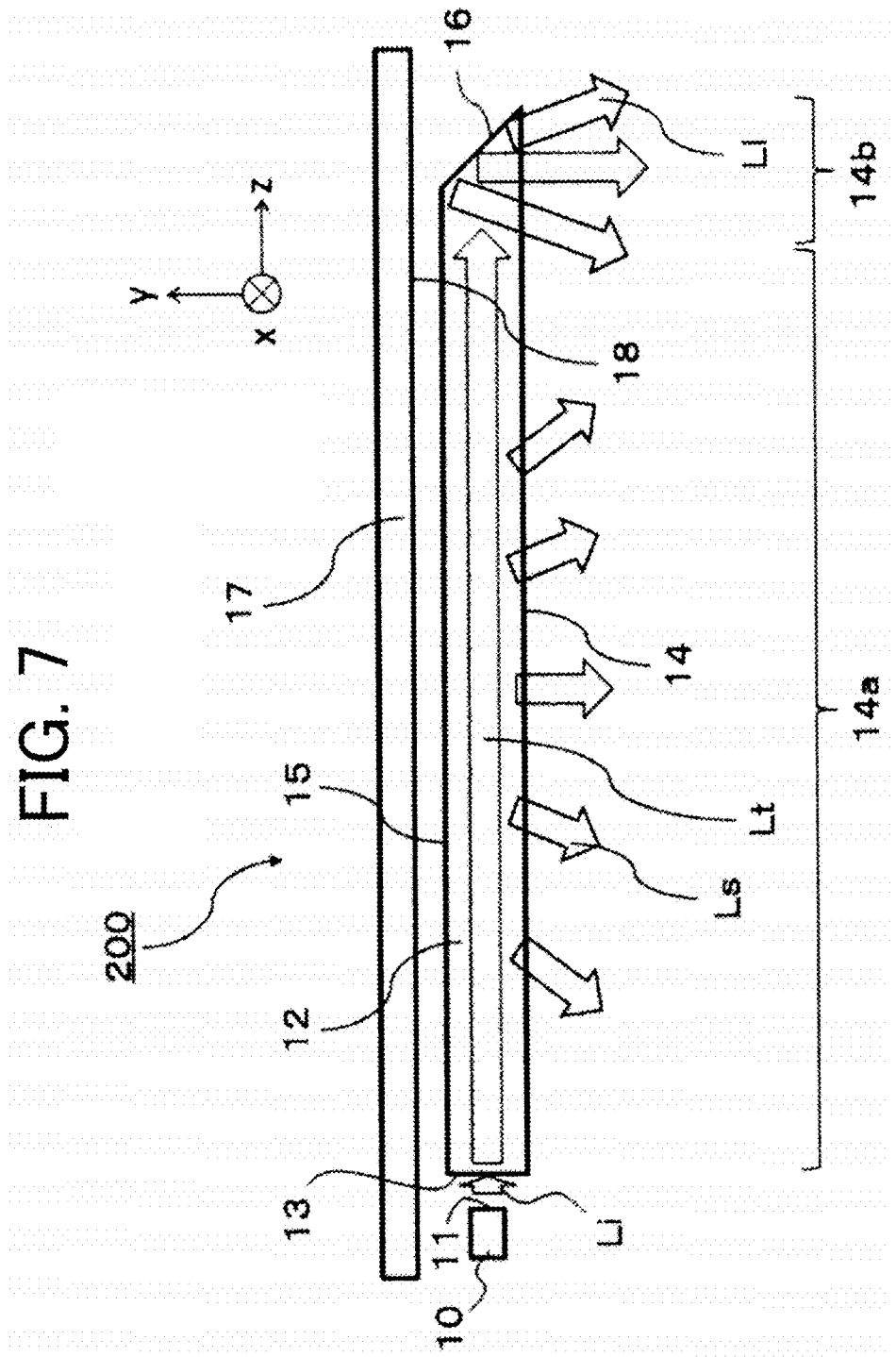
FIG. 7 is a diagram for explaining a generation principle of illuminating light simulating sunlight in the diffusive body according to the first embodiment.

FIG. 7 is a diagram for explaining a generation principle of the illuminating light simulating sunlight in the diffusive body 12 according to the first embodiment.

As shown in FIG. 7, the light Li emitted from the light source 10 enters the diffusive body 12 through the incidence surface 13. Part of the light Li that entered the diffusive body 12 is not scattered by the particles 122. The light not scattered by the particles 122 is the light Lt. The light Lt is referred to also as propagating light.

The propagating light Lt travels in the diffusive body 12. The propagating light Lt travels in the +z-axis direction in the diffusive body 12. Then, the propagating light Lt reaches the reflecting surface 16. The reflecting surface 16 is provided at the end face on the +z-axis side of the diffusive body 12.

The propagating light Lt reaching the reflecting surface 16 is reflected by the reflecting surface 16. The reflection occurring here is diffusive reflection, for example. In this case, the reflecting surface 16 functions as a diffuse light source that emits the illuminating light Ll. The reflected light Ll is referred to also as the illuminating light.

In the propagating light Lt reaching the reflecting surface 16, short-wavelength light has attenuated further compared to long-wavelength light. This is because short-wavelength light has been preferentially scattered by Rayleigh scattering. Accordingly, the correlated color temperature of the illuminating light Ll becomes lower than the correlated color temperature of the light Li emitted from the light source 10. For example, a third correlated color temperature is the correlated color temperature of the illuminating light Ll. In cases where the light Li has spectral distribution throughout the whole range of visible light, the color temperature of the illuminating light Ll becomes the same correlated color temperature as that of sunlight. The lighting fixture 200 generates the illuminating light Ll simulating sunlight as described above.

In cases where the illuminating light Ll is sufficiently brighter than the diffuse light Ls, the reflecting surface 16 is perceived like the frame of a skylight irradiated with sunlight. Then, the illuminating light Ll provides the lighting fixture 200 with a natural impression.

For example, the correlated color temperature of the light source 10 is changed dynamically. Accordingly, the correlated color temperature of the diffuse light Ls and the correlated color temperature of the illuminating light Li change dynamically. For example, the light amount of the light source 10 is changed dynamically. Accordingly, the light amount of the diffuse light Ls and the light amount of the illuminating light Ll change dynamically. Appropriately changing the correlated color temperature and the light amount of the light source 10 as above lets the observer feel that the color of the sky and the color of the rays of the sun are changing with time. Then, generating the circadian rhythm becomes possible.

The "circadian rhythm" is a physiological phenomenon that changes at periods of approximately 24 hours. The circadian rhythm exists in most living things such as animals and plants. The circadian rhythm is generally referred to as a "biological clock". In a strict sense, the circadian rhythm is formed internally. However, the circadian rhythm is modified by stimulation from the external world such as light, temperature or meals.

(Modification 1)

Figure 8:
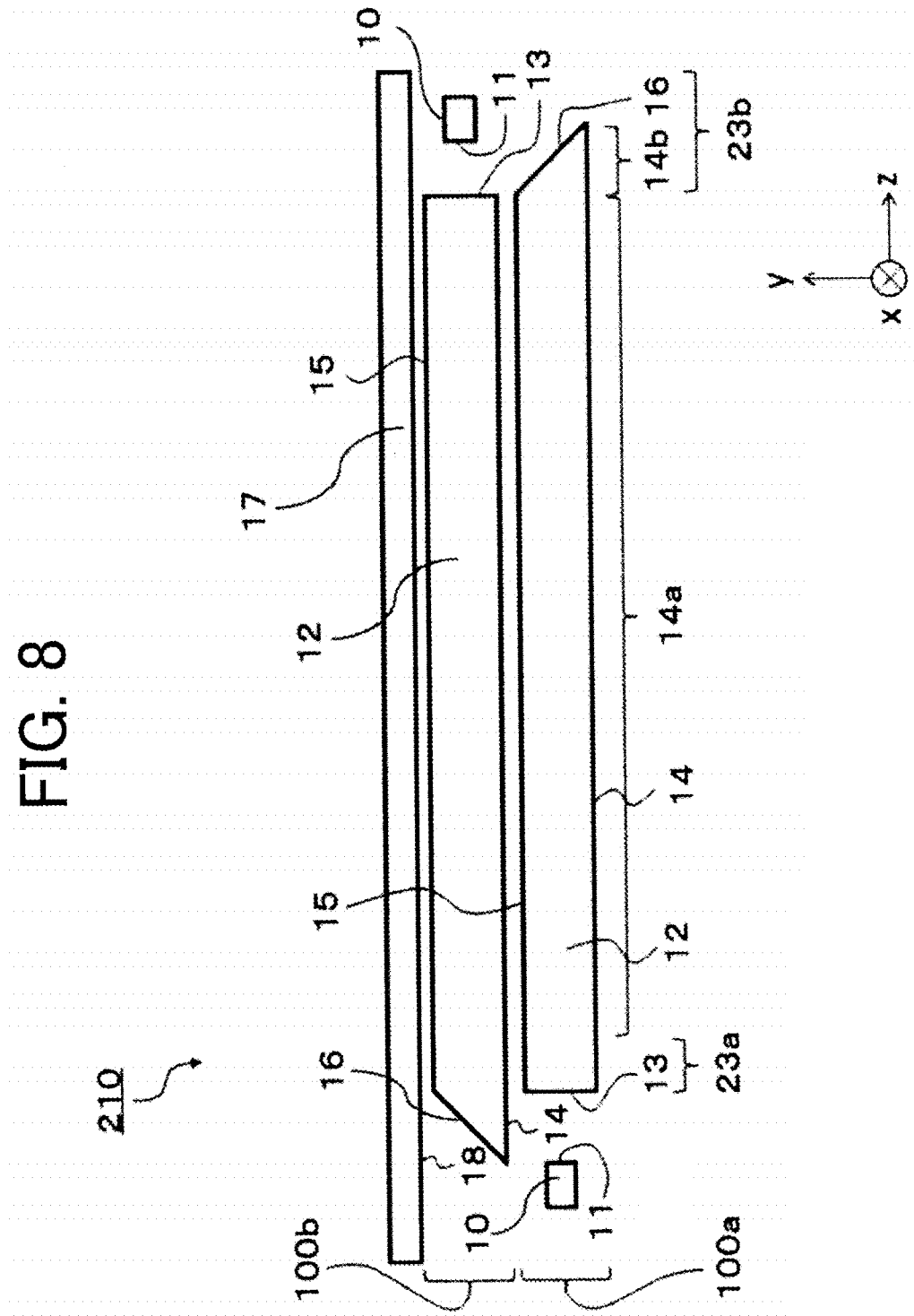
FIG. 8 is a configuration diagram showing a configuration of a lighting fixture according to a modification 1.
Figure 9:
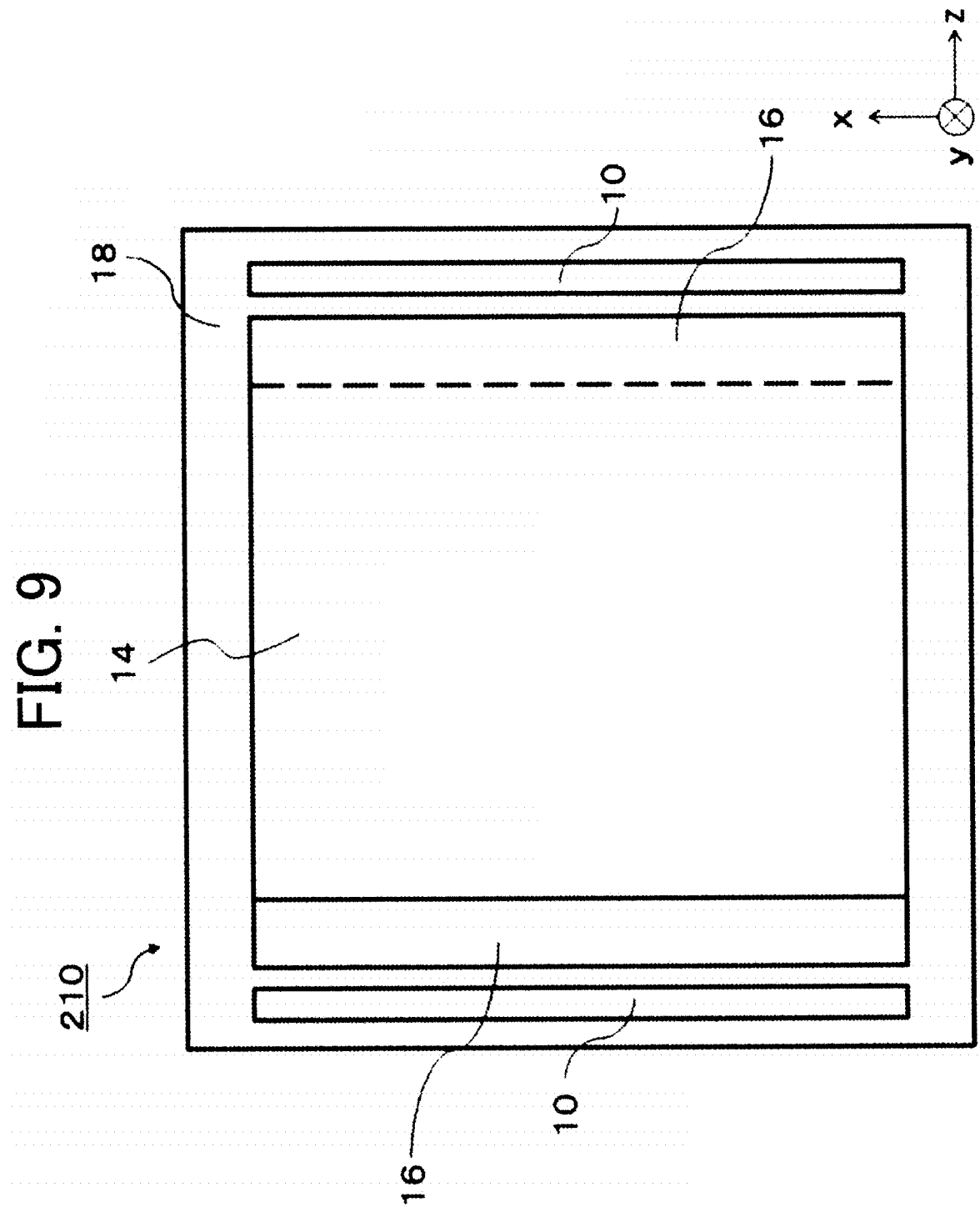
FIG. 9 is a configuration diagram showing the configuration of the lighting fixture according to the modification 1.

A modification 1 will be described below with reference to FIG. 8 and FIG. 9. FIG. 8 is a configuration diagram showing a schematic configuration of a lighting fixture 210 according to the modification 1. FIG. 9 is a configuration diagram showing a schematic configuration of the lighting fixture 210 according to the modification 1.

In the lighting fixture 210 according to the modification 1, each component common to the lighting fixture 200 is assigned the same reference character as in the lighting fixture 200 and repeated explanation thereof is omitted.

The lighting fixture 210 includes two lighting units 100. The two lighting units 100 are overlaid on each other. The two lighting units 100 are overlaid on each other in the y-axis direction. A lighting unit 100a is arranged on the −y-axis side of the lighting fixture 210. A lighting unit 100b is arranged on the +y-axis side of the lighting fixture 210.

The lighting unit 100a is arranged on the −y-axis side of the lighting unit 100b. The back surface 15 of the diffusive body 12 of the lighting unit 100a faces the emission surface 14 of the diffusive body 12 of the lighting unit 100b.

The two lighting units 100 are arranged while being rotated from each other by 180° around the y-axis. In the lighting unit 100a, the light source 10 is arranged on the −z-axis side of the diffusive body 12, for example. The reflecting surface 16 is situated on the +z-axis side of the diffusive body 12. In contrast, in the lighting unit 100b, the light source 10 is arranged on the +z-axis side of the diffusive body 12. The reflecting surface 16 is situated on the −z-axis side of the diffusive body 12.

The edge part 23a of the lighting unit 100a and the edge part 23b of the lighting unit 100b are arranged to be on the same side. Further, the edge part 23b of the lighting unit 100a and the edge part 23a of the lighting unit 100b are arranged to be on the same side. The edge part 23a and the edge part 23b of the lighting units 100a and 100b as the pair are arranged to be on the same side.

The light absorber 17 is arranged on the +y-axis side of the lighting unit 100b. The light absorber 17 is arranged on the back side of the lighting unit 100b. For example, the light reflector 50 which will be described later is also arranged on the +y-axis side of the lighting unit 100b. The light reflector 50 is also arranged on the back side of the lighting unit 100b.

The diffuse light Ls emitted from the lighting unit 100b passes through the diffusive body 12 of the lighting unit 100a and is emitted from the emission surface 14 of the lighting unit 100a. The illuminating light Ll emitted from the lighting unit 100b passes between the light source 10 and the diffusive body 12 of the lighting unit 100a and is emitted from the lighting fixture 210, for example.

Incidentally, the illuminating light Ll emitted from the lighting unit 100b may also be emitted from the lighting fixture 210 after passing through the edge part 23a of the diffusive body 12 of the lighting unit 100a.

The lighting units 100a and 100b are arranged with their diffusive bodies 12 overlaid on each other and with their emission regions 14a facing the same direction. The lighting fixture 210 emits the scattered light Ls emitted from the plurality of lighting units 100a and 100b in superimposition with each other.

The lighting fixture 210 is capable of changing the design of the lighting fixture by stacking two lighting units 100. Further, the lighting fixture 210 is capable of increasing the light amount compared to the lighting fixture 200.

(Modification 2)

((Modification 2-1))

Figure 10:
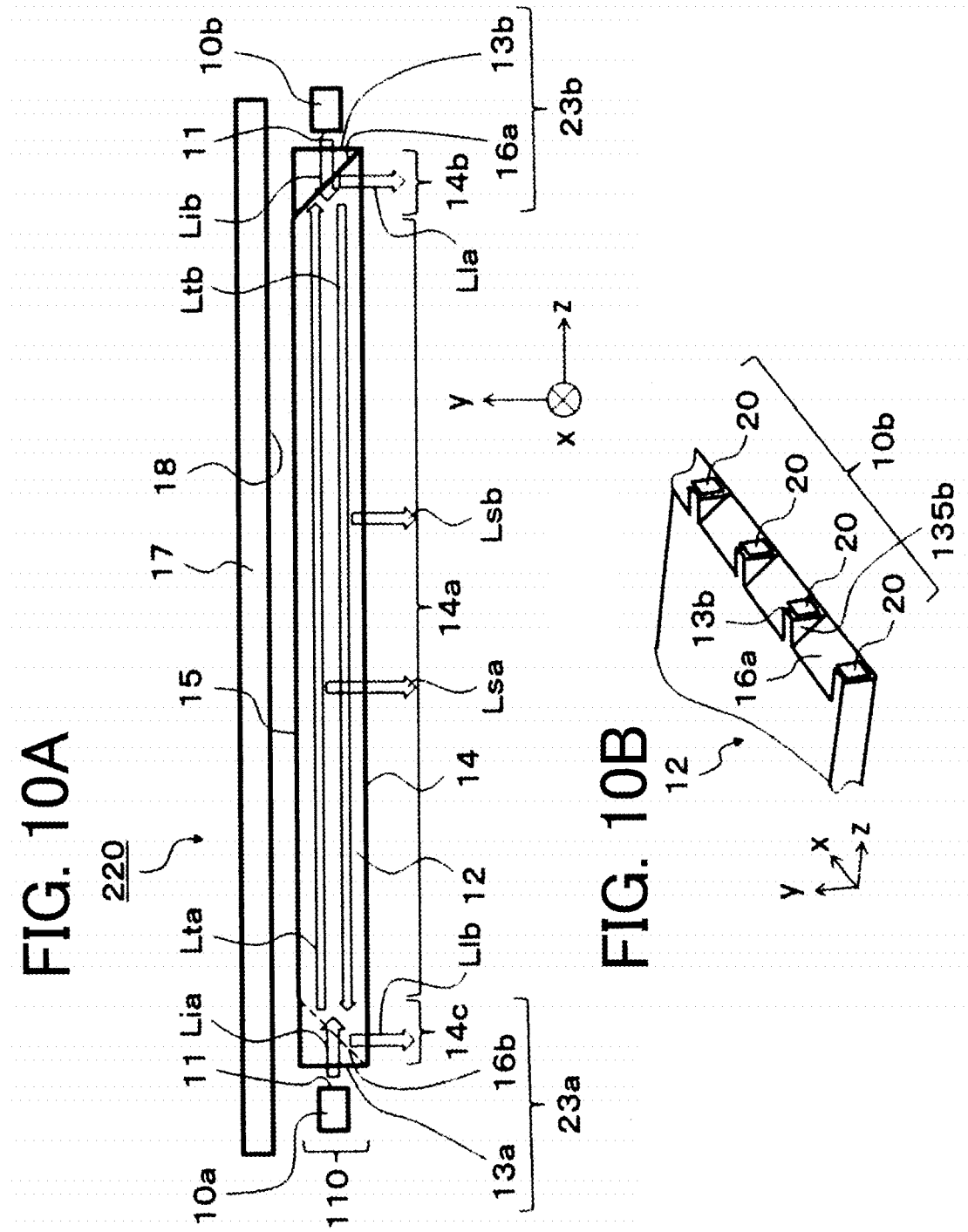
FIGS. 10A and 10B are configuration diagrams showing a configuration of a lighting fixture according to a modification 2.
Figure 11:
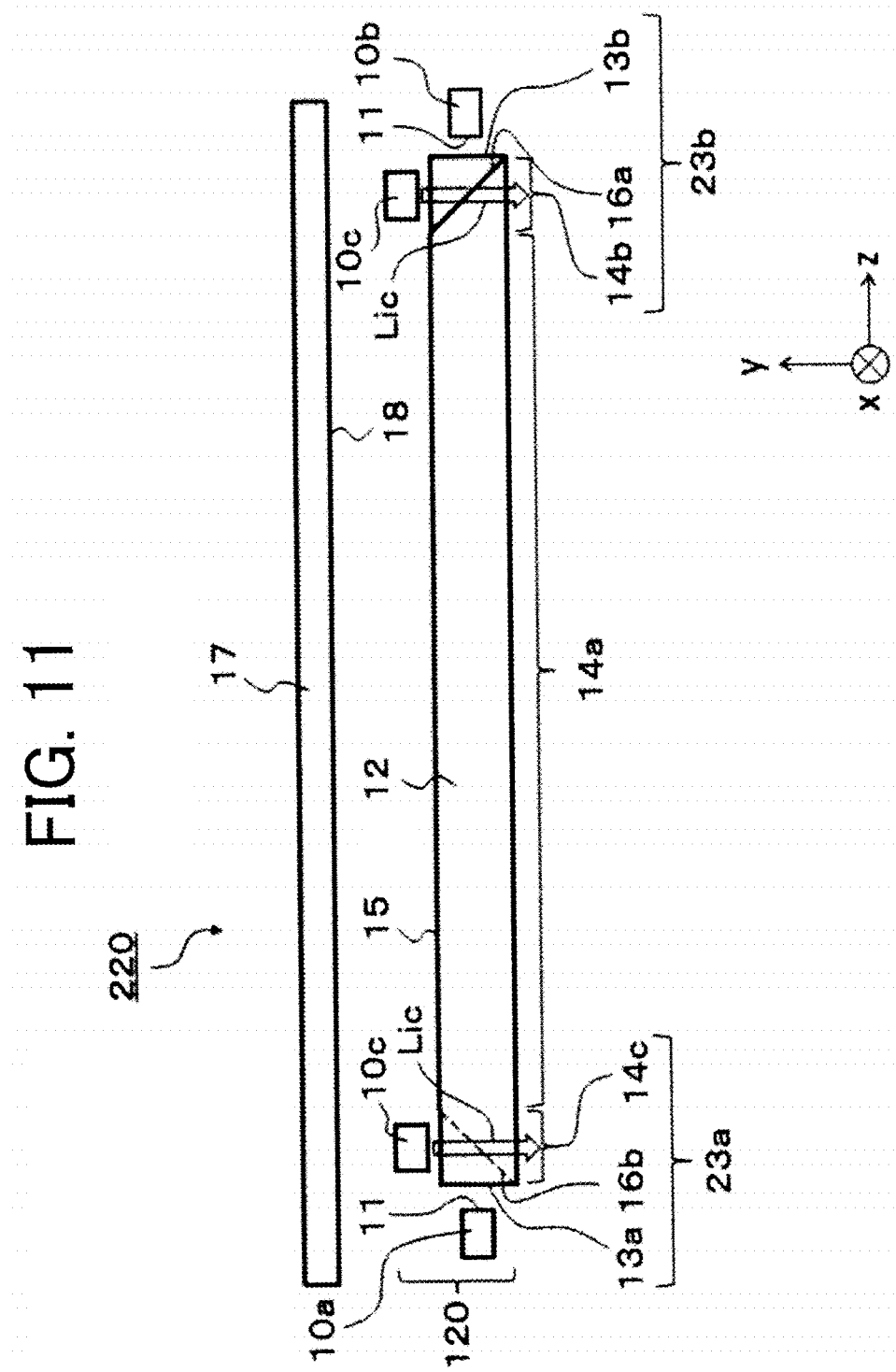
FIG. 11 is a configuration diagram showing a configuration of a lighting fixture according to the modification 2.

A modification 2 will be described below with reference to FIG. 10(A), FIG. 10(B) and FIG. 11. FIG. 10(A) and FIG. 11 are configuration diagrams showing a schematic configuration of a lighting fixture 220 according to the modification 2. FIG. 10(B) is a partial perspective view of the edge part 23b of the diffusive body 12.

In the lighting fixture 220 according to the modification 2, each component common to the lighting fixture 200 or 210 is assigned the same reference character as in the lighting fixture 200 or 210 and repeated explanation thereof is omitted.

Incidentally, to facilitate the description, there are cases in the following description where the edge parts 23a and 23b are described as end faces 23a and 23b, for example.

A light source 10a of the lighting fixture 220 corresponds to the light source 10 of the lighting fixture 200. Light Lia described in regard to the lighting fixture 220 corresponds to the light Li described in regard to the lighting fixture 200. An incidence surface 13a of the lighting fixture 220 corresponds to the incidence surface 13 of the lighting fixture 200. A reflecting surface 16a of the lighting fixture 220 corresponds to the reflecting surface 16 of the lighting fixture 200.

The light source 10a is arranged to face the incidence surface 13a. The light source 10a emits the light Lia. A light source 10b is arranged to face an incidence surface 13b. The light source 10b emits light Lib. The light source 10a and the light, source 10b are light sources having the same structure and performance, for example.

The diffusive body 12 includes the edge part 23a and the edge part 23b. The edge parts 23a and 23b are situated at ends of the diffusive part 12a. As shown in FIG. 10A, in the lighting fixture 220, the edge parts 23a and 23b include end faces of the plate-like shape of the diffusive body 12, for example.

The light Lia emitted from the light source 10a is guided as light Lta. The diffusive part 12a guides the entered light Lta and makes the light Lta be scattered by the particles 122 to change the light Lta into scattered light Lsa. The entered light. Lta is guided by means of total reflection, for example. The scattered light Lsa is emitted from the emission region 14a.

The light Lib emitted from the light source 10b is guided as light Ltb. The diffusive part 12a guides the entered light Ltb and makes the light Ltb be scattered by the particles 122 to change the light Ltb into scattered light Lsb. The entered light Ltb is guided by means of total reflection, for example. The scattered light Lsb is emitted from the emission region 14a.

The edge part 23a is a part where the light Ltb reaches. The edge part 23a is a part where the light Ltb reaches after being guided. The edge part 23b is a part where the light Lta reaches. The edge part 23b is a part where the light Lta reaches after being guided.

The correlated color temperature of the scattered light Lsa is higher than the correlated color temperature of the light Lia. The correlated color temperature of the scattered light Lsb is higher than the correlated color temperature of the light Lib.

The edge part 23a is formed at a position opposing the edge part 23b, for example. The end face of the edge part 23a is formed at a position opposing the end face of the edge part 23b. The diffusive body 12 is in a plate-like shape including the end face of the edge part 23a and the end face of the edge part 23b.

The incidence surface 13a is formed on the edge part 23a. The incidence surface 13a is formed on the end face of the edge part 23a. The incidence surface 13a allows the light Lia to enter.

The incidence surface 13b is formed on the edge part 23b. The incidence surface 13b is formed on the end face of the edge part 23b. The incidence surface 13b allows the light Lib to enter.

The incidence surfaces 13a and 13b are formed integrally with the diffusive part 12a. However, the incidence surfaces 13a and 13b may also be formed of components different from the diffusive part 12a.

The reflecting surface 16a is formed at the end face of the edge part 23b. The reflecting surface 16a is formed in the edge part 23b. The reflecting surface 16a reflects the light Lta. The light Lta is the light Lia guided without being scattered by the particles 122. The light Lta is the light Lia guided in the diffusive part 12a without being scattered by the particles 122. The reflecting surface 16a reflects the guided light Lta. The reflecting surface 16a transforms the light Lta into reflected light Lla.

A reflecting surface 16b is formed at the end face of the edge part 23a. The reflecting surface 16b is formed in the edge part 23a. The reflecting surface 16b reflects the light Ltb. The light Ltb is the light Lib guided without being scattered by the particles 122. The light Ltb is the light Lib guided in the diffusive part 12a without being scattered by the particles 122. The reflecting surface 16b reflects the guided light Ltb. The reflecting surface 16b transforms the light Ltb into reflected light Lib.

The reflecting surface 16a is arranged to oppose the incidence surface 13a. The center of the reflecting surface 16a and the center of the incidence surface 13a are desired to oppose each other. The reflecting surface 16b is arranged to oppose the incidence surface 13b. The center of the reflecting surface 16b and the center of the incidence surface 13b are desired to oppose each other.

The reflecting surfaces 16a and 16b are formed integrally with the diffusive part 12a. In the case where the reflecting surfaces 16a and 16b are formed integrally with the diffusive part 12a, the number of components can be held down. Further, mass productivity can be increased. However, there is a possibility that particles 122 are included between the reflecting surface 16a or 16b and the region 14b or 14c. Namely, there is a possibility that particles 122 are included in the edge part 23a or 23b. In such cases, the light it reaching the reflecting surface 16a or 16b is scattered. Then, the directivity of the light Lt reaching the reflecting surface 16a or 16b decreases. Further, the reflected light Li includes scattered light similarly to the scattered light Lsa or Lsb. Accordingly, emission direction control of the illuminating light Ll emitted from, the region 14b or 14c becomes difficult. Further, there is a possibility that the reflected light Ll is emitted from the region 14a.

The reflecting surfaces 16a and 16b may also be formed of components different from the diffusive part 12a. In this case, the light Lt reaching the reflecting surface 16a or 16b is not scattered. Accordingly, the directivity of the light Lt reaching the reflecting surface 16a or 16b increases. Further, the reflected light Ll does not include scattered light. Accordingly, the emission direction control of the illuminating light Ll emitted from, the region 14b or 14c becomes easier. However, the number of components increases.

The edge parts 23a and 23b are formed integrally with the diffusive part 12a. However, the edge parts 23a and 23b may also be formed of components different from the diffusive part 12a. In this case, it becomes easy to prevent the edge parts 23a and 23b from including particles 122.

The incidence surface 13a and the reflecting surface 16b are arranged to be adjacent to each other. The incidence surface 13a and the reflecting surface 16b are arranged side by side. The incidence surface 13a and the reflecting surface 16b are arranged side by side in the edge part 23a. The incidence surface 13a and the reflecting surface 16b are arranged side by side at an end face of the plate-like shape of the diffusive body 12. The incidence surface 13a and the reflecting surface 16b are arranged side by side in the x-axis direction. The incidence surface 13a and the reflecting surface 16b are arranged in the edge part 23a at different positions in a direction orthogonal to the thickness of the plate-like shape. The incidence surface 13a and the reflecting surface 16b are arranged at different positions in a direction orthogonal to the thickness direction of the plate-like shape at the end face of the edge part 23a of the plate-like shape of the diffusive body 12.

The incidence surface 13b and the reflecting surface 16a are arranged to be adjacent to each other. The incidence surface 13b and the reflecting surface 16a are arranged side by side. The incidence surface 13b and the reflecting surface 16a are arranged side by side in the edge part 23b. The incidence surface 13b and the reflecting surface 16a are arranged side by side at an end face of the plate-like shape of the diffusive body 12. The incidence surface 13b and the reflecting surface 16a are arranged side by side in the x-axis direction. The incidence surface 13b and the reflecting surface 16a are arranged in the edge part 23b at different positions in a direction orthogonal to the thickness of the plate-like shape. The incidence surface 13b and the reflecting surface 16a are arranged at different positions in a direction orthogonal to the thickness direction of the plate-like shape at the end face of the edge part 23b of the plate-like shape of the diffusive body 12.

The light Lia emitted from the light source 10a enters the diffusive body 12 through the incidence surface 13a. The light Lia that entered through the incidence surface 13a is guided as the light Lta. The light Lia that entered the diffusive body 12 is scattered by the particles 122. The light Lie guided in the diffusive body 12 is scattered by the particles 122. The light scattered by the articles 122 is emitted from the region 14a as diffuse light Lsa. The scattered light Lsa is emitted from the region 14a.

The light Lta is light that reached the reflecting surface 16a without being scattered by the particles 122. The light Lta is light that reaches the reflecting surface 16a without being scattered by the particles 122. The light Lta is reflected by the reflecting surface 16a. The light Lta reflected by the reflecting surface 16a is emitted from, the region 14b as illuminating light Lla. The illuminating light Lla is emitted from the region 14b. The region 14b is formed in the edge part 23b.

The light Lib emitted from the light source 10b enters the diffusive body 12 through the incidence surface 13b. The light Lib that entered through the incidence surface 13b is guided as the light Ltb. The light Lib that entered the diffusive body 12 is scattered by the particles 122. The light Ltb guided in the diffusive body 12 is scattered by the particles 122. The light scattered by the particles 122 is emitted from, the region 14a as diffuse light Lsb. The diffuse light Lsb is emitted from the region 14a.

The light Ltb is light that reached the reflecting surface 16b without being scattered by the particles 122. The light Ltb is light that reaches the reflecting surface 16b without being scattered by the particles 122. The light Ltb is reflected by the reflecting surface 16b. The light Ltb reflected by the reflecting surface 16b is emitted from the region 14c as illuminating light Llb. The illuminating light Llb is emitted from, the region 14c. The region 14c is formed in the edge part 23a. The region 14c is a region that is different from, the region 14a and the emission region 14b.

The lighting fixture 220 makes the light Lia and Lib enter through the two edge parts 23a and 23b of the diffusive body 12. Accordingly, color irregularity and luminance irregularity on the region 14a occurring in the z-axis direction are inhibited. The z-axis direction is the traveling direction of the light Lta and Ltb. For example, when the distance for which the light Lt is guided is long, there are cases where the light amount of blue light Ls drops in the vicinity of the reflecting surface 16. In such cases, the color irregularity on the region 14a can be reduced by making the light Lia and Lib enter the diffusive body 12 through the two edge parts 23a and 23b of the diffusive body 12.

((Modification 2-2))

Another embodiment of the modification 2 will be described below with reference to FIG. 11.

As shown in FIG. 11, the lighting fixture 220 may include a light source 10c. The light source 10c emits light Lic. The light source 10c emits the light Lic in the −y-axis direction, for example. The −y-axis direction is the direction in which the light Ls is emitted from the emission surface 14.

The light source 10c is arranged at least in one of the edge part 23a and the edge part 23b. The light source 10c is arranged on a side opposite to the region 14a with respect to the diffusive body 12. The light source 10c is arranged on a side opposite to the emission surface 14 with respect to the diffusive body 12. Namely, the light source 10c is arranged on the back surface 15 side of the diffusive body 12. The light source 10c is arranged on the side opposite to the region 14a with respect to the diffusive body 12 in the thickness direction of the plate-like shape of the diffusive body 12. The light source 10c is arranged on the side opposite to the emission surface 14 with respect to the diffusive body 12 in the thickness direction of the plate-like shape of the diffusive body 12.

The light source 10c makes the light Lic enter the diffusive body 12 through a region on the back surface 15 facing the region 14c formed in the edge part 23a. The light source 10c makes the light Lic enter the diffusive body 12 through a region on the back surface 15 facing the region 14b formed in the edge part 23b. The light source 10c makes the light Lic enter the diffusive body 12 through at least one of the region on the back surface 15 facing the region 14c formed in the edge part 23a and the region on the back surface 15 facing the region 14b formed in the edge part 23b.

The light Lic is emitted after passing through the edge part 23a. The light Lic is emitted after passing through the edge part 23b. The light Lic is emitted after passing Through the edge part 23a or the edge part 23b where the light source 10c made the light Lic enter.

The light Lic is emitted from the region 14b. The region 14b is formed in the edge part 23b. The light Lic is emitted from the region 14c. The region 14c is formed in the edge part 23a. The light Lic is emitted from at least one of the region 14c in the edge part 23a where the light source 10c made the light Lic enter and the region 14b in the edge part 23b where the light source 10c made the light Lic enter.

The light source 10c is arranged at the same position as the light sources 10a and 10b in the x-axis direction, for example. The light source 10c is arranged at the same position as the light sources 10a and 10b in a direction orthogonal to the thickness direction of the plate-like shape of the diffusive body 12, for example.

Further, as shown in FIG. 10(B), parts where the incidence surface 13a or 13b is formed are projecting towards the back (back surface 15) side with respect to the reflecting surface 16a or 16b. The parts projecting towards the back side with respect to the reflecting surface 16a or 16b are parts for guiding the light Li to the region of the diffusive body 12 including the particles 122. The region of the diffusive body 12 including the particles 122 is, the diffusive part 12a.

The parts projecting towards the back side with respect to the reflecting surface 16a or 16b form an entry part 135. The entry part 135 includes an entry part 135a and an entry part 135b. The incidence surface 13a is formed on the entry part 135a. The incidence surface 13b is formed on the entry part 135. The light source 10c is arranged to face the parts projecting towards the back side with respect to the reflecting surface 16a or 16b. The light source 10c is arranged at the position of the entry part 135. The light source 10c is arranged on the back (back surface 15) side of the entry part 135.

The light Lic emitted from the light source 10c passes through the entry part 13S and is emitted from the region 14b or 14c. The light Lic passes through the entry part 13Sa and is emitted from the region 14c. The light Lic passes through the entry part 13Sb and is emitted from the region 14b. The light Lic passes through the diffusive body 12 in the thickness direction of the diffusive body 12.

The lighting fixture 220 is capable of increasing the light amount of the illuminating light Li by including the light source 10c. Further, the lighting fixture 220 is capable of controlling the color of the light Lic emitted from the light source 10c. Accordingly, the lighting fixture 220 is capable of controlling the color of the illuminating light Ll independently of the color of the diffuse light Ls. The lighting fixture 220 is capable of controlling the color of the illuminating light Ll independently of the color of the light Lia and Lib.

Furthermore, the light source 10c is only required to apply the light Lic to the edge part 23a or 23b. Therefore, the light source 10c is arranged close to the diffusive body 12. Thus, the light source 10c can be arranged to inhibit the increase in the thickness of a lighting unit 120.

((Modification 2-3))

Another embodiment of the modification 2 will be described below with reference to FIG. 12 and FIG. 13.

Figure 12:
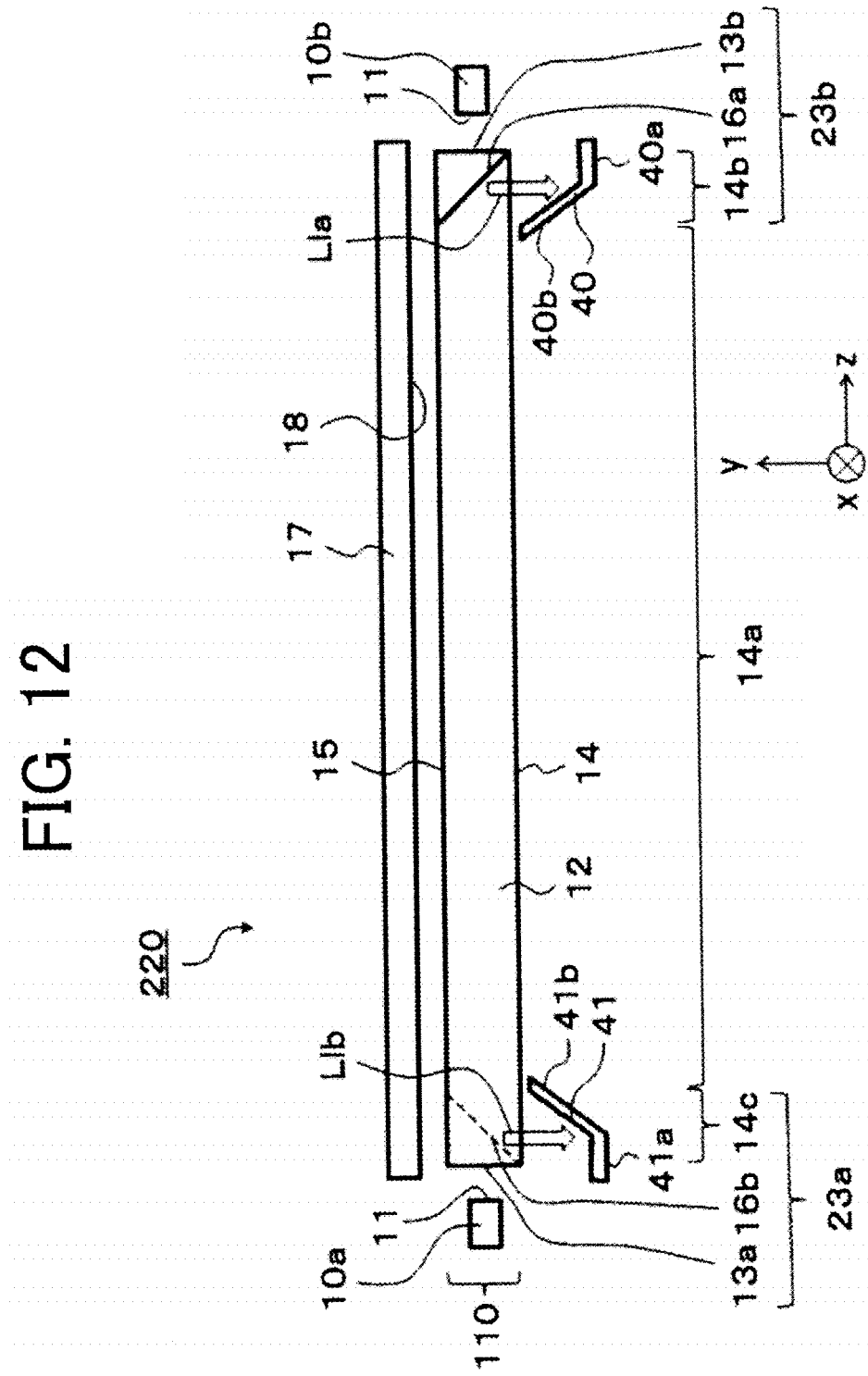
FIG. 12 is a configuration diagram showing a configuration of a lighting fixture according to the modification 2.
Figure 13:
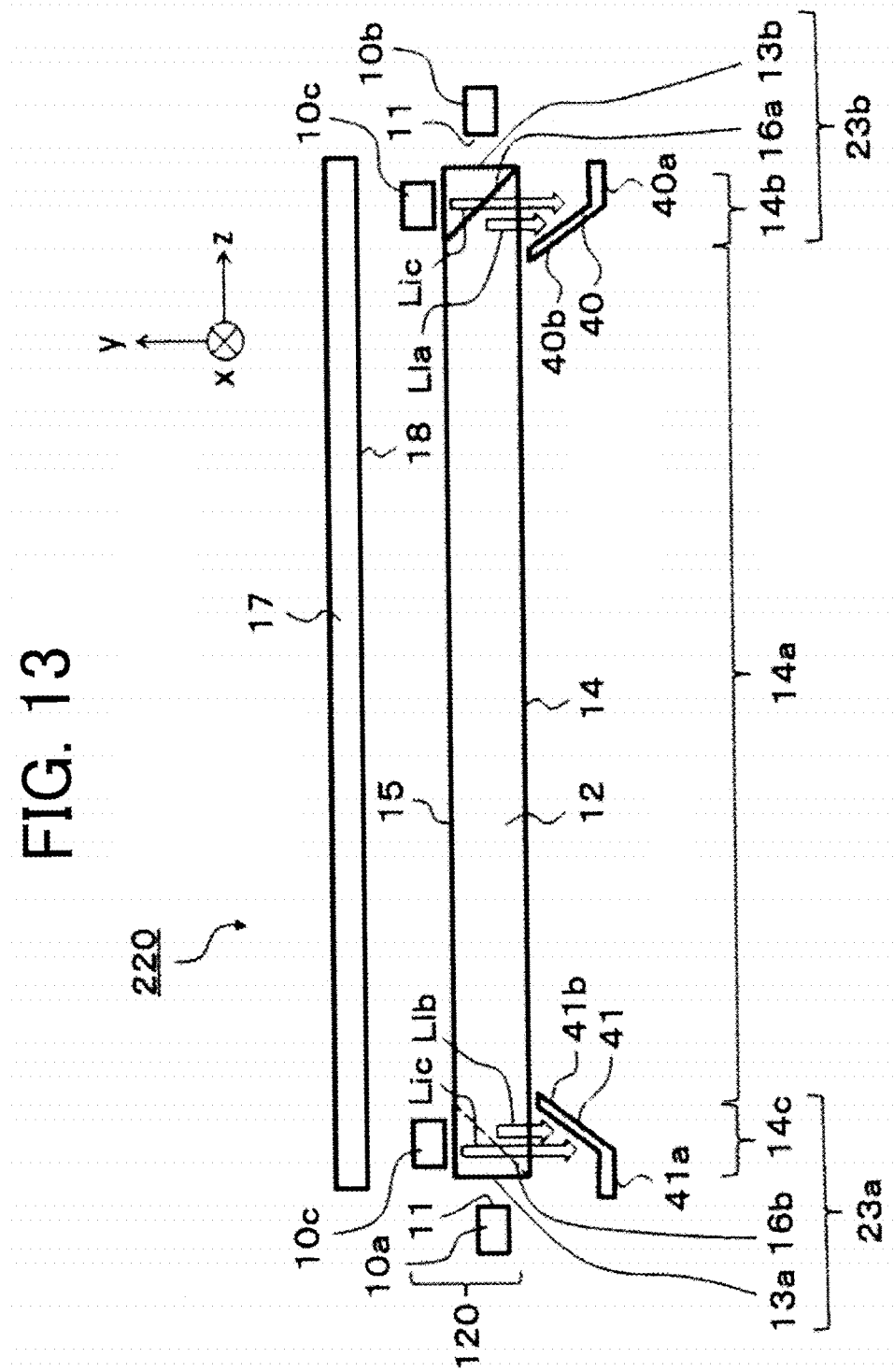
FIG. 13 is a configuration diagram showing a configuration of a lighting fixture according to the modification 2.

As shown in FIG. 12 and FIG. 13, the lighting fixture 220 may include light scatterers 40 and 41. FIG. 12 is a diagram showing the configuration of the lighting fixture 220 shown in FIGS. 10A and 10B including the light scatterers 40 and 41. FIG. 13 is a diagram showing the configuration of the lighting fixture 220 shown in FIG. 11 including the light scatterers 40 and 41.

The light scatterer 40 lets through and scatters the illuminating light Lla. The light scatterer 41 lets through and scatters the illuminating light Llb. In the lighting fixture 220 shown in FIG. 13, each light scatterer 40, 41 lets through and scatters the light Lic. The light scatterer 40 lets through and scatters the illuminating light Lla and the light Lic. The light scatterer 41 lets through and scatters the illuminating light Llb and the light Lic. Incidentally, the lighting fixture 200 can include the light scatterer 40. The light scatterer 40 of the lighting fixture 200 lets through and scatters the illuminating light Ll.

The light scatterer 40 lets through and scatters the illuminating light Lla and the light Lic emitted from the region 14b. The light scatterer 40 is arranged on the region 14a side with respect to the diffusive body 12. The light scatterer 40 is arranged on the region 14b side with respect to the diffusive body 12. The light scatterer 40 is arranged on the emission surface 14 side with respect to the diffusive body 12. The light scatterer 40 is arranged to cover the region 14b.

The light scatterer 41 lets through and scatters the illuminating light Llb and the light Lic emitted from the region 14c. The light scatterer 41 is arranged on the region 14a side with respect to the diffusive body 12. The light scatterer 41 is arranged on the region 14c side with respect to the diffusive body 12. The light scatterer 41 is arranged on the emission surface 14 side with respect to the diffusive body 12. The light scatterer 41 is arranged to cover the region 14c.

The light scatterer 40, 41 includes a region 40a, 41a and a region 40b, 41b. The light scatterer 40, 41 includes at least one of the region 40a, 41a and the region 40b, 41b. The light scatterer 40, 41 includes the region 40a, 41a. The light scatterer 40, 41 includes the region 40b, 41b.

The region 40a is arranged on the −y-axis direction side of the region 14b. The region 40a is arranged to face the region 14b, for example. The region 40a scatters light, at a small divergence angle included in the illuminating light Lla emitted from the region 14b. In the lighting fixture 220 shown in FIG. 13, the region 40a also scatters light at a small divergence angle included in the light Lic emitted from the region 14b.

The region 40b is arranged between the region 14a and the region 14b of the emission surface 14. The region 40b scatters at a larger divergence angle than the light scattered by the region 40a included in the illuminating light Lla emitted from the region 14b. In the lighting fixture 220 shown in FIG. 13, the region 40b also scatters light at a larger divergence angle than the light scattered by the region 40a included in the light Lic emitted from the region 14b.

The region 41a is arranged on the −y-axis direction side of the region 14c. The region 41a is arranged to face the region 14c, for example. The region 41a scatters light at a small divergence angle included in the illuminating light Llb emitted from the region 14c. In the lighting fixture 220 shown in FIG. 13, the region 41a also scatters light at a small divergence angle included in the light Lic emitted from the region 14c.

The region 41b is arranged between the region 14a and the region 14c of the emission surface 14. The region 41b scatters light at a larger divergence angle than the light scattered by the region 41a included in the illuminating light Llb emitted from the region 14c. In the lighting fixture 220 shown in FIG. 13, the region 41b also scatters light at a larger divergence angle than the light scattered by the region 41a included in the light Lic emitted from the region 14c.

The illuminating light Lla, Llb is the light Lta, Ltb after being reflected by the reflecting surface 16a, 16b. The light Lta, Ltb is light that traveled in the diffusive body 12 without being scattered by the particles 122. Thus, the illuminating light Lla, Llb is light with high directivity. The light scatterer 40, 41 applies the illuminating light Lla, Llb to the whole of an irradiation region. In this case, the reflecting surface 16a, 16b is a specular reflecting surface, for example.

The light Lic is light that passes through the entry part 13S. Thus, the light Lic is light with high directivity. Each light scatterer 40, 41 applies the light Lic to the whole of the irradiation region.

((Modification 2-4))

Another embodiment of the modification 2 will be described below with reference to FIG. 14.

Figure 14:
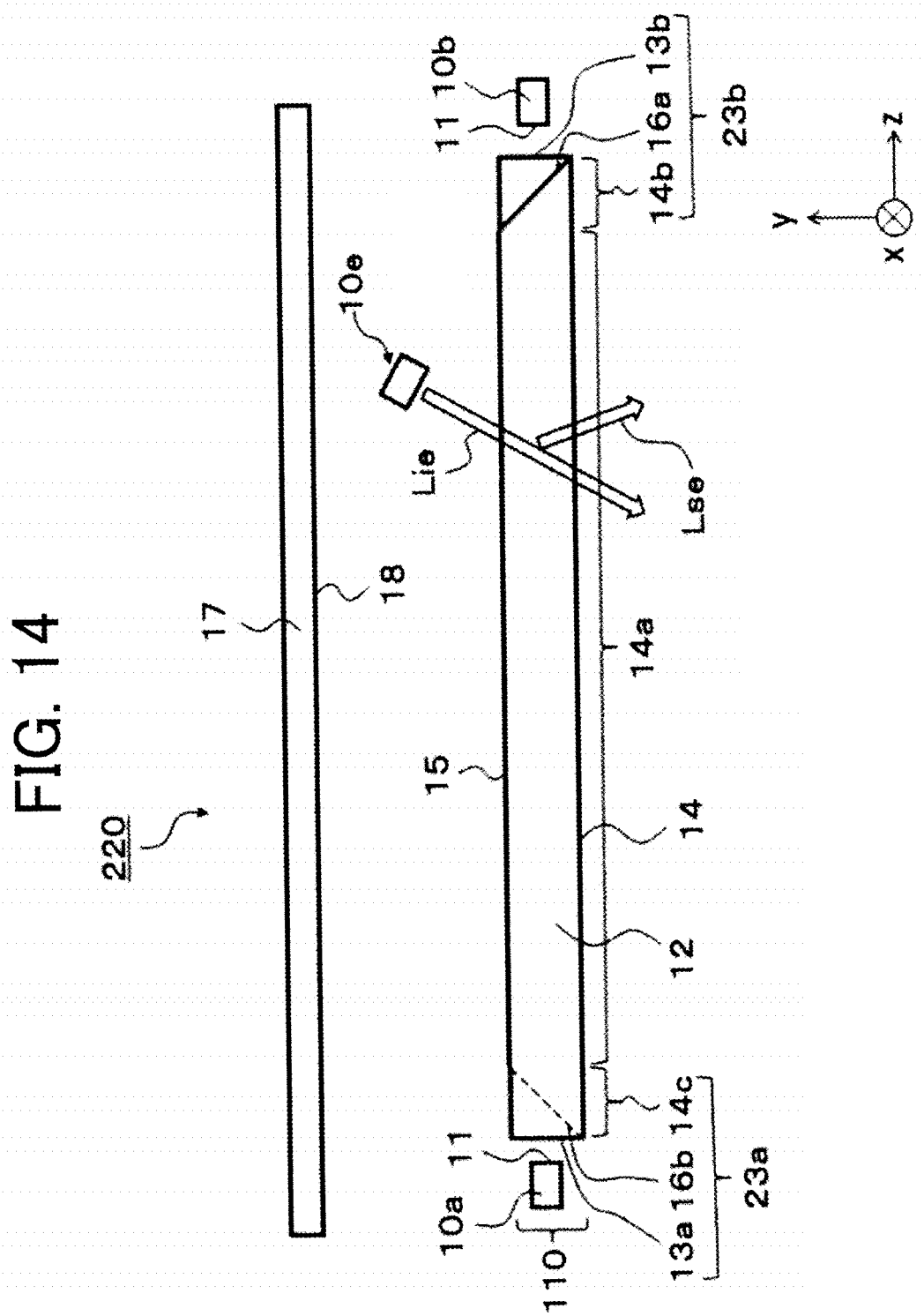
FIG. 14 is a configuration diagram showing a configuration of a lighting fixture according to the modification 2.

As shown in FIG. 14, the lighting fixture 220 may include a light source 10e.

The lighting fixture 220 includes the light source 10e provided between the diffusive body 12 and the light absorber 17. The light source 10e is arranged between the diffusive body 12 and the light absorber 17. The light source 10e emits light Lie towards the diffusive body 12. The light source 10e emits the light Lie towards the back surface 15 of the diffusive body 12.

The light Lie emitted from the light source 10e is applied towards the back surface 15 of the diffusive body 12. The light Lie enters the diffusive body 12 through the back surface 15 of the diffusive body 12. Part of the light Lie that entered the diffusive body 12 is scattered by the particles 122. The light Lie scattered by the particles 122 is emitted from the region 14a. The light Lie scattered by the particles 122 is scattered light Lse. The light Lie not scattered by the particles 122 passes through the diffusive body 12. The light Lie not scattered by the particles 122 is emitted from the region 14a. The light Lie not scattered by the particles 122 is emitted as illuminating light.

The lighting fixture 220 is capable of increasing the light amount of the scattered light Ls and the light amount of the illuminating light Ll by the addition of the light source 10e.

Further, it is possible for the lighting fixture 220 to simulate the sun by using the light source 10e only in a time period corresponding to the daytime. For example, in the northern hemisphere, the time of day when the sun culminates is assumed to be twelve noon. In this case, the lighting fixture 220 lights up the light source 10e only in a period from 10 o'clock to 14 o'clock, for example. By this method, the lighting fixture 220 is capable of simulating the sun. Further, the lighting fixture 220 is capable of generating the circadian rhythm.

(Modification 3)

((Modification 3-1))

A modification 3 will be described below with reference to FIG. 15 to FIG. 20. FIG. 15 to FIG. 20 are configuration diagrams showing a schematic configuration of a lighting fixture 230 according to the modification 3.

In the lighting fixture 230 described in the modification 3, each component common to the lighting fixture 200, 210 or 220 is assigned the same reference character as in the lighting fixture 200, 210 or 220 and repeated explanation thereof is omitted.

Figure 15:
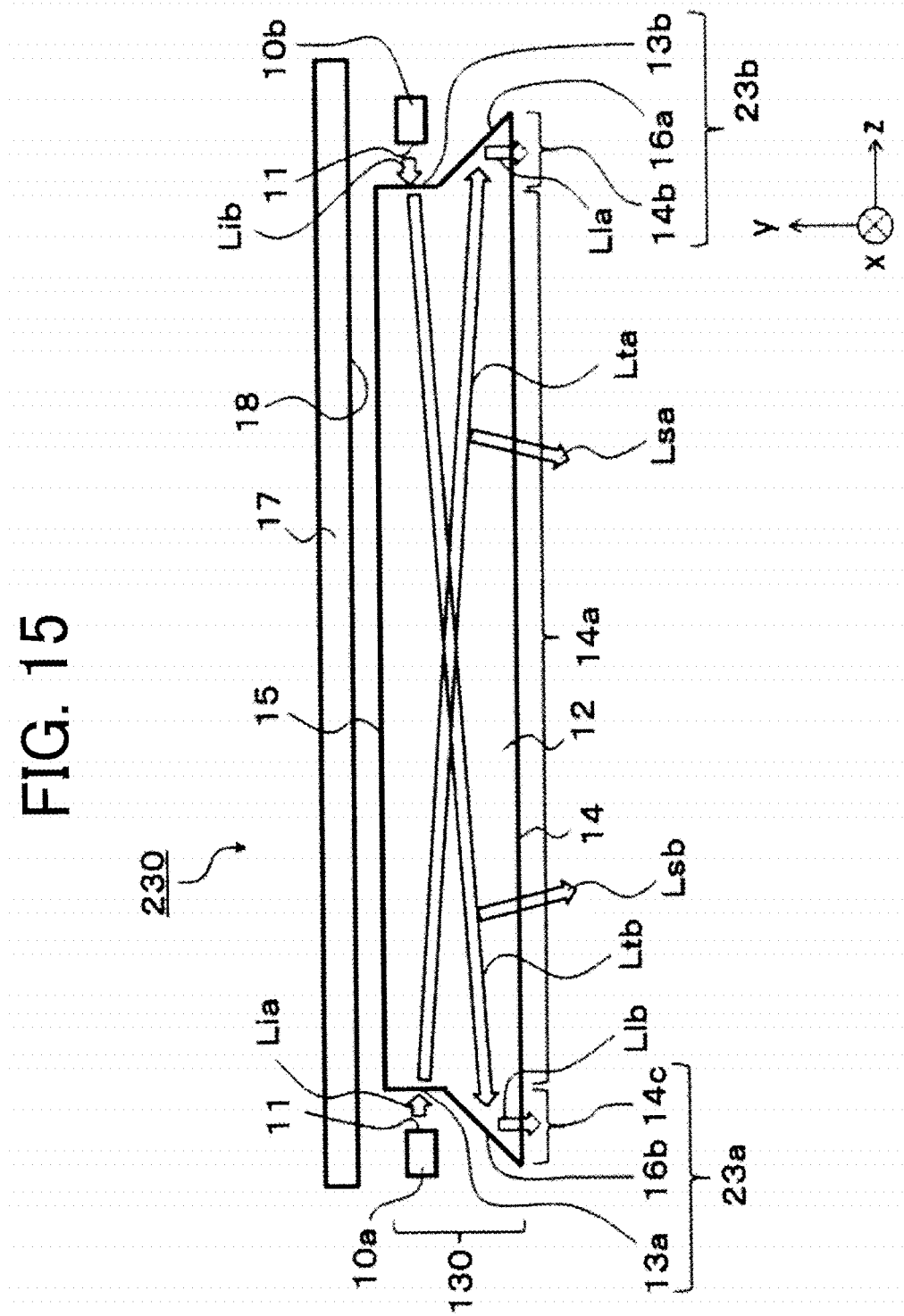
FIG. 15 is a configuration diagram showing a configuration of a lighting fixture according to a modification 3.

As shown in FIG. 15, in the lighting fixture 230, the positions of the incidence surfaces 13a and 13b and the positions of the reflecting surfaces 16a and 16b differ from the positions in the lighting fixture 220.

The incidence surface 13a and the reflecting surface 16b are arranged at different positions in the y-axis direction on the end face of the edge part 23a. The incidence surface 13a and the reflecting surface 16b are arranged at different positions in the thickness direction of the plate-like shape on the end face of the edge part 23a The incidence surface 13a and the reflecting surface 16b are arranged in the edge part 23a at different positions in the thickness direction of the plate-like shape.

The incidence surface 13b and the reflecting surface 16a are arranged at different positions in the y-axis direction on the end face of the edge part 23b. The incidence surface 13b and the reflecting surface 16a are arranged at different positions in the thickness direction of the plate-like shape on the end face of the edge part 23b. The incidence surface 13b and the reflecting surface 16a are arranged in the edge part 23b at different positions in the thickness direction of the plate-like shape.

The reflecting surface 16a is situated in the −y-axis direction relative to the incidence surface 13b. The reflecting surface 16a is situated on the region 14b side in the edge part 23b compared to the incidence surface 13b. The region 14b is formed in the edge part 23b. The reflecting surface 16a is situated on the emission surface 14 side in the thickness direction of the plate-like shape relative to the incidence surface 13b. The reflecting surface 16a is situated on the region 14a side in the thickness direction of the plate-like shape relative to the incidence surface 13b.

The reflecting surface 16b is situated in the −y-axis direction relative to the incidence surface 13a. The reflecting surface 16b is situated on the region 14c side in the edge part 23a compared to the incidence surface 13a. The region 14c is formed in the edge part 23a. The reflecting surface 16b is situated on the emission surface 14 side in the thickness direction of the plate-like shape relative to the incidence surface 13a. The reflecting surface 16b is situated on the region 14a side in the thickness direction of the plate-like shape relative to the incidence surface 13a.

The reflecting surface 16a is arranged at a position opposing the incidence surface 13a in the x-axis direction. The reflecting surface 16a is arranged at a position opposing the incidence surface 13a in a direction orthogonal to the thickness direction of the plate-like shape. Specifically, in terms of the xyz coordinates in FIG. 15, the position of the reflecting surface 16a on the x-axis is the same as the position of the incidence surface 13a on the x-axis. Incidentally, the position of the reflecting surface 16a on the y-axis differs from, the position of the incidence surface 13a on the y-axis.

The reflecting surface 16b is arranged at a position opposing the incidence surface 13b in the x-axis direction. The reflecting surface 16b is arranged at a position opposing the incidence surface 13b in a direction orthogonal to the thickness direction of the plate-like shape. Specifically, in terms of the xyz coordinates in FIG. 15, the position of the reflecting surface 16b on the x-axis is the same as the position of the incidence surface 13b on the x-axis. Incidentally, the position of the reflecting surface 16b on the y-axis differs from, the position of the incidence surface 13b on the y-axis.

The reflecting surface 16a, 16b is formed in the whole range of the end face of the edge part 23a, 23b in the x-axis direction, for example. The reflecting surface 16a, 16b is formed in the whole range of the end face of the edge part 23a, 23b in a direction orthogonal to the thickness direction of the plate-like shape of the diffusive body 12, for example.

The light source 10a is arranged to face the incidence surface 13a. The light source 10b is arranged to face the incidence surface 13b.

The light Lia emitted from the light source 10a enters the diffusive body 12 through the incidence surface 13a. The light Lia that entered the diffusive body 12 is scattered by the particles 122. The light Lta guided in the diffusive body 12 is scattered by the particles 122. The light scattered by the particles 122 is emitted from the region 14a as the diffuse light Lsa.

The light Lta is light that reached the reflecting surface 16a without being scattered by the particles 122. The light Lta is light that reaches the reflecting surface 16a without being scattered by the particles 122. The light Lta is reflected by the reflecting surface 16a. The light Lta reflected by the reflecting surface 16a is emitted from the region 14b as the illuminating light Lla.

The light Lib emitted from the light source 10b enters the diffusive body 12 through the incidence surface 13b. The light Lib that entered the diffusive body 12 is scattered by the particles 122. The light Ltb guided in the diffusive body 12 is scattered by the particles 122. The light scattered by the particles 122 is emitted from the region 14a as the diffuse light Lsb.

The light Ltb is light that reached the reflecting surface 16b without being scattered by the particles 122. The light Ltb is light that reaches the reflecting surface 16b without being scattered by the particles 122. The light Ltb is reflected by the reflecting surface 16b. The light Ltb reflected by the reflecting surface 16b is emitted from the region 14c as the illuminating light Llb.

The lighting fixture 230 makes the light Lia and Lib enter through the two edge parts 23a and 23b of the diffusive body 12. Accordingly, the color irregularity and the luminance irregularity on the region 14a occurring in the z-axes direction can be inhibited.

Further, compared to the lighting fixture 220 described in the modification 2-1, the lighting fixture 230 described in the modification 3-1 does not need to arrange the incidence surface 13 and the reflecting surface 16 side by side. Accordingly, color irregularity and luminance irregularity on the region 14a occurring in the x-axis direction can be inhibited.

((Modification 3-2))

Another embodiment of the modification 3 will be described below with reference to FIG. 16.

Figure 16:
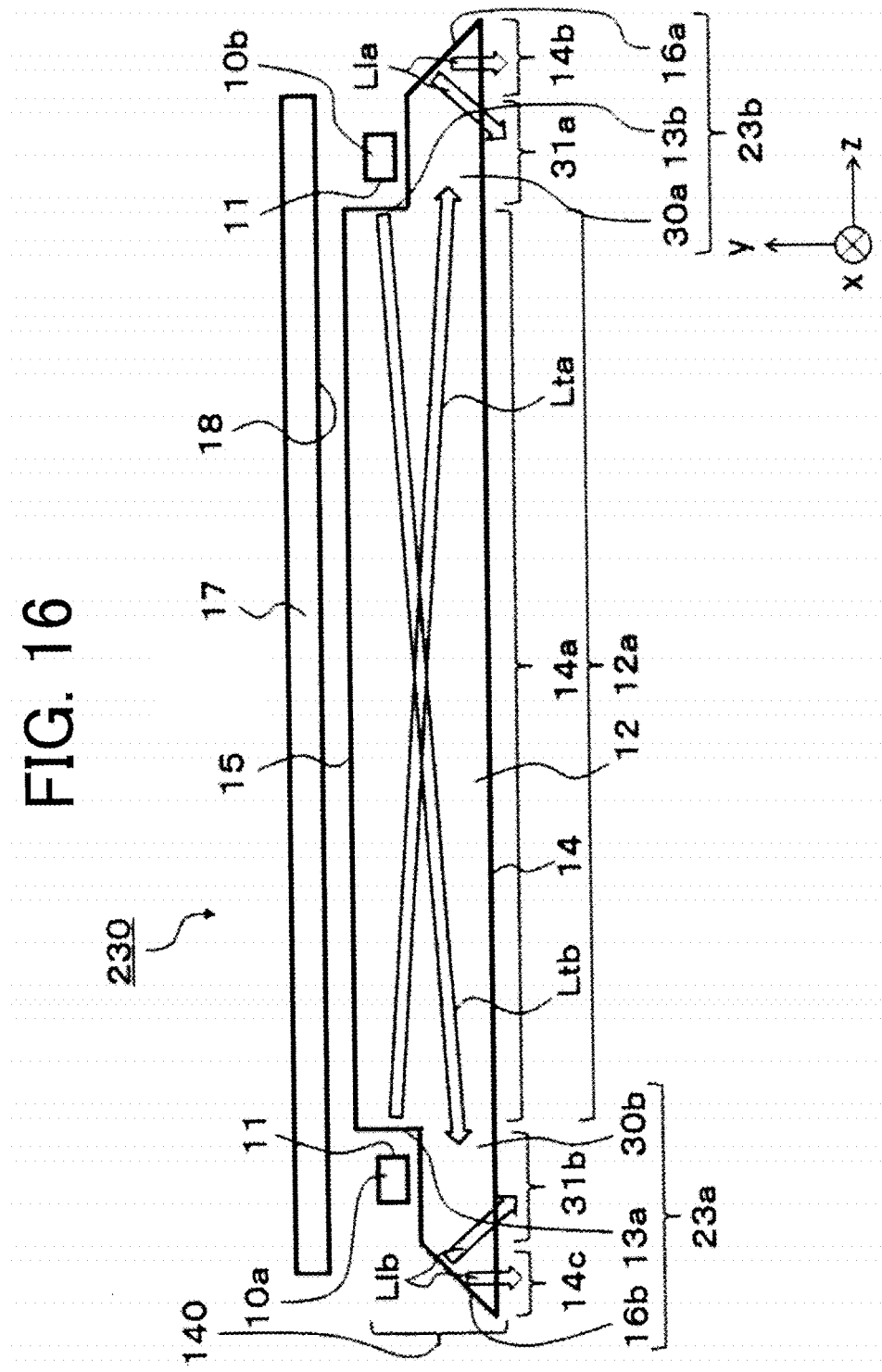
FIG. 16 is a configuration diagram showing a configuration of a lighting fixture according to the modification 3.

As shown in FIG. 16, the lighting fixture 230 may include a light guide part 30. The lighting fixture 230 includes the light guide part 30 provided at least between the reflecting surface 16a and the diffusive part 12a or between the reflecting surface 16b and the diffusive part 12a. The light guide part 30 includes a light guide part 30a and a light guide part 30b. The light guide part 30 is in a plate-like shape, for example.

The lighting fixture 230 includes the light guide part 30a provided between the reflecting surface 16a and the diffusive part 12a. The light guide part 30a is situated between the reflecting surface 16a and the diffusive part 12a The light guide part 30a connects the reflecting surface 16a and the diffusive part 12a. The light guide part 30a is included in the edge part 23b.

The lighting fixture 230 includes the light guide part 30b provided between the reflecting surface 16b and the diffusive part 12a. The light guide part 30b is situated between the reflecting surface 16b and the diffusive part 12a. The light guide part 30b connects the reflecting surface 16b and the diffusive part 12a. The light guide part 30b is included in the edge part 23a.

The light guide part 30a, 30b is formed in the whole range of the edge part 23a, 23b in the x-axis direction, for example. The light guide part 30a, 30b is formed in the whole range of the edge part 23a, 23b in a direction orthogonal to the thickness direction of the plate-like shape, for example.

A region 31 is a surface of the light guide part 30 on the −y-axis direction side. The region 31 is formed on a surface of the light guide part 30 on the −y-axis direction side. The region 31 is a surface of the light guide part 30 on the front side. The region 31 is formed on a surface of the light guide part 30 on the front side. The region 31 includes a region 31a and a region 31b. The region 31a is formed in the light guide part 30a. The region 31b is formed in the light guide part 30b. The region 31a is a region that is different from the region 14a and the region 14b. The region 31b is a region that is different from the region 14a and the region 14c.

The edge part 23a includes the incidence surface 13a, the reflecting surface 16b and the light guide part 30b. The edge part 23b includes the incidence surface 13b, the reflecting surface 16a and the light guide part 30a.

The reflecting surface 16a, 16b is formed in the whole range of the edge part 23a, 23b in the x-axis direction, for example. The reflecting surface 16a, 16b is formed in the whole range of the edge part 23a, 23b in a direction orthogonal to the thickness direction of the plate-like shape, for example.

The light guide part 30a guides the light Lta that has been guided in the diffusive part 12a without being scattered by the particles 122 to the reflecting surface 16a. The light guide part 30a guides the light Lta that is guided in the diffusive part 12a without being scattered by the particles 122 to the reflecting surface 16a. The light guide part 30b guides the light Ltb that has been guided in the diffusive part 12a without being scattered by the particles 122 to the reflecting surface 16b.

The illuminating light Lla is the light Lta after being reflected by the reflecting surface 16a. The illuminating light Lla is emitted from the region 14b. The illuminating light Lla may also be emitted from the region 31a. The illuminating light Llb is the light Ltb after being reflected by the reflecting surface 16b. The illuminating light Llb is emitted from the region 14c. The illuminating light Llb may also be emitted from the region 31b.

The incidence surfaces 13a and 13b are formed integrally with the diffusive part 12a. The reflecting surfaces 16a and 16b are formed integrally with the diffusive part 12a. The light guide parts 30a and 30b are formed integrally with the diffusive part 12a.

In the case where the reflecting surfaces 16a and 16b are formed integrally with the diffusive part 12a, the number of components can be held down. Further, the mass productivity can be increased. However, there is a possibility that particles 122 are included between the reflecting surface 16a or 16b and the region 14b or 14c. There is a possibility that particles 122 are included between the reflecting surface 16a or 16b and the light guide part 30a or 30b in such cases, the light Lt reaching the reflecting surface 16a or 16b is scattered. Then, the directivity of the light Lt reaching the reflecting surface 16a or 16b decreases. Further, the reflected light Ll includes scattered light similarly to the scattered light Lsa or Lsb. Accordingly, the emission direct ion control of the illuminating light Ll emitted from the region 14b or 14c or the region 31a or 31b becomes difficult. Furthermore, there is a possibility that the reflected light Ll is emitted from the region 14a.

The reflecting surfaces 16a and 16b may also be formed of components different from the diffusive part 12a. In this case, the light Lt reaching the reflecting surface 16a or 16b is not scattered. Thus, the directivity of the light Lt reaching the reflecting surface 16a or 16b increases. Further, the reflected light Ll does not include scattered light. Accordingly, the emission direction control of the illuminating light Ll emitted from the region 14b or 14c or the region 31a or 31b becomes easier. However, the number of components increases.

In the case where the light guide part 30a and 30b are formed integrally with the diffusive part 12a, the number of components can be held down. Further, the mass productivity can be increased. However, there is a possibility that particles 122 are included in the light guide part 30a or 30b. In such cases, the light Lt reaching the reflecting surface 16a or 16b is scattered. Then, the directivity of the light Lt reaching the reflecting surface 16a or 16b decreases. Accordingly, the emission direction control of the illuminating light Ll emitted from the region 14b or 14c or the region 31a or 31b becomes difficult. Further, there is a possibility that light having a wavelength close to that of the scattered light Lsa or Lsb is emitted from the region 31a or 31b.

The light guide parts 30a and 30b may also be formed of components different from the diffusive part 12a. In this case, the light Lt reaching the reflecting surface 16a or 16b is not scattered. Thus, the directivity of the light Lt reaching the reflecting surface 16a or 16b increases. Accordingly, the emission direction control of the illuminating light Ll emitted from the region 14b or 14c or the region 31a or 31b becomes easier. The possibility that light having a wavelength close to that of the scattered light Lsa or Lsb is emitted from the region 31a or 31b decreases. However, the number of components increases.

The incidence surfaces 13a and 13b may also be formed of components different from the diffusive part 12a. However, the number of components increases.

By changing the length of the light guide part 30, the position of the region 14b, 14c can be set at a different position. For example, it is possible to arrange the region 14b, 14c at a position separate from the region 14a simulating a blue sky. This prevents the illuminating light Ll from mixing with the light Ls. Then, high-quality illumination simulating a blue sky can be obtained.

Further, by the emission of the illuminating light Ll from the region 31, the illuminating light Li can be provided with greater breadth. Then, the irradiation region of the illuminating light Ll can be broadened.

((Modification 3-3))

Another embodiment of the modification 3 will be described below with reference to FIG. 17.

Figure 17:
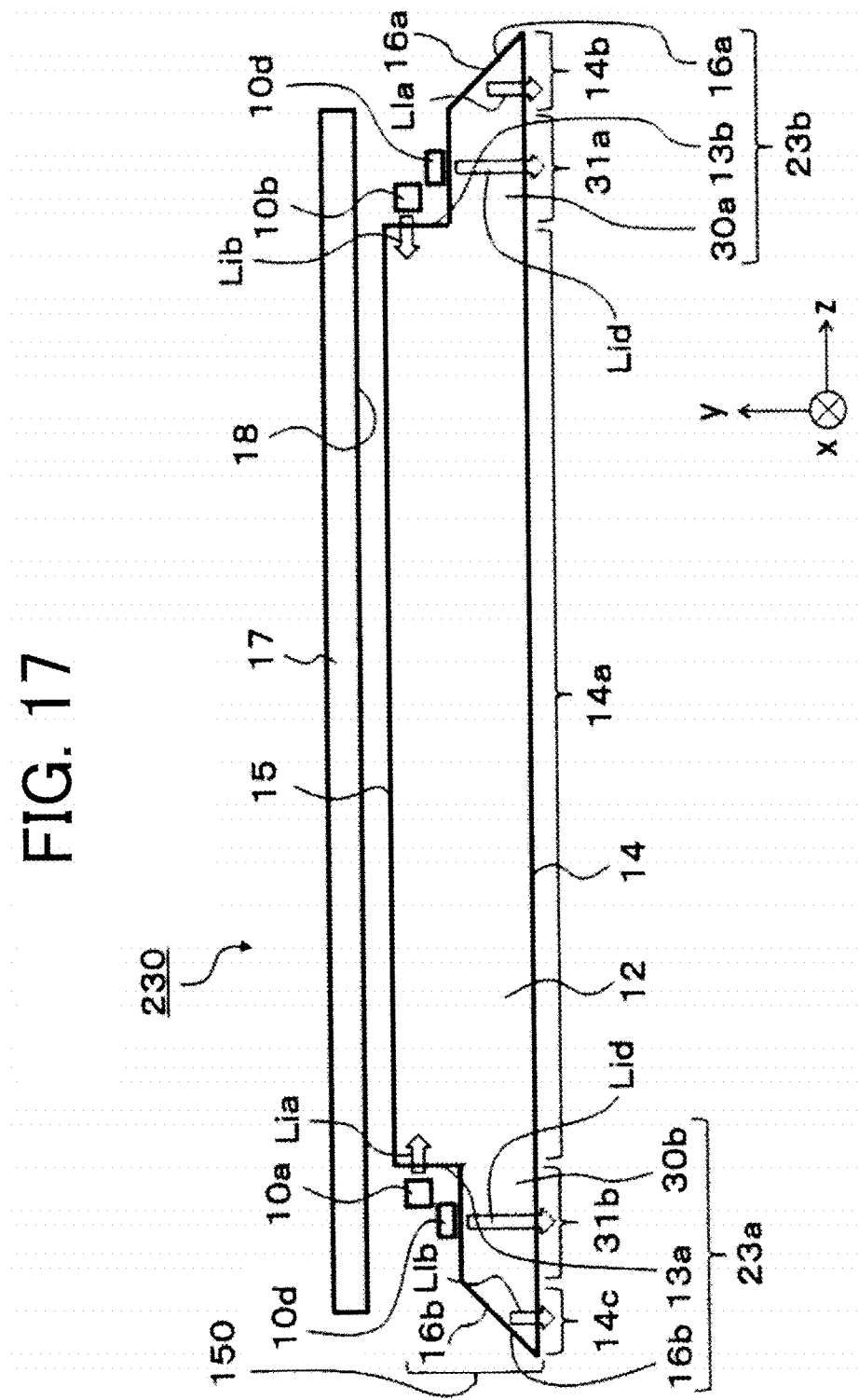
FIG. 17 is a configuration diagram showing a configuration of a lighting fixture according to the modification 3.

As shown in FIG. 17, the lighting fixture 230 may include a light source 10d. The light source 10d emits light Lid. The light source 10d emits the light Lid in the −y-axis direction, for example. The −y-axis direction is the direction in which the light Ls is emitted from the emission surface 14.

The light source 10d is arranged in the edge part 23a. The light source 10d is arranged in the edge part 23b. The light source 10d is arranged in at least one of the edge part 23a and the edge part 23b.

The light source 10d is arranged on the light source 10b side with respect to the light, guide part 30a. The light source 10d is arranged on the light source 10a side with respect to the light guide part 30b. The light source 10d is arranged at least on the light source 10b side with respect to the light guide part 30a or on the light source 10a side with respect to the light guide part 30b.

The light source 10d is arranged on a side opposite to the region 14a with respect to the light guide part 30. The light source 10d is arranged on a side opposite to the emission surface 14 with respect to the light guide part 30. The light source 10d is arranged on a side opposite to the region 31 with respect to the light guide part 30. The light source 10d is arranged on a side opposite to the region 14a with respect to the light guide part 30 in the thickness direction of the plate-like shape of the diffusive body 12. The light source 10d is arranged on a side opposite to the emission surface 14 with respect to the light guide part 30 in the thickness direction of the plate-like shape of the diffusive body 12. The light source 10d is arranged on a side opposite to the region 31 with respect to the light guide part 30 in the thickness direction of the plate-like shape of the diffusive body 12. Namely, the light source 10d is arranged on the back surface 15 side of the light guide part 30.

The light source 10d is arranged at a position different from those of the light sources 10a and 10b in the x-axis direction, for example. The light source 10d is arranged at a position different from those of the light sources 10a and 10b in a direction orthogonal to the thickness direction of the plate-like shape of the diffusive body 12, for example.

The light source 10d is arranged at a position different from those of the light sources 10a and 10b in the y-axis direction, for example. The light source 10d is arranged at a position different from those of the light sources 10a and 10b in the thickness direction of the plate-like shape of the diffusive body 12, for example.

The light source 10d is arranged at the same position as the light sources 10a and 10b in the x-axis direction, for example. The light source 10d is arranged at the same position as the light sources 10a and 10b in a direction orthogonal to the thickness direction of the plate-like shape of the diffusive body 12, for example.

The light source 10d is arranged a the same position as the light sources 10a and 10b in the y-axis direction, for example. The light source 10d is arranged at the same position as the light sources 10a and 10b in the thickness direction of the plate-like shape of the diffusive body 12, for example.

The light guide part 30a includes the region 31a on the same side in the edge part 23b as the side where the region 14b is formed for the reflecting surface 16a. The light guide part 30b includes the region 31b on the same side in the edge part 23a as the side where the region 14c is formed for the reflecting surface 16b. Namely, each region 31a, 31b is formed on the emission surface 14 side of the diffusive body 12.

The light Lid passes through the light guide part 30a and is emitted from the region 31a. The light Lid passes through the light guide part 30b and is emitted from the region 31b. The light Lid passes through the light guide part 30a provided with the light source 10d and is emitted from the region 31a, or passes through the light guide part 30b provided with the light source 10d and is emitted from the region 31b.

The light Lid emitted from the light source 10d passes through the light guide part 30 and is emitted from the region 31. The region 31 includes the region 31a and the region 31b. The light Lid passes through the light guide part 30 in the thickness direction of the diffusive body 12. The light Lid passes through the light guide part 30 in the thickness direction of the light guide part 30.

The lighting fixture 230 is capable of increasing the light amount of the illuminating light Ll by including the light source 10d. Further, the lighting fixture 230 is capable of controlling the color of the light source 10d. Accordingly, the lighting fixture 230 is capable of controlling the color of the illuminating light Ll independently of the color of the diffuse light Ls. The lighting fixture 230 is capable of controlling the color of the illuminating light Ll independently of the color of the light Lia and Lib.

((Modification 3-4))

Another embodiment of the modification 3 will be described below with reference to FIG. 18 and FIG. 19.

Figure 18:
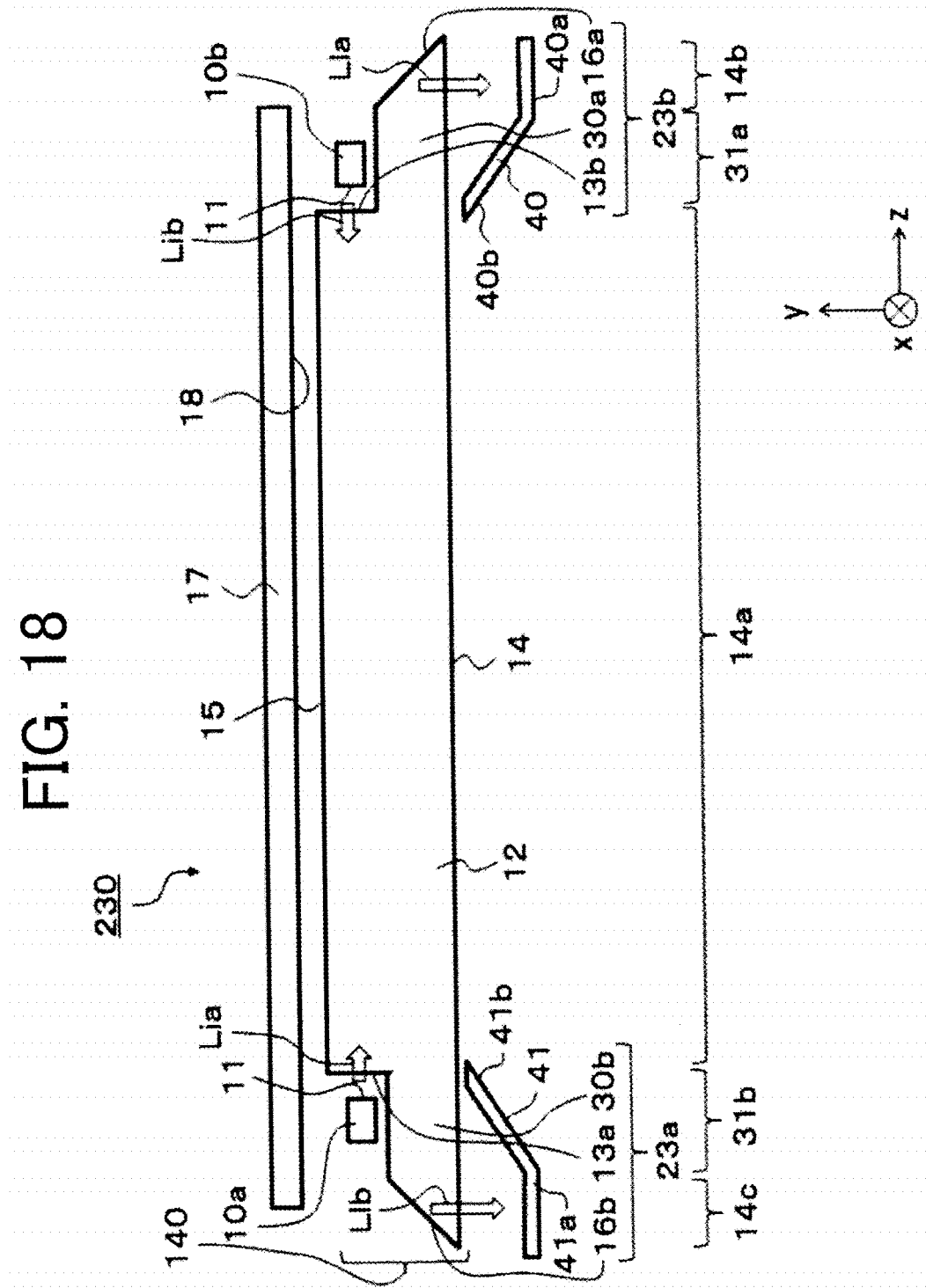
FIG. 18 is a configuration diagram showing a configuration of a lighting fixture according to the modification 3.
Figure 19:
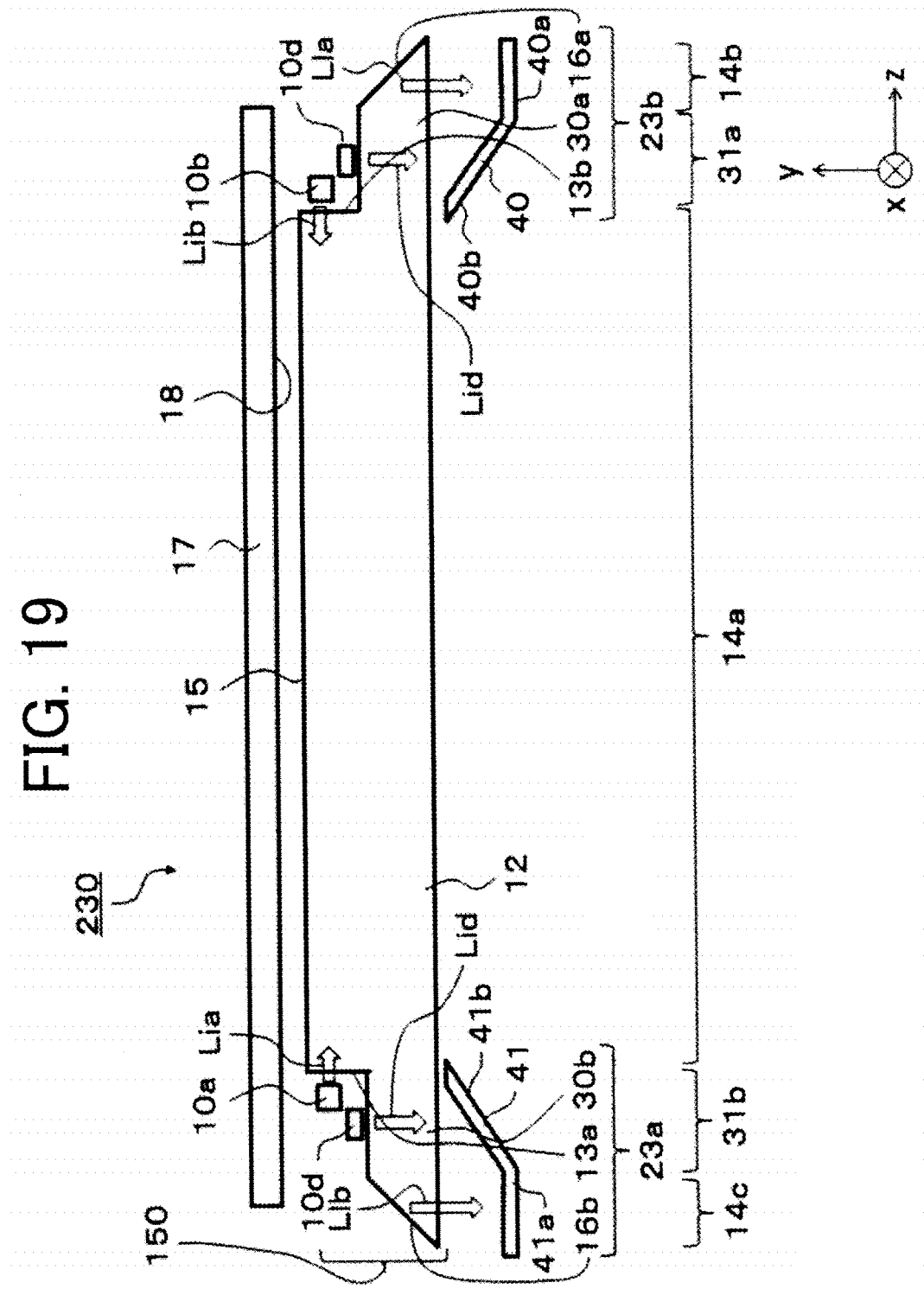
FIG. 19 is a configuration diagram showing a configuration of a lighting fixture according to the modification 3.

As shown in FIG. 18 and FIG. 19, the lighting fixture 230 may include the light scatterers 40 and 41. FIG. 18 is a diagram showing the configuration of the lighting fixture 230 shown in FIG. 16 including the light scatterers 40 and 41. FIG. 19 is a diagram showing the configuration of the lighting fixture 230 shown in FIG. 17 including the light scatterers 40 and 41.

The light scatterer 40 lets through and scatters the illuminating light Lla. The light scatterer 41 lets through and scatters the illuminating light Lib. In the lighting fixture 230 shown in FIG. 19, each light scatterer 40, 41 lets through and scatters the light Lid.

The light scatterer 40 lets through and scatters the illuminating light Lia emitted from the region 14b. The light scatterer 40 lets through and scatters the illuminating light Lia emitted from, the region 31a. The light scatterer 40 lets through and scatters the light Lid emitted from the region 31a. The light scatterer 40 is arranged on the region 14a side with respect to the diffusive body 12. The light scatterer 40 is arranged on the emission surface 14 side with respect to the diffusive body 12. The light scatterer 40 is arranged on the region 14b side with respect to the diffusive body 12. The light scatterer 40 is arranged on the region 31a side with respect to the diffusive body 12. The light scatterer 40 is arranged to cover the region 14b. The light scatterer 40 is arranged to cover the region 14b and the region 31a.

The light scatterer 41 lets through and scatters the illuminating light Lib emitted from the region 14c. The light scatterer 41 lets through and scatters the illumination light Lib emitted from, the region 31b. The light scatterer 41 lets through and scatters the light Lid emitted from the region 31b. The light scatterer 41 is arranged on the region 14a side with respect to the diffusive body 12. The light scatterer 41 is arranged on the emission surface 14 side with respect to the diffusive body 12. The light scatterer 41 is arranged on the region 14c side with respect to the diffusive body 12. The light scatterer 41 is arranged on the region 31b side with respect to the diffusive body 12. The light scatterer 41 is arranged to cover the region 14c. The light scatterer 41 is arranged to cover the region 14c and the region 31b.

The light scatterer 40, 41 includes the region 40a, 41a and the region 40b, 41b.

The region 40a is arranged on the −y-axis direction side of the region 14b. The region 40a is arranged to face the region 14b, for example. The region 40a may also be arranged on the −y-axis direction side of the region 14b and the region 31a. The region 40a scatters light at a small divergence angle included in the illuminating light Lla emitted from the region 14b, for example. In the lighting fixture 230 shown in FIG. 19, the region 40a also scatters light at a small divergence angle included in the light Lid emitted from the region 31a, for example.

The region 40b is arranged between the region 14a of the emission surface 14 and the region 31a of the light guide part 30a. The region 40b scatters light at a larger divergence angle than the light scattered by the region 40a included in the illuminating light Lla emitted from the region 14b, for example. The region 40b scatters the illuminating light Lla emitted from the region 31a. In the lighting fixture 230 shown in FIG. 19, the region 40b scatters light at a larger divergence angle than the light scattered by the region 40a included in the light Lid emitted from the region 31a, for example. Incidentally, in the light scatterer 40 shown in FIG. 16, the region 40b may also be arranged between the region 14b of the emission surface 14 and the region 31a.

Incidentally, the lighting fixture 230 shown in FIG. 15 can also include the light scatterer 40. In this case, the region 40b is arranged between the region 14a and the region 14b of the emission surface 14. In the lighting fixture 230 shown in FIG. 15, the region 40b scatters light at a larger divergence angle than the light scattered by the region 40a included in the light Lia emitted from the region 14b, for example.

The region 41a is arranged on the −y-axis direction side of the region 14c. The region 41a is arranged to face the region 14c, for example. The region 41a may also be arranged on the −y-axis direction side of the region 14c and the region 31b. The region 41a scatters light at a small divergence angle included in the illuminating light Llb emitted from the region 14c, for example. In the lighting fixture 230 shown in FIG. 19, the region 41a also scatters light at a small divergence angle included in the light Lid emitted from the region 31b, for example.

The region 41b is arranged between the region 14a of the emission surface 14 and the region 31b of the light guide part 30b. The region 41b scatters light at a larger divergence angle than the light scattered by the region 41a included in the illuminating light Llb emitted from the region 14c, for example. The region 41b scatters the illuminating light Llb emitted from the region 31b. In the lighting fixture 230 shown in FIG. 19, the region 41b scatters light at a larger divergence angle than the light scattered by the region 41a included in the light Lid emitted from the region 31b, for example. Incidentally, in the light scatterer 41 shown in FIG. 18, the region 41b may also be arranged between the region 14c of the emission surface 14 and the region 31b.

Incidentally, the lighting fixture 230 shown in FIG. 15 can also include the light scatterer 41. In this case, the region 41b is arranged between the region 14a and the region 14c of the emission surface 14. In the lighting fixture 230 shown in FIG. 15, the region 41b scatters light at a larger divergence angle than the light scattered by the region 41a included in the light Llb emitted from the region 14c, for example.

The illuminating light Lla, Llb is the light Lta, Ltb after being reflected by the reflecting surface 16a, 16b. The light Lta, Ltb is light that traveled in the diffusive body 12 without being scattered by the particles 122. Thus, the illuminating light Lla, Llb is light with high directivity. Each light scatterer 40, 41 applies the illuminating light Lla, Llb to the whole of the irradiation region. Incidentally, in this case, the reflecting surface 16a, 16b is a specular reflecting surface, for example.

The light Lid is light that passed through the light guide part 30. Thus, the light Lid is light with high directivity. Each light scatterer 40, 41 applies the light Lid to the whole of the irradiation region.

((Modification 3-5))

Another embodiment of the modification 3 will be described below with reference to FIG. 20.

Figure 20:
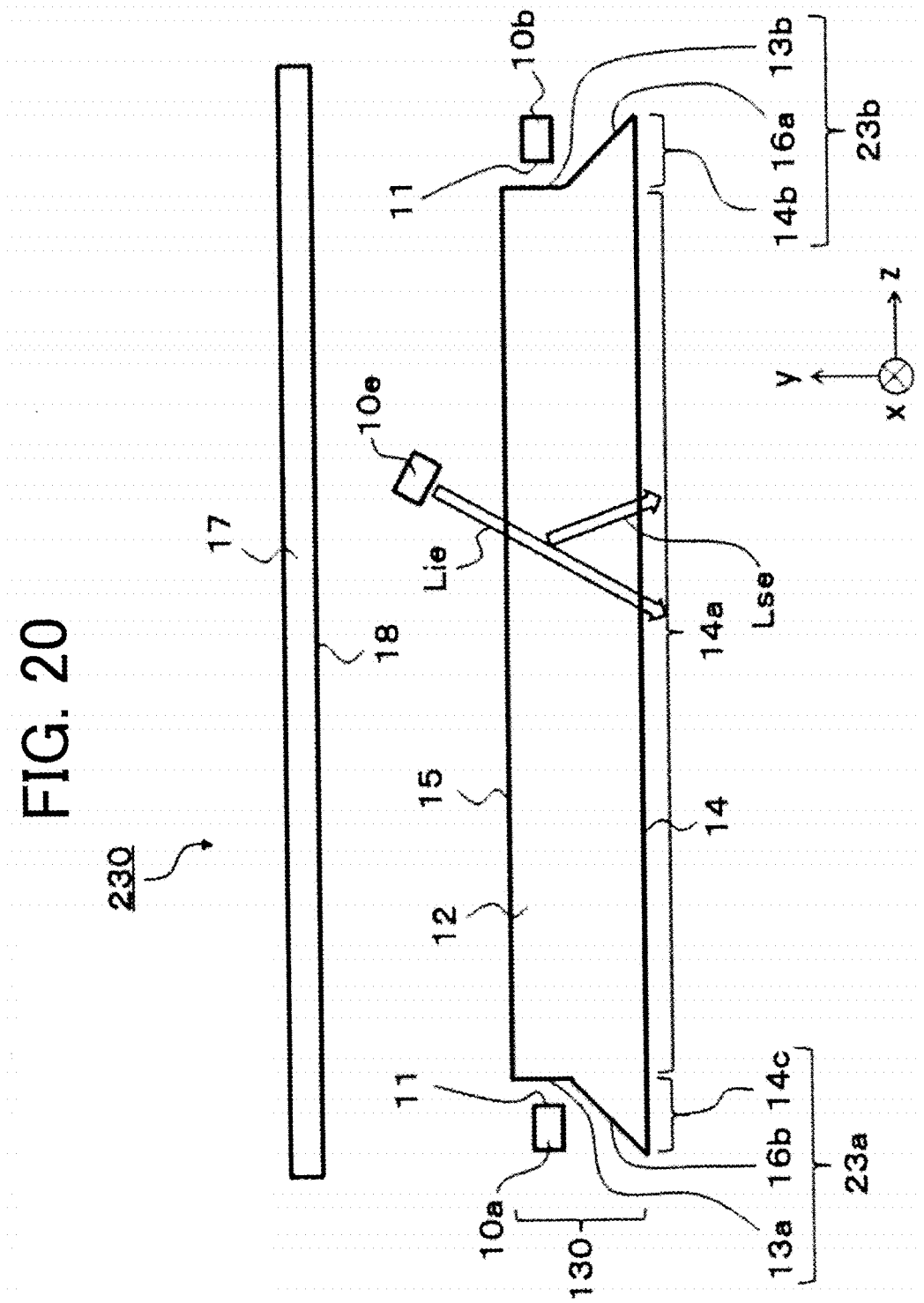
FIG. 20 is a configuration diagram showing a configuration of a lighting fixture according to the modification 3.

As shown in FIG. 20, the lighting fixture 230 may include the light source 10e.

The lighting fixture 230 includes the light source 10e provided between the diffusive body 12 and the light absorber 17. The light source 10e is arranged between the diffusive body 12 and the light absorber 17. The light source 10e emits light Lie towards the diffusive body 12. The light source 10e emits the light Lie towards the back surface 15 of the diffusive body 12.

The light Lie emitted from the light source 10e is applied towards the back surface 15 of the diffusive body 12. The light Lie enters the diffusive body 12 through the back surface 15 of the diffusive body 12. Part of the light Lie that entered the diffusive body 12 is scattered by the particles 122. The light Lie scattered by the particles 122 is emitted from the region 14a. Light Lse scattered by the particles 122 is emitted from the region 14a. The light Lie scattered by the particles 122 is the light Lse. The light Lie not scattered by the particles 122 passes through the diffusive body 12. The light Lie not scattered by the particles 122 is emitted from the region 14a.

The lighting fixture 230 is capable of increasing the light amount of the scattered light Ls and the light amount of the illuminating light Ll by the addition of the light source 10e.

Further, it is possible for the lighting fixture 230 to simulate the sun by using the light source 10e only in a time period corresponding to the daytime. For example, in the northern hemisphere, the time of day when the sun culminates is assumed to be twelve noon. In this case, the lighting fixture 230 lights up the light source 10e only in a period from 10 o'clock to 14 o'clock, for example. By this method, the lighting fixture 230 is capable of simulating the sun. Further, the lighting fixture 230 is capable of generating the circadian rhythm.

(Modification 4)

Figure 21:
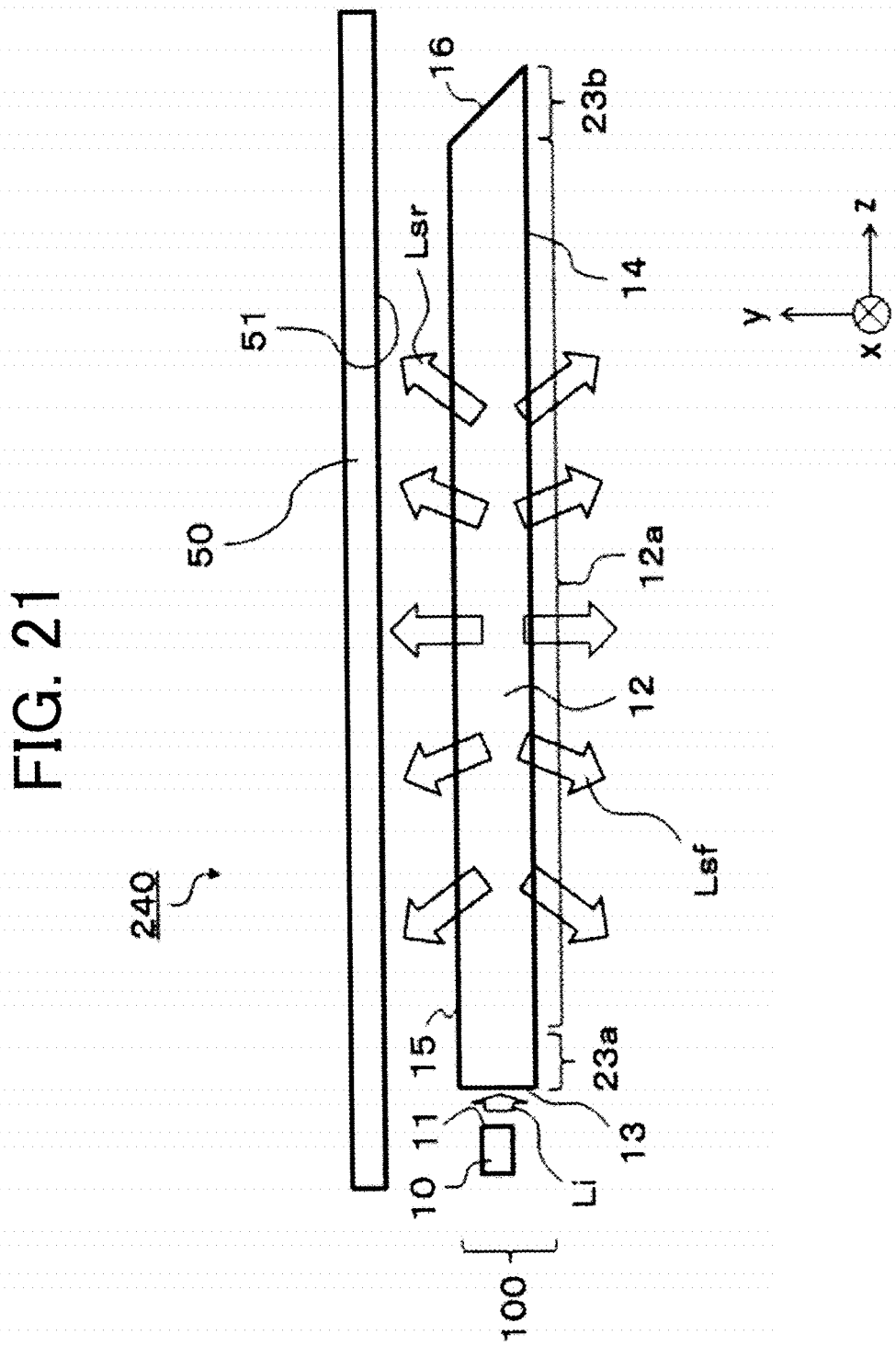
FIG. 21 is a configuration diagram showing a configuration of a lighting fixture according to a modification 4.

A modification 4 will be described below with reference to FIG. 21. FIG. 21 is a configuration diagram showing a schematic configuration of a lighting fixture 240 according to the modification 4.

In the lighting fixture 240 described in the modification 4, each component common to the lighting fixture 200, 210, 220 or 230 is assigned the same reference character as in the lighting fixture 200, 210, 220 or 230 and repeated explanation thereof is omitted.

As shown in FIG. 21, the lighting fixture 240 includes the fight reflector 50 on the back surface 15 side of the diffusive body 12. The lighting fixture 240 includes the light reflector 50 on the back surface 15 side with respect to the diffusive body 12. Scattered light Lsf is light emitted from the diffusive body 12 to the emission surface 14 side. Scattered light Lsr is light emitted from the diffusive body 12 to the back surface 15 side.

The light reflector 50 has a reflecting surface 51 on the diffusive body 12 side. The reflecting surface 51 is a diffusive reflecting surface, for example. The reflecting surface 51 diffusively reflects light, for example. The reflecting surface 51 is painted with white color, for example. Incidentally, the reflecting surface 51 may also be formed to specularly reflect light, for example.

The diffuse reflection means reflection of light from an uneven surface or a rough surface. In the diffuse reflection, it looks like the incident light is reflected at various angles. The diffuse reflection is referred to also as irregular reflection. The specular reflection is perfect reflection of light by a mirror or the like, in which light from one direction is reflected and goes out in a different one direction. The specular reflection is referred to also as regular reflection.

The light reflector 50 reflects the scattered light Lsr emitted from the back surface 15 of the diffusive body 12. The scattered light Lsr is reflected by the reflecting surface 51 in the direction of the diffusive body 12 (–y-axis direction). Then, the scattered light Lsr passes through the diffusive body 12 and is emitted from the emission surface 14. The scattered light Lsr in superimposition with the scattered light Lsf is emitted from the emission surface 14.

The lighting fixture 240 emits again the scattered light Lsr, previously emitted to the back surface 15 side of the diffusive body 12, from the emission surface 14. Accordingly, the lighting fixture 240 increases light utilization efficiency. The light reflector 50 increases the light utilization efficiency.

(Modification 5)

A modification 5 will be described below with reference to FIG. 22, FIG. 23 and FIG. 24. In a lighting fixture 250 described in the modification 5, each component common to the lighting fixture 200, 210, 220, 230 or 240 is assigned the same reference character as in the lighting fixture 200, 210, 220, 230 or 240 and repeated explanation thereof is omitted.

(Modification 5-1))

Figure 22:
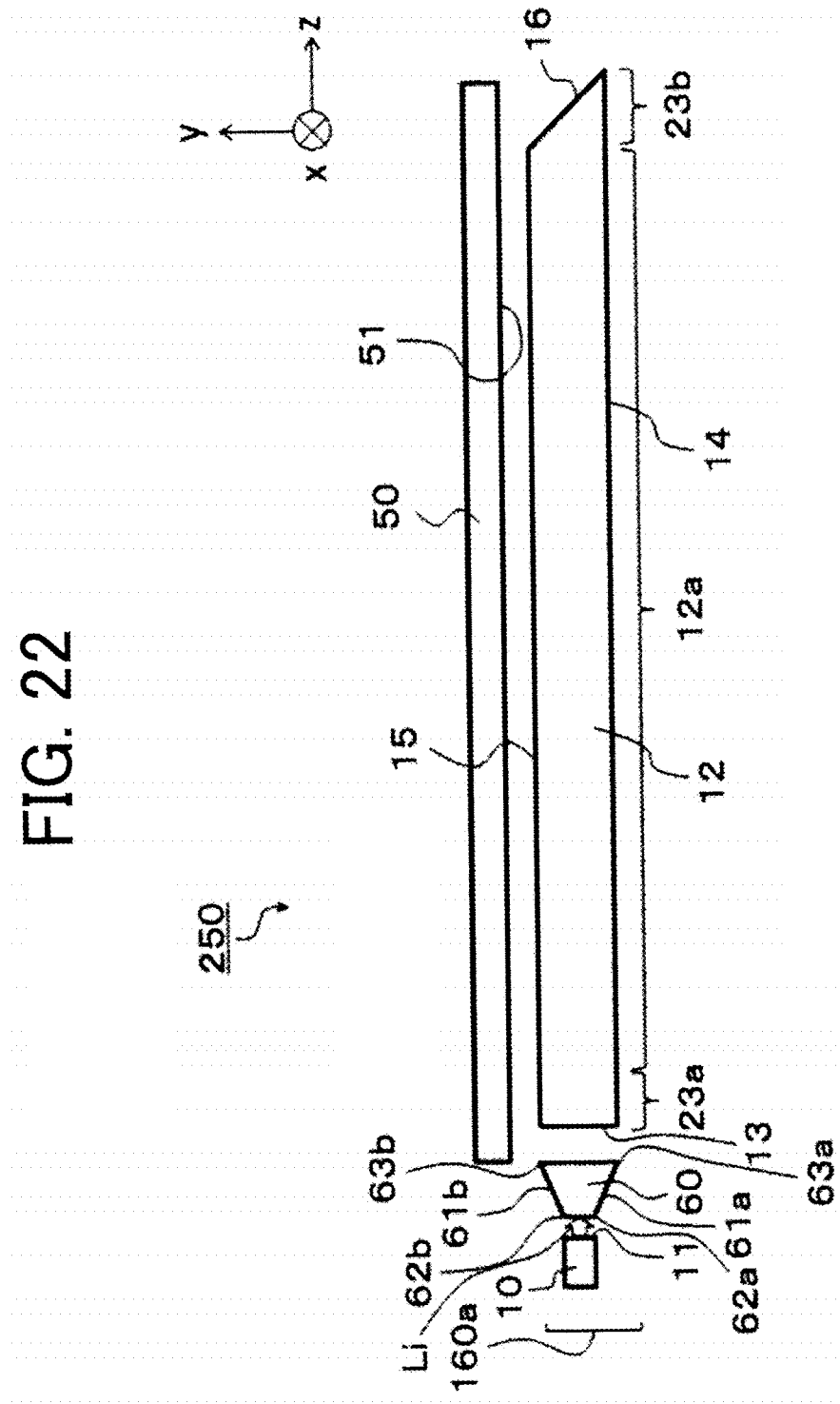
FIG. 22 is a configuration diagram showing a configuration of a lighting fixture according to a modification 5.

FIG. 22 is a configuration diagram showing a schematic configuration of the lighting fixture 250 according to the modification 5.

As shown in FIG. 22, the lighting fixture 250 includes a light condenser 60. The light condenser 60 is arranged between the light emission surface 11 of the light source 10 and the incidence surface 13 of the diffusive body 12.

The light condenser is a device that condenses rays of light into a place or direction where the light is necessary. The light condenser is, for example, a condensing lens, a condensing mirror, a condensing cone or the like. Further, the light condenser includes a collimator. The condensing cone is a Winston cone, for example. The Winston cone is a typical condensing mirror taking advantage of a property of light incident upon a paraboloidal surface to converge on a focal point.

To "condense light" means to collect light. Namely, the divergence angle of outgoing light is smaller than the divergence angle of incident light.

Referring to FIG. 22, the light condenser 60 will be described below by taking a condensing cone as an example. The light condenser 60 has a reflecting surface 61a and a reflecting surface 61b. In FIG. 22, a cross section of the light condenser 60 is shown. Thus, in three dimensions, the reflecting surface 61a and the reflecting surface 61b are parts of a connected surface like a tube.

In the modification 5, the light condenser 60 is in the shape of a quadrangular frustum, for example. The quadrangular frustum is a frustum whose two base surfaces are in quadrangular shapes. The frustum is a solid figure obtained by removing a reduced cone/pyramid sharing the vertex with an original cone/pyramid and having been reduced to be similar to the original cone/pyramid, from the original cone/pyramid. The two base surfaces of the frustum are an upper base surface and a lower base surface. One base surface of the quadrangular frustum is an incidence surface of the light condenser 60. The other base surface of the quadrangular frustum is an emission surface of the light condenser 60. Incidentally, in cases where the light condenser 60 is a hollow body, the incidence surface and the emission surface of the light condenser 60 are openings.

At least one of the reflecting surface 61a and the reflecting surface 61b has an angle with respect to the z-axis. In other words, at least one of the reflecting surface 61a and the reflecting surface 61b is inclined with respect to the z-axis. The reflecting surface 61a or 61b is inclined so that the area of the emission surface of the light condenser 60 is larger than the area of the incidence surface of the light condenser 60. The z-axis is an axis parallel to the direction of emitting light.

An edge part 62a is an edge part of the reflecting surface 61a on the light source 10 side. The edge part 62a is an edge part of the reflecting surface 61a on the side where light enters the light condenser 60. An edge part 62b is an edge part of the reflecting surface 61b on the light source 10 side. The edge part 62b is an edge part of the reflecting surface 61b on the side where light enters the light condenser 60. An edge part 63a is an edge part of the reflecting surface 61a on the side where light emerges from, the light condenser 60. An edge part 63b is an edge part of the reflecting surface 61b on the side where light emerges from the light condenser 60. The distance between the edge part 62a and the edge part 62b is shorter than the distance between the edge part 63a and the edge part 63b.

The lighting fixture 250 increases the directivity of the light Li emitted from the light source 10 by using the light condenser 60. The light condenser 60 increases the light amount of the light Li emitted from the light source 10 and entering the diffusive body 12. Accordingly, the lighting fixture 250 increases the light utilization efficiency. The light condenser 60 increases the light utilization efficiency.

((Modification 5-2))

Figure 23:
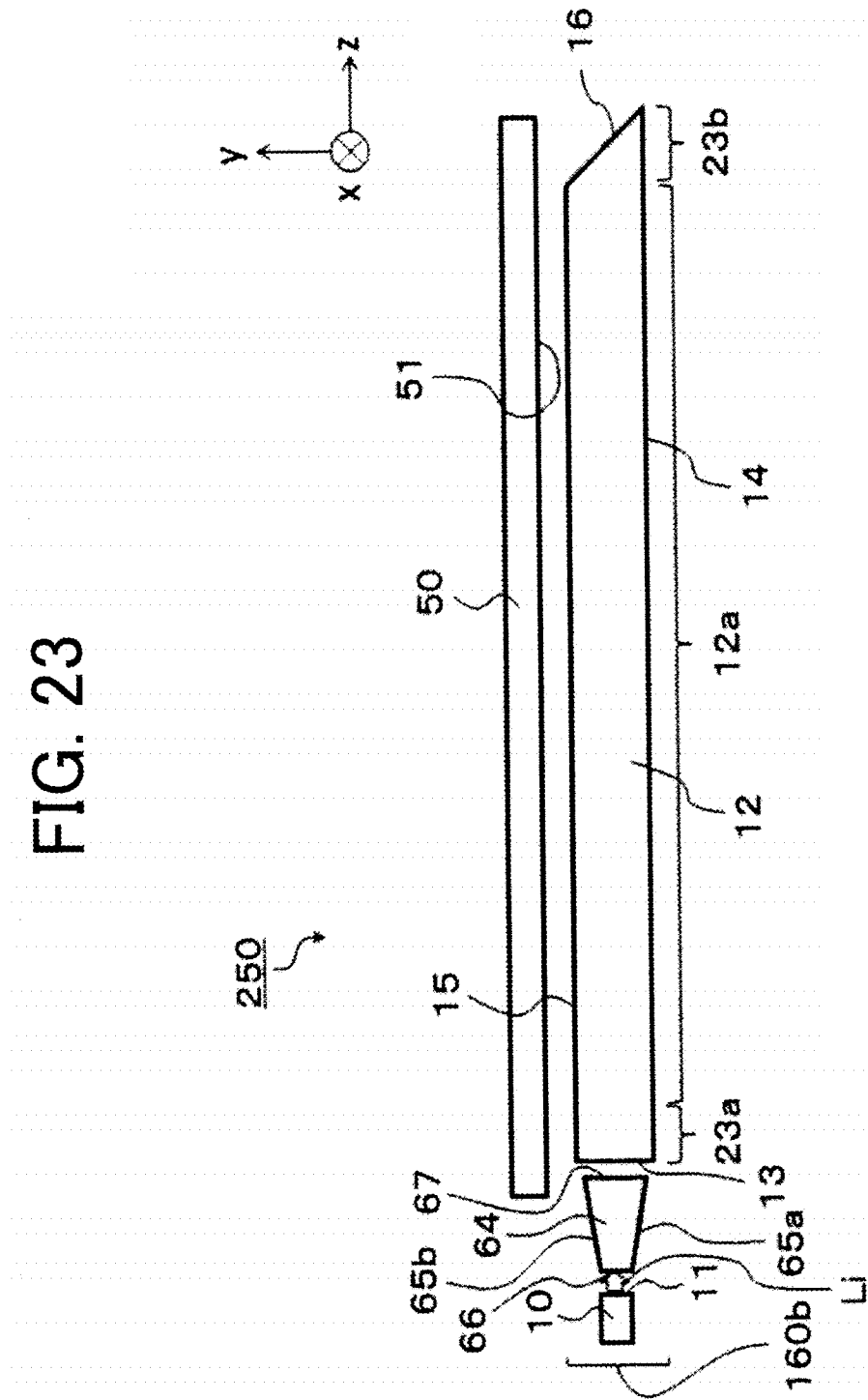
FIG. 23 is a configuration diagram showing a configuration of a lighting fixture according to the modification 5.

FIG. 23 is a configuration diagram showing a schematic configuration of another embodiment of the lighting fixture 250 according to the modification 5. Another embodiment of the lighting fixture 250 according to the modification 5 will be described below with reference to FIG. 23.

As shown in FIG. 23, the lighting fixture 250 includes a light guide body 64. The light guide body 64 is arranged between the light emission surface 11 of the light source 10 and the incidence surface 13 of the diffusive body 12. The light guide body 64 is an example of the light condenser 60.

The light guide body 64 has an incidence surface 66 and an emission surface 67. For example, the area of the emission surface 67 is the same as the area of the incidence surface 66. For example, the area of the emission surface 67 is larger than the area of the incidence surface 66. Incidentally, in cases where the light Guide body 64 is a hollow body, the incidence surface 66 and the emission surface 67 are openings.

The light Li emitted from the light source 10 enters the light guide body 64 through the incidence surface 66. Then, the light Li is deflected by reflection by a reflecting surface 65a and a reflecting surface 65b. The reflection by the reflecting surface 65a, 65b is total reflection, for example. Then, the light Li is emitted from the emission surface 67. The light Li is emitted towards the incidence surface 13 of the diffusive body 12.

The lighting fixture 250 increases the directivity of the light Li emitted from the light source 10 by using the light guide body 64. The lighting fixture 250 guides the light Li emitted from the light source 10 to the incidence surface 13 of the diffusive body 12 by using the light guide body 64. The light guide body 64 increases the light amount of the light Li emitted from the light source 10 and entering the diffusive body 12. Accordingly, the lighting fixture 250 increases the light utilization efficiency. The light guide body 64 increases the light utilization efficiency.
((Modification 5-3))

Figure 24:
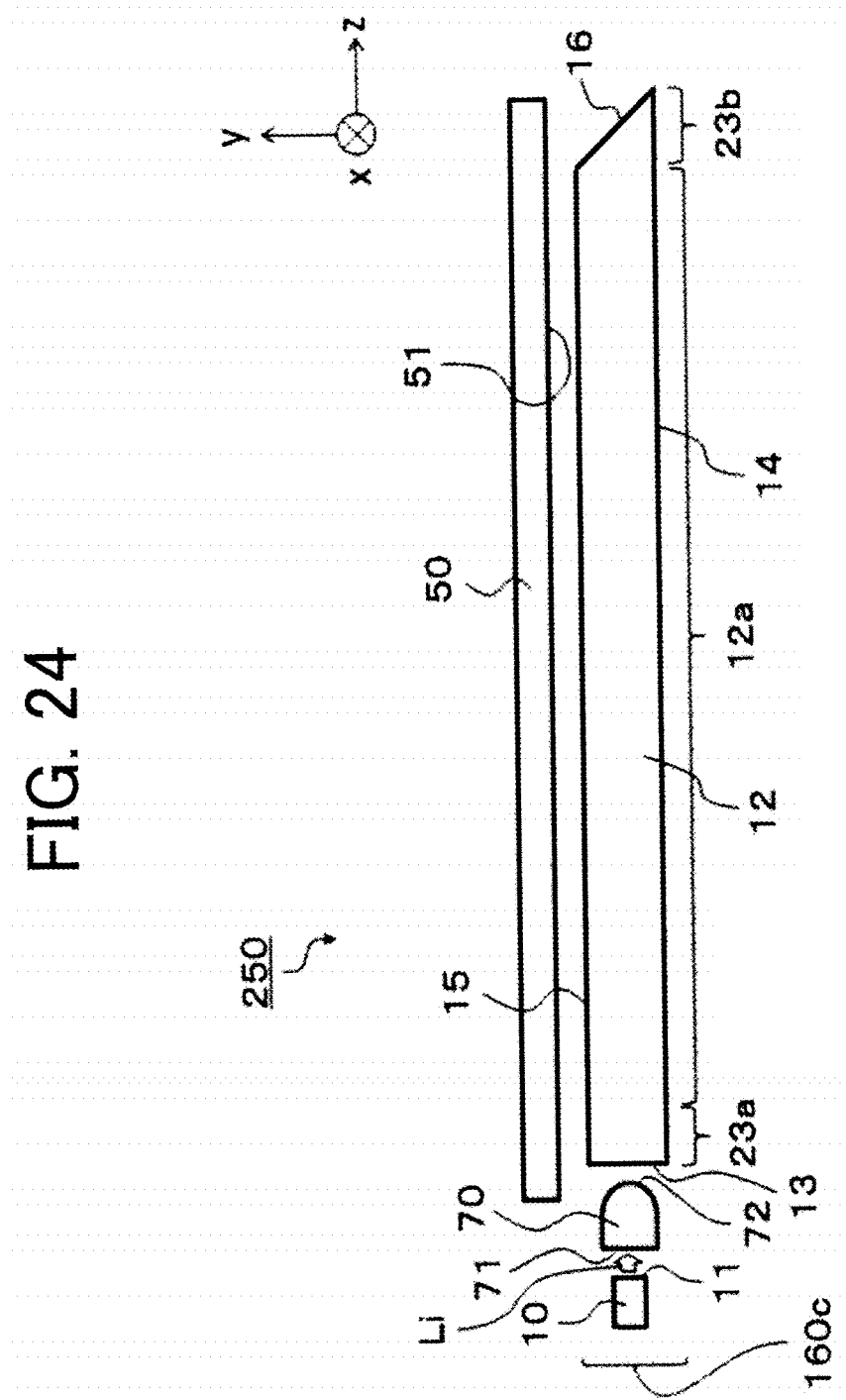
FIG. 24 is a configuration diagram showing a configuration of a lighting fixture according to the modification 5.

FIG. 24 is a configuration diagram showing a schematic configuration of another embodiment of the lighting fixture 250 according to the modification 5. Another embodiment of the lighting fixture 250 according to the modification 5 will be described below with reference to FIG. 24.

As shown in FIG. 24, the lighting fixture 250 may include a lens 70. The lens 70 is an example of the light condenser 60.

The lens 70 is a cylindrical lens, for example. In FIG. 24, the lens 70 has curvature on the yz plane. The lens 70 has curvature in the thickness direction of the diffusive body 12 in the plate-like shape. Further, the lens 70 does not have curvature on the zx plane. The cylindrical lens is a lens having a refracting surface in a cylindrical shape. Namely, the cylindrical lens has curvature in one direction (first direction) and does not have curvature in a direct ion (second direction) orthogonal to the former direction (first direction). Here, the first direction is the y-axis direction. The second direction is the x-axis direction.

The lens 70 may also be a toroidal lens, for example. The toroidal lens is a lens having a refracting surface in a shape formed by bending a cylindrical lens. The toroidal lens has curvature also in the second direction in addition to the first direction.

The lens 70 is arranged between the light emission surface 11 of the light source 10 and the incidence surface 13 of the diffusive body 12. The lens 70 condenses the incident light Li. The lens 70 is a condensing lens.

The lens 70 has an incidence surface 71 and an emission surface 72. At least one of the incidence surface 71 and the emission surface 72 has curvature. In FIG. 24, the emission surface 72 has curvature. The incidence surface 71 may also have curvature.

Controlling the curvatures of the incidence surface 71 and the emission surface 72 enables the lens 70 to increase the directivity of the light Li. The lens 70 may also be configured to condense the light Li on the incidence surface 13 of the diffusive body 12.

The lens 70 increases the directivity of the light Li emitted from, the light source 10. Further, the lens 70 condenses the light Li emitted from the light source 10 on the incidence surface 13 of the diffusive body 12. The lighting fixture 250 is capable of increasing the light amount of the light Li entering the diffusive body 12. Accordingly, the lighting fixture 250 increases the light utilization efficiency. The lens 70 increases the light utilization efficiency.
(Modification 6)

Figure 25:
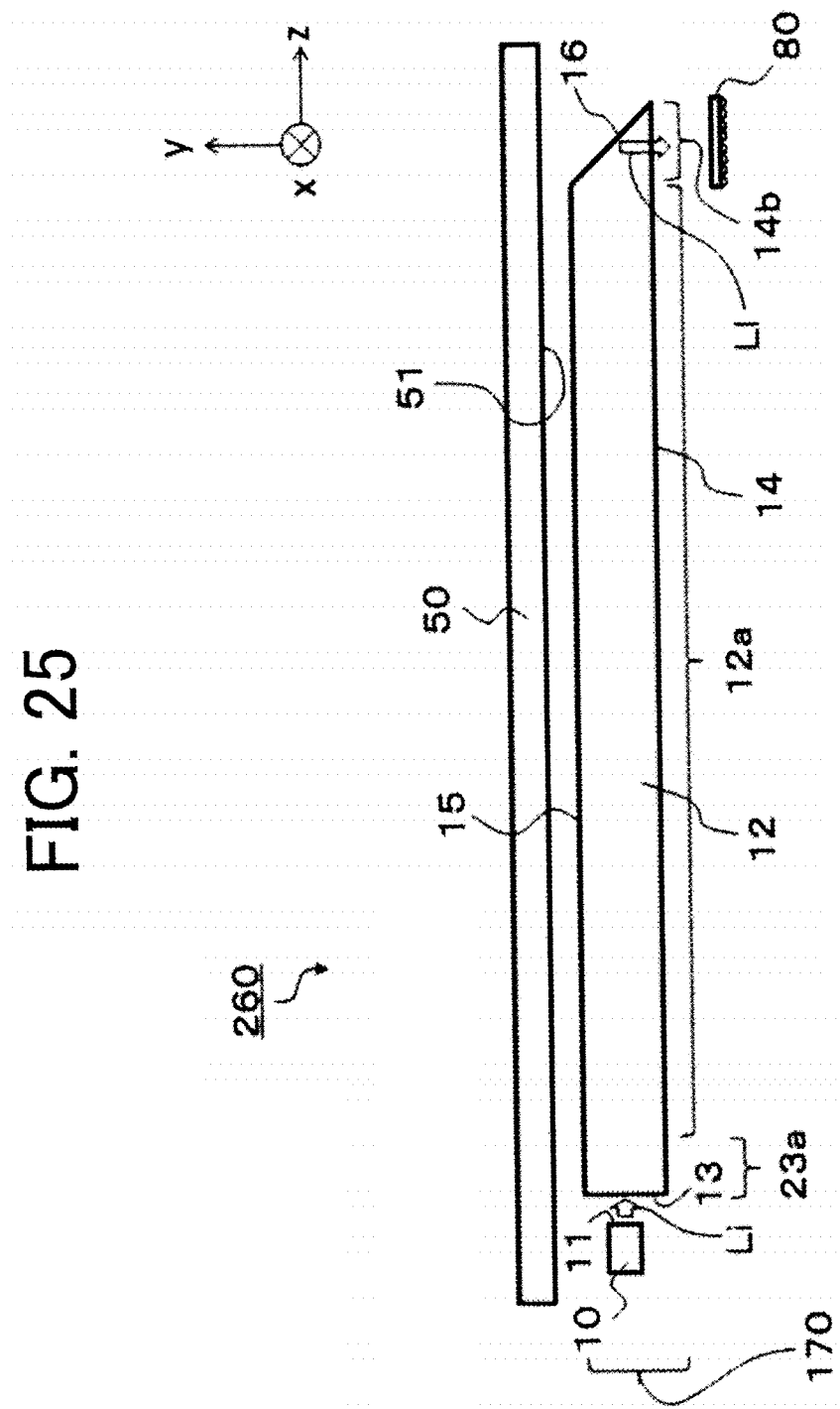
FIG. 25 is a configuration diagram showing a configuration of a lighting fixture according to a modification 6.

A lighting fixture 260 according to a modification 6 will be described below with reference to FIG. 25. FIG. 25 is a configuration diagram showing a schematic configuration of the lighting fixture 260 according to the modification 6.

In the lighting fixture 260 described in the modification 6, each component common to the lighting fixture 200, 210, 220, 230, 240 or 250 is assigned the same reference character as in the lighting fixture 200, 210, 220, 230, 240 or 250 and repeated explanation thereof is omitted.

As shown in FIG. 25, the lighting fixture 260 includes a light scatterer 80. In cases where the light scatterer 80 is a component separate from the diffusive body 12, the light scatterer 80 is an example of the aforementioned light scatterer 40 or 41.

The light scatterer 80 may also be formed in the diffusive body 12. The light scatterer 80 may be formed on the emission region 14b of the diffusive body 12. In this case, the light scatterer 80 is a light scattering part. Then, the light scatterer 80 differs from the light scatterers 40 and 41.

The following description will be given of the light scatterer 80. The description of the light scatterer 80 is substituted for a description of the light scattering part as part of the diffusive body 12.

The light scatterer 80 is provided for the region 14b of the diffusive body 12. In FIG. 25, the light scatterer 80 is arranged on the −y-axis side of the region 14b.

The light scatterer 80 diffuses the reflected light 11 emitted from the region 14b. The light scatterer 80 lets the reflected light Ll through diffusively. The light scatterer 80 has light diffusivity in the z-axis direction, for example. The light scatterer 80 is a lenticular lens, for example. The light scatterer 80 includes a lenticular lens, for example. The lenticular lens has curvature in the direction in which the light Lta, Ltb is guided in the diffusive body 12. The lenticular lens has curvature in the direction of the region 14a with respect to the light scatterer 80. The lenticular lens is a sheet having a surface on which minute semicylindrical shapes, each in a shape like a boiled fish paste called "kamaboko", are arranged.

Incidentally, the light scatterer 80 can have a light diffusive surface in an uneven shape, for example. The light scatterer 80 can include light diffusive particles that scatter the reflected light Ll passing through the light scatterer 80, for example.

Further, the aforementioned light scatterers 40 and 41 can also include a lenticular lens similarly to the light scatterer 80.

The light scatterer 80 may be manufactured as a separate component and attached to the diffusive body 12. The light scatterer 80 may be glued onto the emission region 14b. The light scatterer 80 may also be formed integrally with the diffusive body 12. For example, a lenticular lens may be formed in the emission region 14b. A light diffusive surface in an uneven shape may be formed in the emission region 14b. Light diffusive particles may be included in the emission region 14b. The light diffusive particles are included in the emission region 14b like a layer, for example. In these cases, the light scatterer 80 is a light scattering part.

The lighting fixture 260 is capable of enlarging the irradiation range of the illuminating light 11 by letting the illuminating light Ll through diffusively.
(Modification 7)

Figure 26:
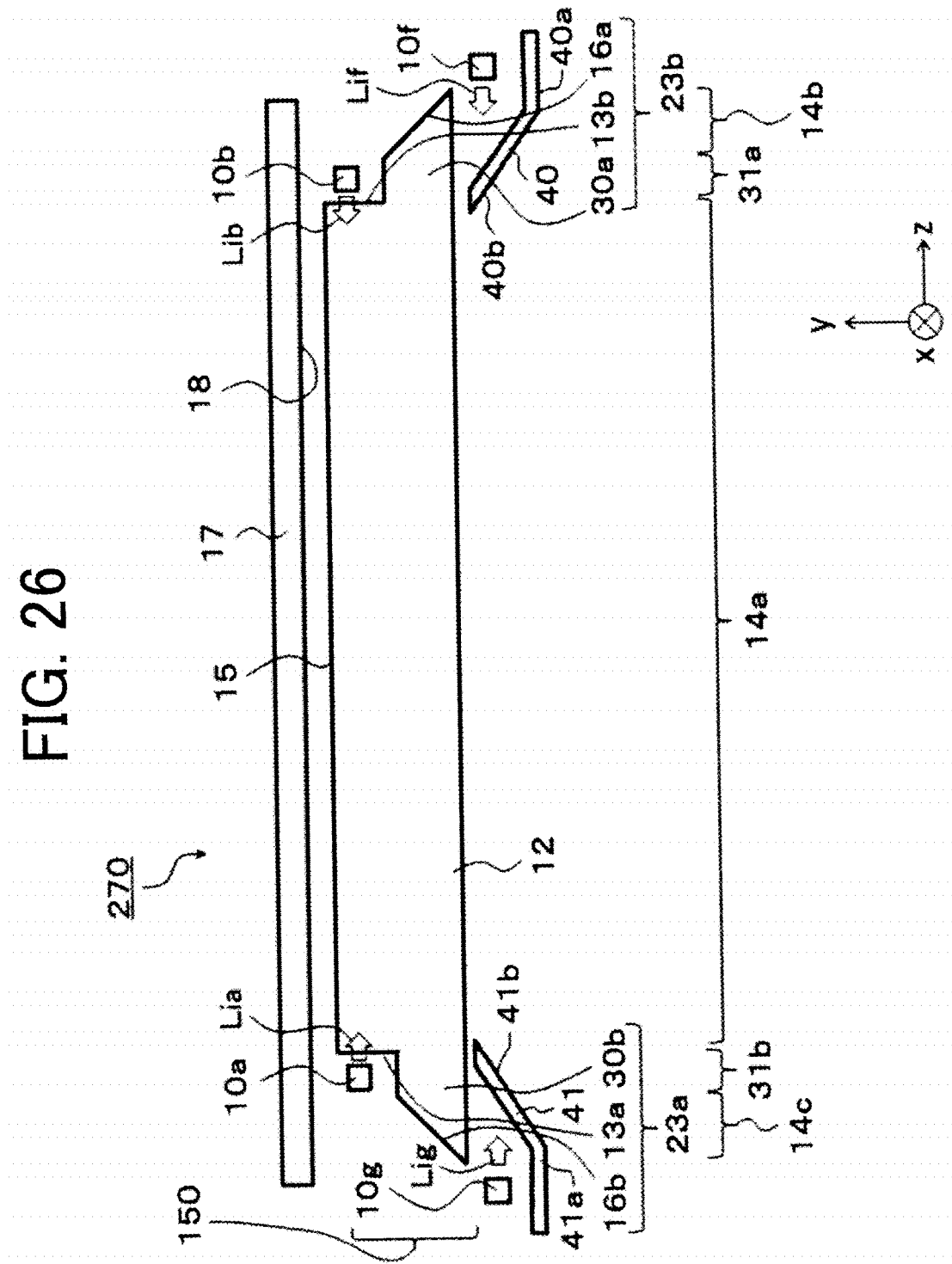
FIG. 26 is a configuration diagram showing a configuration of a lighting fixture according to a modification 7.

A lighting fixture 270 according to a modification 7 will be described below with reference to FIG. 26. FIG. 26 is a configuration diagram showing a schematic configuration of the lighting fixture 270 according to the modification 7.

In the lighting fixture 270 described in the modification 7, each component common to the lighting fixture 200, 210, 220, 230, 240, 250 or 260 is assigned the same reference character as in the lighting fixture 200, 210, 220, 230, 240, 250 or 260 and repeated explanation thereof is omitted Incidentally, the description in the modification 7 will be given by using a lighting unit 150 as an example.

As shown in FIG. 26, the lighting fixture 270 includes a light source 10f and a light source 10g. The light source 10f is arranged on the side of the region 14b of the diffusive body 12 with respect to the light scatterer 40. The light source 10f is arranged on the +z-axis side of the region 40b of the light scatterer 40. The light source 10g is arranged on the side of the region 14c of the diffusive body 12 with respect to the light scatterer 41. The light source 10g is arranged on the −z-axis side of the region 41b of the light scatterer 41.

The light source 10f emits light Lif towards the light scatterer 40. The light source 10f emits the light Lif towards the region 40b of the light scatterer 40, for example. The light Lif emitted from the light source 10f diffusively passes through the light scatterer 40.

The light source 10g emits light fig towards the light scatterer 41. The light source 10g emits the light Lig towards the region 41b of the light scatterer 41, for example. The light Lig emitted from the light source 10g diffusively passes through the light scatterer 41.

In FIG. 26, the region 40a scatters light at a large divergence angle included in the light Lif emitted from the light source 10f. The region 40b scatters light at a small divergence angle included in the light emitted from the light source 10f. The region 40a scatters light at a larger divergence angle than the light scattered by the region 40b included in the light Lif emitted from the light source 10f.

Similarly, the region 41a scatters light at a large divergence angle included in the light Lig emitted from the light source 10g. The region 41b scatters light at a small divergence angle included in the light Lig emitted from, the light source 10g. The region 41a scatters light at a larger divergence angle than the light scattered by the region 41b included in the light Lig emitted from the light source 10g.

The lighting fixture 270 is capable of increasing the light amounts of the light emitted from the light scatterers 40 and 41 by including the light source 10f and the light source 10g.

Further, the light source 10f, 10g is arranged between the light scatterer 40, 41 and the diffusive body 12. Then, the light source 10f, 10g is only required to apply the light Lif, Lig to the light scatterer 40, 41. Therefore the light source 10f, 10g is arranged close to the diffusive body 12. Further, the light source 10f, 10g is arranged close to the light scatterer 40, 41. Thus, the light sources 10f and 10g can be arranged to inhibit the increase in the thickness of the lighting unit 150.

(Modification 8)

Figure 27:
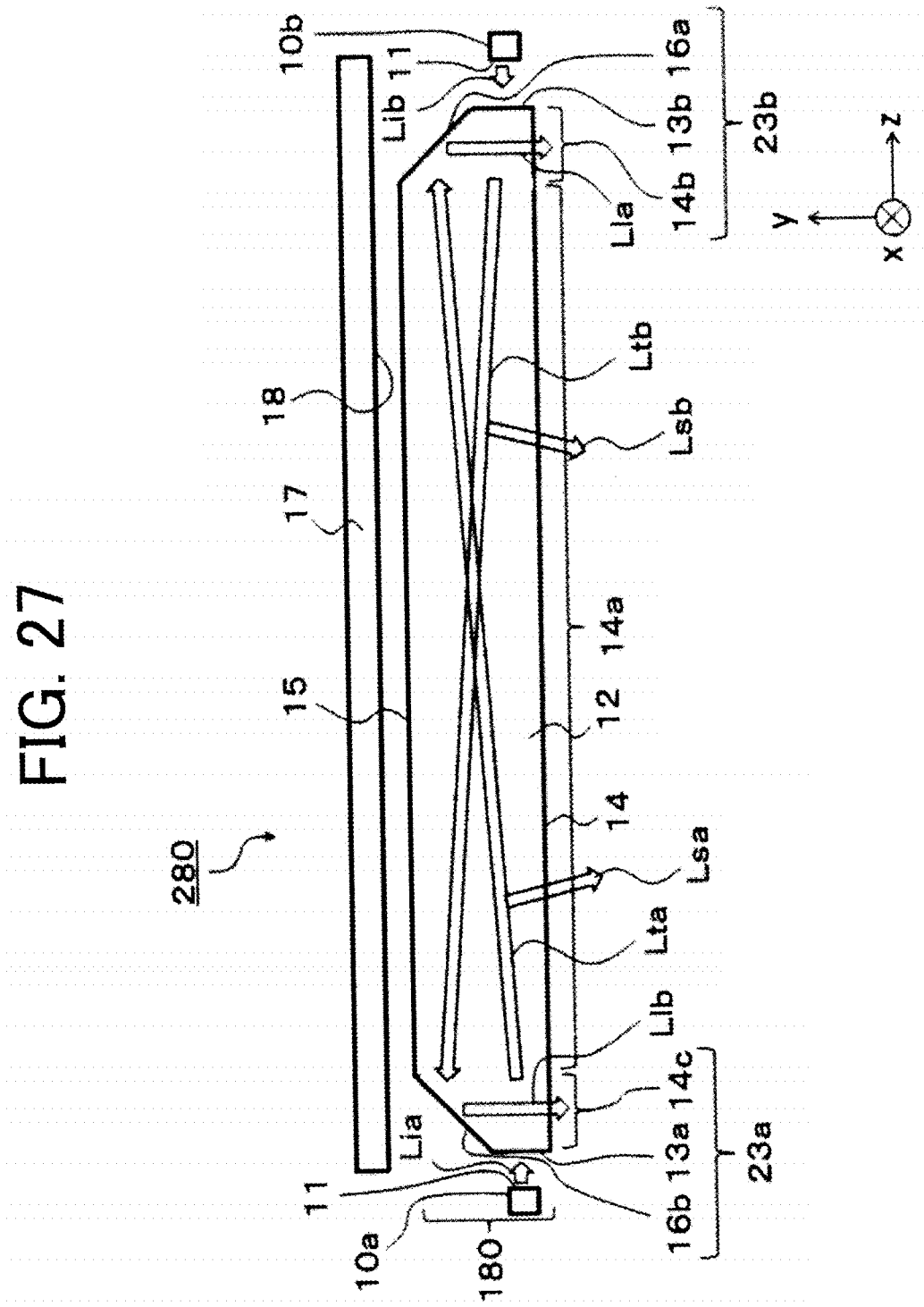
FIG. 27 is a configuration diagram showing a configuration of a lighting fixture according to a modification 8.

A modification 8 will be described below with reference to FIG. 27. In the modification 3, the reflecting surface 16a, 16b is situated on the emission surface 14 side with respect to the incidence surface 13b, 13a. In a lighting unit 180 of a lighting fixture 280 according to the modification 8, the reflecting surface 16a, 16b is situated on the back surface 15 side with respect to the incidence surface 13b, 13a. Put another way, the incidence surface 13b, 13a is situated on the emission surface 14 side with respect to the reflecting surface 16a, 16b. In regard to the other features, the description of the modification 3 is substituted for the description of the modification 8.

In cases where the lighting fixture includes the light guide part 30 as in the modification 3-2 (FIG. 16), the light guide part 30 is arranged on the diffusive part 12a side of the incidence surface 13. Put another way, the light guide part 30 is arranged between the incidence surface 13 and the diffusive part 12a.

In cases where the lighting fixture includes the light sources 10d as in the modification 3-3 (FIG. 17), the region 14b is situated between the region 14a and the region 31a. Further, the region 14c is situated between the region 14a and the region 31b.

In cases where the lighting fixture includes the light sources 10d and the light scatterers 40 and 41 as in the modification 3-4 (FIG. 19), the positions of the region 14b and the region 31a are reversed and the positions of the region 14c and the region 31b are reversed. Similarly, the positions of the emission of the reflected light Lla, Llb and the light Lld are reversed. Therefore, the reflected light Lla, Llb is applied to the region 40b, 41b, for example. The light Lld is applied to the region 40a, 41a.

(Modification 9)

A modification 9 will be described below with reference to FIG. 6, FIG. 28 and FIG. 29. In the modification 9, the light emission color of the light source 10 of the lighting fixture 200 is changed. FIG. 28 and FIG. 29 are diagrams showing the color of the light Li emitted by the light source 10 in regard to time slots in a day. FIG. 28 shows an example in which the lighting fixture 200 is arranged on a ceiling. FIG. 29 shows an example in which the lighting fixture 200 is arranged on a wall.

The light source 10 of the lighting fixture 200 shown in FIG. 6 includes LED elements 20 of a plurality of light emission colors, for example. As shown in FIG. 28 and FIG. 29, LED elements 20 that are lit up are changed depending on the time slot. In FIG. 28 and FIG. 29, a circle "○" represents lighting up, a triangle "Δ" represents lighting up with low current or extinction, and a cross "×" represents extinction. The light emission colors of the LED elements 20 are, for example, a white color of a low color temperature, a white color of a high color temperature, a green color and an orange color.

Here, the color temperature difference between the white color of the high color temperature and the white color of the low color temperature is 8800 K, for example. The correlated color temperature of the white color of the high color temperature is 14400 K, for example. The correlated color temperature of the white color of the high color temperature is higher than or equal to 11500 K, for example. Further, the correlated color temperature of the white color of the high color temperature is lower than or equal to 19000 K, or example. The correlated color temperature of the white color of the low color temperature is 5600 K, for example. The correlated color temperature of the white color of the low color temperature is higher than or equal to 5500 K, for example. Further, the correlated color temperature of the white color or the low color temperature is lower than or equal to 6050 K, for example.

In the time slot of early morning or nightfall, the light source 10 lights up the LED elements 20 of the white color of the high color temperature. Further, the light source 10 lights up the LED elements 20 of the white color of the low color temperature and the LED elements 20 of the green color with low current, or extinguishes these LED elements 20. In the case where the lighting fixture 200 is arranged on a ceiling, the light source 10 lights up the LED elements 20 of the orange color with low current, or extinguishes these LED elements 20. In the case where the lighting fixture 200 is arranged on a wall, the light source 10 lights up the LED elements 20 of the orange color. By this method, a sky tinged with red can be reproduced.

In the time slot of daytime, the light source 10 lights up the LED elements 20 of the white color of the low color temperature, the LED elements 20 of the white color of the high color temperature, and the LED elements 20 of the green color. Further, the light source 10 extinguishes the LED elements 20 of the orange color. By this method, a blue sky can be reproduced.

In the time slot of night, the light source 10 lights up the LED elements 20 of the white color of the high color temperature. Further, the light source 10 lights up the LED elements 20 of the white color of the low color temperature and the LED elements 20 of the green color with low current, or extinguishes these LED elements 20. Furthermore, the light source 10 extinguishes the LED elements 20 of the orange color. By this method, a sky in a moonlight night can be reproduced.

The lighting fixture 200 controls the light amounts of the LED elements 20 depending on the time slot in a day as shown in FIG. 28 and FIG. 29, which enables the observer to feel the change in the time of day even when the observer stays indoors.

(Modification 10)

A modification 10 will be described below with reference to FIG. 10A, FIG. 10B, FIG. 15, FIG. 30 and FIG. 31. In the modification 10, the light emission colors of the light sources 10a and 10b of the lighting fixture 220 or 230 are changed. FIG. 30 and FIG. 31 are diagrams showing the color of the light Li emitted by each light source 10a, 10b in regard to time slots in a day. FIG. 30 shows an example in which the lighting fixture 230 is arranged on a ceiling. FIG. 31 shows an example in which the lighting fixture 230 is arranged on a wall.

For example, the following description will be given by taking the lighting fixture 230 shown in FIG. 15 as an example. Each light source 10a, 10b of the lighting fixture 230 shown in FIG. 15 includes LED elements 20 of a plurality of light emission colors. As shown in FIG. 30 and FIG. 31, LED elements 20 that are lit up are changed depending on the time slot. In FIG. 30 and FIG. 31, a circle "○" represents lighting up, a triangle "Δ" represents lighting up with low current or extinction, and a cross "×" represents extinction. The light emission colors of the LED elements 20 are, for example, the white color of the low color temperature, the white color of the high color temperature, the green color and the orange color. In regard to the correlated color temperatures of the white color of the low color temperature and the white color of the high color temperature, the description in the modification 9 is substituted for the description in the modification 10.

In the time slot of early morning or nightfall, the light source 10a lights up the LED elements 20 of the white color of the high color temperature. Further, the light source 10a lights up the LED elements 20 of the white color of the low color temperature with low current, or extinguishes these LED elements 20. Furthermore, the light source 10a extinguishes the LED elements 20 of the green color. In the case where the lighting fixture 230 is arranged on a ceiling, the light source 10a lights up the LED elements 20 of the orange color with low current, or extinguishes these LED elements 20. In the case where the lighting fixture 230 is arranged on a wall, the light source 10a extinguishes the LED elements 20 of the orange color.

In the time slot of early morning or nightfall, the light source 10b lights up the LED elements 20 of the white color of the low color temperature with low current, or extinguishes these LED elements 20. Further, the light source 10b extinguishes the LED elements 20 of the green color. In the case where the lighting fixture 230 is arranged on a ceiling, the light source 10b lights up the LED elements 20 of the white color of the high color temperature. Further, the light source 10b lights up the LED elements 20 of the orange color with low current, or extinguishes these LED elements 20. In the case where the lighting fixture 230 is arranged on a wall, the light source 10b lights up the LED elements 20 of the white color of the high color temperature with low current, or extinguishes these LED elements 20. Further, the light source 10b lights up the LED elements 20 of the orange color.

By this method, a sky when the height of the sun is low can be expressed.

In the time slot of daytime, the light source 10a lights up LED elements 20 of the white color of the high color temperature, the LED elements 20 of the white color of the low color temperature, and the LED elements 20 of the green color. Further, the light source 10a extinguishes the LED elements 20 of the orange color.

In the time slot of daytime, the light source 10b lights up the LED elements 20 of the white color of the high color temperature, the LED elements 20 of the white color of the low color temperature, and the LED elements 20 of the green color. Further, the light source 10b extinguishes the LED elements 20 of the orange color.

By this method, a blue sky can be reproduced.

In the time slot of night, the light source 10a lights up the LED elements 20 of the white color of the high color temperature. Further, the light source 10a lights up the LED elements 20 of the white color of the low color temperature and the LED elements 20 of the green color with low current, or extinguishes these LED elements 20. Furthermore, the light source 10a extinguishes the LED elements 20 of the orange color.

In the time slot of night, the light source 10b lights up the LED elements 20 of the white color of the high color temperature. Further, the light source 10b lights up the LED elements 20 of the white color of the low color temperature and the LED elements 20 of the green color with low current, or extinguishes these LED elements 20. Furthermore, the light source 10b extinguishes the LED elements 20 of the orange color.

By this method, a sky in a moonlight night can be reproduced.

The lighting fixtures 220 and 230 control the light amounts of the LED elements 20 depending on the time slot in a day as shown in FIG. 30 and FIG. 31, which enables the observer to feel the change in the time of day even when the observer stays indoors.

Further, the light source 10c, the light source 10d, the light source 10f or the light source 10g may change its light emission color in conjunction with the change in the light emission colors of the light sources 10a and 10b. For example, the light Lic from the light source 10c is set in the orange color. In this case, the color of the light passing through the light scatterer 40 or 41 is orange. Then, the observer feels that light of the morning glow or evening glow is reflected from a window frame. Further, selecting a light source 10c to be lit up makes it possible to let the observer sense the position of the sun.

Furthermore, the light source 10c, the light source 10d, the light source 10f or the light source 10g may change the light amount of each LED element 20. In this case, the amount of light passing through changes depending on the position of the light scatterer 40, 41. Then, the observer feels that light reflected from a window frame is changing due to sunlight leaking in between trees and shining between leaves of the trees.

The light source 10c is the light source shown in FIG. 11 (modification 2-2) and FIG. 13 (modification 2-3). The light source 10d is the light source shown in FIG. 17 (modification 3-3) and FIG. 19 (modification 3-4). The light source 10f and the light source 10g are the light sources shown in FIG. 26 (modification 7).

(Modification 11)

Figure 32:
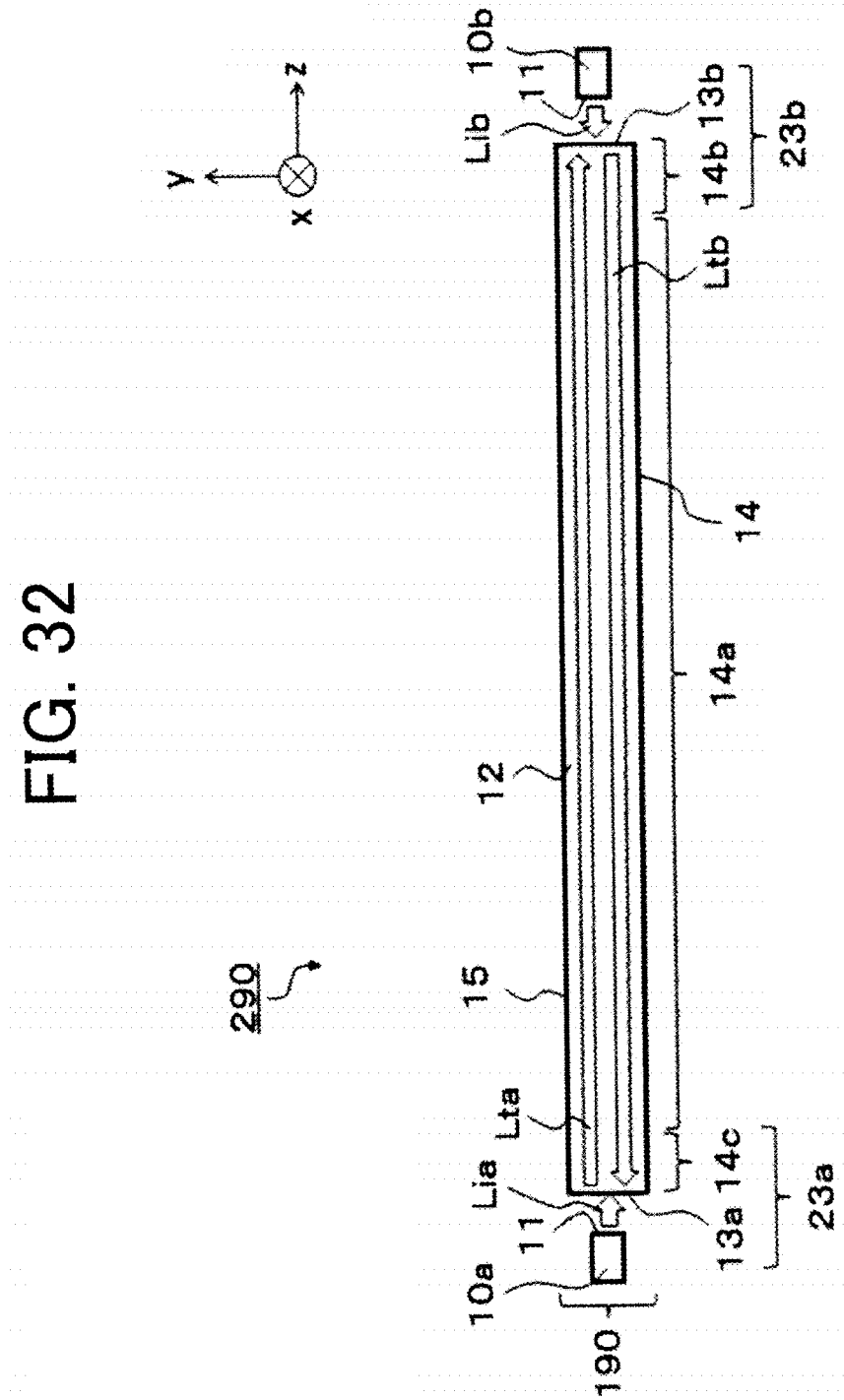
FIG. 32 is a configuration diagram showing a configuration of a lighting fixture according to a modification 11.

A lighting fixture 290 according to a modification 11 will be described below with reference to FIG. 32. FIG. 32 is a configuration diagram showing a schematic configuration of the lighting fixture 290 according to the modification 11.

In the lighting fixture 290 described in the modification 11, each component common to the lighting fixture 200, 210, 220, 230, 240, 250, 260, 270 or 280 is assigned the same reference character as in the lighting fixture 200, 210, 220, 230, 240, 250, 260, 270 or 280 and repeated explanation thereof is omitted.

Rayleigh scattering is one of scattering phenomena of Might as mentioned earlier. As explained with reference to the expression (1) and the expression (2), Rayleigh scattering occurs when the grain diameter d is smaller than the wavelength of light. Thus, in Rayleigh scattering, the probability that light is scattered becomes higher with the increase in the correlated color temperature of the light. Light at a high correlated color temperature is light of blue color, for example.

In order to implement a lighting fixture simulating a blue sky as a low-profile fixture, it is effective to make light enter the diffusive body causing Rayleigh scattering through an edge part of the diffusive body. The diffusive body includes nanoparticles. The light that entered the diffusive body through the edge part is guided in the diffusive body. Then, the diffusive body is capable of extracting light at a high correlated color temperature as the diffuse light by means of Rayleigh scattering.

However, in such a configuration, light at a high correlated color temperature is preferentially scattered while the light is guided. Accordingly, the correlated color temperature of the scattered light gradually lowers with the increase in the light guide distance. This is because the number of times of the scattering of light by the nanoparticles increases with the increase in the light guide distance. Put another way, as light is guided for a longer distance, the color of the scattered light changes from blue to red. This leads to color irregularity occurring on the emission surface of the diffusive body.

The modification 11 focuses on the haze value of the diffusive body 12 as a condition for increasing the light guide distance. The color irregularity on the emission surface of the diffusive body is reduced by appropriately setting the haze value of the diffusive body 12. The haze value is an index regarding transparency. The haze value is obtained from the ratio of diffusively transmitted light to all-rays transmitted light.

As shown in FIG. 32, the lighting fixture 290 has no reflecting surface 16 in the diffusive body 12. The lighting fixture 290 has the incidence surface 13b at the position of the reflecting surface 16 of the lighting fixture 200. Namely, the diffusive body 12 of the lighting fixture 290 has the incidence surface 13b on the surface opposing the incidence surface 13a. The diffusive body 12 of the lighting fixture 290 has the incidence surface 13a on the edge part 23a and the incidence surface 13b on the edge part 23b.

Here, the edge part 23b is an edge part where the light Lia that entered the diffusive body 12 through the incidence surface 13a on the edge part 23a reaches after being guided. The edge part 23a is an edge part where the light fib that entered the diffusive body 12 through the incidence surface 13b on the edge part 23b reaches after being guided. Each incidence surface 13a, 13b is formed on a side face of the plate-like shape, for example.

Incidentally, the light source 10 may also be arranged at only one of the edge part 23a and the edge part 23b of the diffusive body 12. Namely, the light source 10 is arranged at least at one of the edge part 23a and the edge part 23b of the diffusive body 12.

The haze value H [%] of the diffusive body 12 is within the range of the following expression (3). Incidentally, the haze value H [%] is defined by the following expression (4). The power [W] of scattered light means the power W of light scattered by the diffusive body 12 and emitted from the emission surface 14 when collimated light is made to enter the diffusive body 12 through the back surface 15. In contrast, the power [W] of transmitted light of all rays means the power [H] of the whole of light emitted from the emission surface 14 of the diffusive body 12 when collimated light is made to enter the diffusive body 12 through the back surface 15.

$$0.005\ [\%] \leq H \leq 30\ [\%] \qquad (3)$$

$$H\ [\%] = 100 \times \frac{\text{power } [W] \text{ of scattered light}}{\text{power } [W] \text{ of transmitted light of all rays}} \qquad (4)$$

When the haze value H [%] of the diffusive body 12 is within the range of the expression (3), the color irregularity on the emission surface 14 is reduced.

The lighting fixture 290 according to the modification 11 can include the light absorber 17 included in the lighting fixture 200. The light absorber 17 absorbs light. The light absorber 17 is arranged on a side opposite to the region 14a with respect to the diffusive body 12. The light absorber 17 is arranged on a side opposite to the emission surface 14 with respect to the diffusive body 12. The light absorber 17 is arranged on the back surface 15 side with respect to the diffusive body 12.

The lighting fixture 290 according to the modification 11 can include lighting units 190 overlaid on each other similarly to the lighting fixture 210 according to the modification 1. A plurality of lighting units 190 is arranged with their diffusive bodies 12 overlaid on each other and with their emission regions 14a facing the same direction. The lighting fixture 290 emits scattered light Lsa and Lsb emitted from the plurality of lighting units 190 in superimposition with each other. Light Lta and light Ltb respectively in the lighting units 190 overlaid on each other as a set are guided in different directions.

The lighting unit 190 according to the modification 11 can include the light source 10c according to the modification 2-2 (FIG. 11).

The lighting unit 190 includes no reflecting surface 16. Accordingly, the lighting unit 190 is incapable of emitting the illuminating light Ll. Therefore, the lighting unit 190 can include the light source 10c. The light source 10c is only required to apply the light Lic to the edge part 23a or 23c. Therefore, the light source 10c is arranged close to the diffusive body 12. Thus, the light source 10c can be arranged to inhibit the increase in the thickness of the lighting unit 190.

The diffusive body 12 includes the region 14b and the region 14c on the same side as the region 14a. The emission surface 14 of the diffusive body 12 includes the region 14b and the region 14c. The region 14b is formed in the edge part 23b where the light Lta guided through the diffusive part 12a reaches. The region 14b is formed in the edge part 23b including the incidence surface 13b. The region 14c is formed in the edge part 23a where the light Ltb guided through the diffusive part 12a reaches. The region 14c is formed in the edge part 23a including the incidence surface 13a.

The light source 10c emits the light Lic. The light source 10c makes the light Lic enter the diffusive body 12 through a region on the back surface 15 side facing the region 14b. The light source 10c makes the light Lic enter the diffusive body 12 through a region on the back surface 15 side facing the region 14c. The light Lic is emitted after passing through the edge part 23a where the light source 10c made the light Lic enter. The light Lic is emitted after passing through the edge part 23b where the light source 10c made the light Lic enter. The light Lic is emitted from, the region 14c in the edge part 23a where the light source 10c made the light Lic enter. The light Lic is emitted from the region 14b in the edge part 23b where the light source 10c made the light Lic enter.

The lighting fixture 290 according to the modification 11 can include the light scatterers 40 and 41 according to the modification 2-3 (FIG. 12). Each light scatterer 40, 41 lets through and scatters the light Lic. The light scatterer 40 is arranged to cover the region 14b. The light scatterer 41 is arranged to cover the region 14c. Each light scatterer 40, 41 includes a lenticular lens. The lenticular lens has curvature in the direction in which the light Lta, Ltb is guided in the diffusive body 12. The lenticular lens has curvature in the direction of the region 14a with respect to the light scatterer 40, 41.

The lighting fixture 290 according to the modification 11 can include the light source 10e according to the modification 2-4 (FIG. 14). The light source 10e is provided between the diffusive body 12 and the light absorber 17. The light source 10e emits the light Lie towards the diffusive body 12.

The lighting fixture 290 according to the modification 11 can include the light reflector 50 according to the modification 4 (FIG. 21). The light reflector 50 reflects light. The light reflector 50 is arranged on a side opposite to the region 14a with respect to the diffusive body 12. The light reflector 50 is arranged on a side opposite to the emission surface 14 with respect to the diffusive body 12. The light reflector 50 is arranged on the back surface 15 side with respect to the diffusive body 12. The light reflector 50 diffusively reflects light, for example.

The lighting unit 190 according to the modification 11 can include the light condenser 60 according to the modification 5 (FIG. 22, FIG. 23 and FIG. 24). The light condenser 60 includes the light guide body 64 and the lens 70. The lighting unit 190 includes the light condenser 60 provided between the light emission surface 11 of the light source 10a and the incidence surface 13a. The light condenser 60 condenses the light Lia towards the incidence surface 13a The lighting unit 190 includes the light condenser 60 provided between the light emission surface 11 of the light source 10b and the incidence surface 13b. The light condenser 60 condenses the light Lib towards the incidence surface 13b. The light condenser 60 is the light guide body 64 that guides the light Lie or Lib. The light condenser 60 is the lens 70. The diffusive body 12 is in a plate-like shape having two surfaces facing each other and connected to each other by a side face. Each incidence surface 13a, 13b is formed on a side face of the plate-like shape. The lens 70 is a cylindrical lens having curvature in the thickness direction of the plate-like shape.

The lighting unit 190 according to the modification 11 can include the light scatterer 80 according to the modification 6 (FIG. 25). The lighting unit 190 includes the light part scatterer 80 that lets through and scatters the light Lic on at least one of the region 14b and the region 14c. The light scatterer 80 includes a lenticular lens having curvature in the direction in which the light Lta, Ltb is guided in the diffusive body 12. The lenticular lens has curvature in the direction of the region 14a with respect to the light scatterer 80. Further, the lighting fixture 290 according to the modification 11 can include the light scatterer 80 according to the modification 6. The lighting fixture 290 includes the light scatterer 80 that lets through and scatters the light Lic at least on the region 14b side or the region 14c side with respect to the diffusive body 12. The light scatterer 80 is an example of the light scatterer 40 or 41.

The lighting unit 190 according to the modification 11 can include at least one of the light source 10f and the light source 10g according to the modification 7 (FIG. 26). The light source 10f is arranged on the side where the light scatterer 40 is arranged with respect to the diffusive body 12, and specifically, on the edge part 23b side with respect to the diffusive body 12. The light source 10g is arranged on the side where the light scatterer 41 is arranged with respect to the diffusive body 12, and specifically, on the edge part 23a side with respect to the diffusive body 12. The lighting unit 190 includes the light source 10f that emits the light Lif. The lighting unit 190 includes the light source 10g that emits the light Lig. The light source 10f emits the light Lif towards the light scatterer 40. The light source 10f emits the light Lif towards the region 40b. The light source 10g emits the light Lig towards the light scatterer 41. The light source log emits the light Lig towards the region 41b. The light Lif passes through the light scatterer 40. The light Lif passes through the region 40b. The light Lig passes through the light scatterer 41. The light Lig passes through the region 41b.

The lighting unit 190 includes no reflecting surface 16. Accordingly, the lighting unit 190 is incapable of emitting the illuminating light Ll. Therefore, the lighting unit 190 can include the light source 10f or 10g. The light source 10f, 10g is arranged between the light scatterer 40, 41 and the diffusive body 12. Then, the light source 10f, 10g is only required to apply the light Lif, Lig to the light scatterer 40, 41. Therefore, the light source 10f, 10g is arranged close to the diffusive body 12. Further, the light source 10f, 10g is arranged close to the light scatterer 40, 41. Thus, the light source 10f, 10g can be arranged to inhibit the increase in the thickness of the lighting unit 190.

The lighting unit 190 according to the modification 11 is capable of changing the Might emission color of the light sources 10a, 10b, 10c, 10f and 10g similarly to the modification 9 and the modification 10. The light source 10a, 10b, 10c, 10f, 10g emits the light Lia, Lib, Lic, Lif, Lig of a plurality of different colors, and changes the ratio among the light amounts of the light Lia, Lib, Lic, Lif, Lig of the different colors depending on the time of day. The light Lia, Lib, Lic, Lif, Lig of the different colors include light Liwh of white color, light Ligr of green color and light Lior of orange color. The light Liwh of white color includes light $Liwh_1$ of white color and light $Liwh_2$ of white color. The correlated color temperature of the light $Liwh_1$ of white color is higher than the correlated color temperature of the light $Liwh_2$ of white color.

The lighting fixture 290 controls the light amounts of the LED elements 20 depending on the time slot in a day, which enables the observer to feel the change in the time of day even when the observer stays indoors.

Incidentally, terms indication positional relationship between components or the shape of a component, such as "parallel" or "orthogonal", may have been used in the above embodiments. These terms are intended to include a range allowing for tolerances in the manufacture, variations in the assembly, or the like. Therefore, when a description indicating positional relationship between components or the shape of a component is included in the claims, such a description is intended to include a range allowing for tolerances in the manufacture, variations in the assembly, or the like.

Further, while embodiments of the present invention have been described as above, the present invention is not limited to these embodiments.

Based on the above embodiments, the contents of the present invention will be described below as appendix (1), appendix (2), appendix (3) and appendix (4). Reference characters are assigned to each of appendix (1), appendix (2), appendix (3) and appendix (4) independently of each other. Accordingly, "appendix 1" exists in both of appendix (1) and appendix (2), for example.

Further, features in appendix (1), features in appendix (2), features in appendix (3) and features in appendix (4) can be appropriately combined with each other.

(Appendix (1))

(Appendix 1)

A lighting unit comprising:

a light source to emit first light; and a diffusive body that includes nanoparticles, lets the first light enter through an incidence surface, guides the entered first light by means of total reflection, makes the guided first light be scattered by the nanoparticles, and thereby emits second light at a correlated color temperature higher than a correlated color temperature of the first light from a first emission region, wherein the diffusive body includes a reflecting surface that reflects third light that has been guided without being scattered by the nanoparticles towards a direction in which the second light is emitted.

(Appendix 2)

The lighting unit according to appendix 1, wherein the third light is emitted from a second emission region different from the first emission region.

(Appendix 3)

The lighting unit according to appendix 1, wherein the diffusive body is in a plate-like shape having two surfaces facing each other and connected to each other by a side face.

(Appendix 4)

The lighting unit according to appendix 1, wherein the first emission region is formed on one surface.

(Appendix 5)

The lighting unit according to appendix 2, wherein the second emission region is formed on one surface.

(Appendix 6)

The lighting unit according to appendix 5, wherein the second emission region is a region different from the first emission region.

(Appendix 7)

The lighting unit according to any one of appendixes 1 to 6, comprising a light absorber that is arranged on a side opposite to the first emission region with respect to the diffusive body and absorbs the second light.

(Appendix 8)

A lighting fixture comprising a plurality of lighting units according to any one of appendixes 1 to 6, wherein the plurality of lighting units is arranged with the diffusive bodies overlaid on each other so that directions of the emission of the second light are the same direction, and the second light emitted from the plurality of lighting units is emitted in superimposition with each other.

(Appendix 9)

The lighting fixture according to appendix 8, comprising a light absorber that is arranged on a side opposite to the first emission region of a back side diffusive body with respect to the back side diffusive body and absorbs the second light, the back side diffusive body being a diffusive body arranged most on a side opposite to the direction of the emission of the second light in the plurality of lighting units.

(Appendix (2))

(Appendix 1)

A lighting unit comprising:

a first light source to emit first light; and a diffusive body including a first incidence surface that allows the first light to enter, a diffusive part that includes nanoparticles, guides the entered first light and makes the first light be scattered by the nanoparticles into first scattered light, and a first reflecting surface that reflects the first light guided without being scattered by the nanoparticles into first reflected light, wherein the first incidence surface is formed on a first edge part of the diffusive part, the first reflecting surface is formed in a second edge part where the first light guided through the diffusive part reaches, the first scattered light is emitted from a first emission region, the first reflected light is emitted from a second emission region different from the first emission region, and a correlated color temperature of the first scattered light is higher than a correlated color temperature of the first light.

(Appendix 2)

The lighting unit according to appendix 1, wherein the first emission region is formed in the diffusive part.

(Appendix 3)

The lighting unit according to appendix 1 or 2, wherein the second emission region is formed in the second edge part.

(Appendix 4)

The lighting unit according to any one of appendixes 1 to 3, wherein the first light is guided by means of total reflection.

(Appendix 5)

The lighting unit according to any one of appendixes 1 to 4, wherein the diffusive body is in a plate-like shape having two surfaces facing each other and connected to each other by a side face.

(Appendix 6)

The lighting unit according to appendix 5, wherein the first edge part and the second edge part include the side face.

(Appendix 7)

The lighting unit according to appendix 5 or 6, wherein the first emission region is formed on one or the surfaces.

(Appendix 8)

The lighting unit according to appendix 7, wherein the second emission region is formed on the one of the surfaces.

(Appendix 9)

The lighting unit according to any one of appendixes 1 to 4, comprising a second light source to emit second light, wherein the diffusive body includes a second incidence surface that is formed on the second edge part and lets the second light enter and a second reflecting surface that is formed in the first edge part and reflects the second light guided in the diffusive part without being scattered by the nanoparticles into second reflected light, the second reflected light is emitted from a third emission region that is different from the first emission region and the second emission region, the diffusive part guides the entered second light and makes the second light be scattered by the nanoparticles into second scattered light, the second scattered light is emitted from the first emission region, and a correlated color temperature of the second scattered light is higher than a correlated color temperature of the second light.

(Appendix 10)

The lighting unit according to appendix 9, wherein the third emission region is formed in the first edge part.

(Appendix 11)

The lighting unit according to appendix 9 or 10, wherein the second light is guided by means of total reflection.

(Appendix 12)

The lighting unit according to any one of appendixes 9 to 11, wherein the diffusive body is in a plate-like shape having two surfaces facing each other and connected to each other by a side face, one of the surfaces is an emission surface where the first emission region is formed, and the other of the surfaces is a back surface.

(Appendix 13)

The lighting unit according to appendix 12, wherein the first edge part and the second edge part include the side face.

(Appendix 14)

The lighting unit according to appendix 12 or 13, wherein the second emission region is formed on the emission surface.

(Appendix 15)

The lighting unit according to any one of appendixes 12 to 14, wherein the third emission region is formed on the emission surface.

(Appendix 16)

The lighting unit according to any one of appendixes 12 to 15, wherein the first incidence surface and the second reflecting surface are arranged in the first edge part at different positions in a direction orthogonal to thickness of the plate-like shape, and the second incidence surface and the first reflecting surface are arranged in the second edge part at different positions in a direction orthogonal to the thickness of the plate-like shape.

(Appendix 17)

The lighting unit according to appendix 16, wherein the first incidence surface and the second reflecting surface are arranged to be adjacent to each other, and the second incidence surface and the first reflecting surface are arranged to be adjacent to each other.

(Appendix 18)

The lighting unit according to appendix 16 or 17, wherein the first reflecting surface is arranged to oppose the first incidence surface, and the second reflecting surface is arranged to oppose the second incidence surface.

(Appendix 19)

The lighting unit according to any one of appendixes 16 to 18, comprising a third light source to emit third light, wherein the third light source makes the third light enter through at least one of a region on the back surface facing the second emission region formed in the first edge part and a region on the back surface facing the third emission region formed in the second edge part.

(Appendix 20)

The lighting unit according to appendix 19, wherein the third light is emitted after passing through the first edge part or the second edge part where the third light source made the third light enter.

(Appendix 21)

The lighting unit according to appendix 19 or 20, wherein the third light is emitted from the Third emission region in the first edge part where the third light source made the third light enter or the second emission region in the second edge part where the third light source made the third light enter.

(Appendix 22)

The lighting unit according to any one of appendixes 9 to 15, wherein the first reflecting surface is situated on a side of the second emission region formed in the second edge part compared to the second incidence surface in the second edge part, and the second reflecting surface is situated on a side of the third emission region formed in the first edge part compared to the first incidence surface in the first edge part.

(Appendix 23)

The lighting unit according to appendix 22, corner using at least one of a first light guide part that is situated between the first reflecting surface and the diffusive part and guides the first light guided in the diffusive part without being scattered by the nanoparticles to the first reflecting surface and a second light guide part that is situated between the second reflecting surface and the diffusive part and guides the second light guided in the diffusive part without being scattered by the nanoparticles to the second reflecting surface.

(Appendix 24)

The lighting unit according to appendix 23, wherein the first light guide part is included in the second edge part, and the second light guide part is included in the first edge part.

(Appendix 25)

The lighting unit according to appendix 23 or 24, comprising a fourth light source to emit fourth light, wherein the fourth light source is arranged at least on the second light source side with respect to the first light guide part or on the first light source side with respect to the second light guide part.

(Appendix 26)

The lighting unit according to appendix 25, wherein the first light guide part includes a fourth emission region on the same side in the second edge part as the side where the second emission region is formed for the first reflecting surface, the second light guide part includes a fifth emission region on the same side in the first edge part as the side where the third emission region is formed for the second reflecting surface, and the fourth light passes through the first light guide part provided with the fourth light source and is emitted from the fourth emission region, or passes through the second light guide part provided with the fourth light source and is emitted from the fifth emission region.

(Appendix 27)

A lighting fixture comprising:

the lighting unit according to any one of appendixes 1 to 26; and a light absorber that absorbs light, wherein the light absorber is arranged on a side opposite to the first emission region with respect to the diffusive body.

(Appendix 26)

The lighting fixture according to appendix 27, comprising a fifth light source provided between the diffusive body and the light absorber, wherein the fifth light source emits fifth light towards the diffusive body.

(Appendix 29)

A lighting fixture comprising:

the lighting unit according to any one of appendixes 1 to 8; and a first light scatterer that lets through and scatters the first reflected light.

(Appendix 30)

The lighting fixture according to appendix 29, wherein the first light scatterer is arranged to cover the second emission region.

(Appendix 31)

A lighting fixture comprising:

the lighting unit according to any one of appendixes 9 to 26; and a second light scatterer that lets through and scatters the second reflected light.

(Appendix 32)

The lighting fixture according to appendix 29, wherein the second light scatterer is arranged to cover the third emission region.

(Appendix 33)

A lighting fixture comprising:

the lighting unit according to any one of appendixes 19 to 21; and a third light scatterer that lets through and scatters the third light.

(Appendix 34)

A lighting fixture comprising:

the lighting unit according to appendix 25 or 26; and a fourth light scatterer that lets through and scatters the fourth light.

(Appendix 35)

A lighting fixture comprising a plurality of lighting units according to any one of appendixes 1 to 8, wherein the plurality of lighting units is arranged with the diffusive bodies overlaid on each other and with the first emission regions facing the same direction, and the first scattered light emitted from the plurality of lighting units is emitted in superimposition with each other.

(Appendix 36)

A lighting fixture comprising a plurality of lighting units according to any one of appendixes 9 to 26, wherein the plurality of lighting units is arranged with the diffusive bodies overlaid on each other and with the first emission regions facing the same direction, and the first scattered light and the second scattered light emitted from the plurality of lighting units are emitted in superimposition with each other.

(Appendix (3))

(Appendix 1)

A lighting unit comprising:

a first light source to emit first light from a first light emission surface; and a diffusive body including a first incidence surface that allows the first light to enter, a diffusive part that includes nanoparticles, guides the entered first light and makes the first light be scattered by the nanoparticles into first scattered light, and a first reflecting surface that reflects the first light guided without being scattered by the nanoparticles into first reflected light, wherein the first incidence surface is formed on a first edge part of the diffusive body, the first reflecting surface is formed in a second edge part where the first light guided through the diffusive part reaches, the first scattered light is emitted from a first emission region, the first reflected light is emitted from a second emission region different from the first emission region, and a correlated color temperature of the first scattered light is higher than a correlated color temperature of the first light.

(Appendix 2)

The lighting unit according to appendix 1, wherein the first emission region is formed in the diffusive part.

(Appendix 3)

The lighting unit according to appendix 1 or 2, wherein the second emission region is formed in the second edge part.

(Appendix 4)

The lighting unit according to any one of appendixes 1 to 3, wherein the first light is guided by means of total reflection.

(Appendix 5)

The lighting unit according to any one of appendixes 1 to 4, wherein the first light source emits the first light of a plurality of different colors and changes ratio among light amounts of the first light of the different colors depending on a time of day.

(Appendix 6)

The lighting unit according to appendix 5, wherein the first light of the different colors includes light of white color, light of green color and light of orange color.

(Appendix 7)

The lighting unit according to appendix 6, wherein the light of white color includes light of first white color and light of second white color whose correlated color temperature is lower than that of the light of the first white color.

(Appendix 8)

The lighting unit according to any one of appendixes 1 to 7, comprising a first light scattering part, for letting through and scattering the first reflected light, on the second emission region.

(Appendix 9)

The lighting unit according to appendix 8, wherein the first light scattering part includes a lenticular lens having curvature in a direction in which the first light is guided in the diffusive body.

(Appendix 10)

The lighting unit according to any one of appendixes 1 to 9, comprising a light condenser, for condensing the first light towards the first incidence surface, provided between the first light emission surface and the first incidence surface.

(Appendix 11)

The lighting unit according to appendix 10, wherein the light condenser is a light guide body that guides the first light.

(Appendix 12)

The lighting unit according to appendix 10, wherein the light condenser is a lens.

(Appendix 13)
The lighting unit according to appendix 12, wherein the diffusive body is in a plate-like shape having two surfaces facing each other and connected to each other by a side race,
the first incidence surface is formed on the side face, and
the lens is a cylindrical lens having curvature in a thickness direction of the plate-like shape.

(Appendix 14)
The lighting unit according to any one of appendixes 1 to 13, wherein the diffusive body is in a plate-like shape having two surfaces facing each other and connected to each other by a side face.

(Appendix 15)
The lighting unit according to appendix 14, wherein the first edge part and the second edge part include the side face.

(Appendix 16)
The lighting unit according to appendix 14 or 15, wherein the first incidence surface is formed on the side face.

(Appendix 17)
The lighting unit according to any one of appendixes 14 to 16, wherein the first emission region is formed on one of the surfaces.

(Appendix 18)
The lighting unit according to appendix 17, wherein the second emission region is formed on the one of the surfaces.

(Appendix 19)
The lighting unit according to appendix 17 or 18, wherein the other of the surfaces is a back surface.

(Appendix 20)
The lighting unit according to any one of appendixes 13 to 19, wherein a haze value in the thickness direction of the plate-like shape is larger than or equal to 0.005 and smaller than or equal to 30, the haze value being a value obtained by multiplying power of scattered light by 100 to obtain a product and dividing the product by power of whole transmitted light.

(Appendix 21)
The lighting unit according to any one of appendixes 1 to 20, comprising a second light source to emit second light from a second light emission surface, wherein
the diffusive body includes a second incidence surface that is formed on the second edge part and lets the second light enter and a second reflecting surface that is formed in the first edge part and reflects the second light guided in the diffusive part without being scattered by the nanoparticles into second reflected light,
the second reflected light is emitted from, a third emission region that is different from, the first emission region and the second emission region,
the diffusive part guides the entered second light and makes the second light be scattered by the nanoparticles into second scattered light,
the second scattered light is emitted from the first emission region, and
a correlated color temperature of the second scattered light is higher than a correlated color temperature of the second light.

(Appendix 22)
The lighting unit according to appendix 21, wherein the third emission region is formed in the first edge part.

(Appendix 23)
The lighting unit according to appendix 21 or 22, wherein the second light is guided by means of total reflection.

(Appendix 24)
The lighting unit according to any one of appendixes 21 to 23, wherein the second light source emits the second light of a plurality of different colors and changes ratio among light amounts of the second light of the different colors depending on a time of day.

(Appendix 25)
The lighting unit according to appendix 24, wherein the second light of the different colors includes light of white color, light of green color and light of orange color.

(Appendix 26)
The lighting unit according to appendix 25, wherein the light of white color includes light of third white color and light of fourth white color whose correlated color temperature is lower than that of the light of the third white color.

(Appendix 27)
The lighting unit according to any one of appendixes 21 to 26, comprising a second light scattering part, for letting through and scattering the second reflected light, on the third emission region.

(Appendix 28)
The lighting unit according to appendix 27, wherein the second light scattering part includes a lenticular lens having curvature in a direction in which the second light is guided in the diffusive body.

(Appendix 29)
The lighting unit according to any one of appendixes 21 to 28, comprising a light condenser, for condensing the second light towards the second incidence surface, provided between the second light emission surface and the second incidence surface.

(Appendix 30)
The lighting unit according to appendix 29, wherein the light condenser is a light guide body that guides the second light.

(Appendix 31)
The lighting unit according to appendix 29, wherein the light condenser is a lens.

(Appendix 32)
The lighting unit according to appendix 31, wherein
the diffusive body is in a plate-like shape having two surfaces facing each other and connected to each other by a side face,
the second incidence surface is formed on the side face, and
the lens is a cylindrical lens having curvature in a thickness direction of the plate-like shape.

(Appendix 33)
The lighting unit according to any one of appendixes 21 to 32, wherein
the diffusive body is in a plate-like shape having two surfaces facing each other and connected to each other by a side face,
the first incidence surface is formed on the side face, and the second incidence surface is formed on a part of the side face different from the first incidence surface.

(Appendix 34)
The lighting unit according to appendix 32 or 33, wherein
the diffusive body is in the plate-like shape having the two surfaces facing each other and connected to each other by the side face, and
the third emission region is formed on a side of the same surface as the first emission region.

(Appendix 35)
The lighting unit according to any one of appendixes 32 to 34, wherein
the first incidence surface and the second reflecting surface are arranged in the first edge part at different positions in a direction orthogonal to thickness of the plate-like shape, and the second incidence surface and the first reflecting surface are arranged in the second edge part at different positions in a direction orthogonal to the thickness of the plate-like shape.

(Appendix 36)

The lighting unit according to appendix 35, wherein the first incidence surface and the second reflecting surface are arranged to be adjacent to each other, and the second incidence surface and the first reflecting surface are arranged to be adjacent to each other.

(Appendix 37)

The lighting unit according to appendix 35 or 36, wherein the first reflecting surface is arranged to oppose the first incidence surface, and the second reflecting surface is arranged to oppose the second incidence surface.

(Appendix 38)

The lighting unit according to any one of appendixes 35 to 37, comprising a third light source to emit third light, wherein the third light source makes the third light enter through at least one of a region on a back surface side facing the third emission region formed in the first edge part and a region on the back surface side facing the second emission region formed in the second edge part.

(Appendix 39)

The lighting unit according to appendix 38, wherein the third light is emitted after passing through the first edge part or the second edge part where the third light source made the third light enter.

(Appendix 40)

The lighting unit according to appendix 38 or 39, wherein the third light is emitted from the third emission region in the first edge part where the third light source made the third light enter or the second emission region in the second edge part where the third light source made the third light enter.

(Appendix 41)

The lighting unit according to any one of appendixes 38 to 40, wherein the third light source emits the third light of a plurality of different colors and changes ratio among light amounts of the third light of the different colors depending on a time of day.

(Appendix 42)

The lighting unit according to appendix 41, wherein the second light of the different colors includes light of white color, light of green color and light of orange color.

(Appendix 43)

The lighting unit according to appendix 42, wherein the light of white color includes light of fifth white color and light of sixth white color whose correlated color temperature is lower than that of the light of the fifth white color.

(Appendix 44)

The lighting unit according to any one of appendixes 21 to 34, wherein the first reflecting surface is situated on a side of the second emission region formed in the second edge part compared to the second incidence surface in the second edge part, and the second reflecting surface is situated on a side of the third emission region formed in the first edge part compared to the first incidence surface in the first edge part.

(Appendix 45)

The lighting unit according to appendix 44, comprising at least one of a first light guide part that is situated between the first reflecting surface and the diffusive part and guides the first light guided in the diffusive part without being scattered by the nanoparticles to the first reflecting surface and a second guide part that is situated between the second reflecting surface and the diffusive part and guides the second light guided in the diffusive part without being scattered by the nanoparticles to the second reflecting surface.

(Appendix 46)

The lighting unit according to appendix 45, wherein the first light guide part is included in the second edge part, and the second light guide part is included in the first edge part.

(Appendix 47)

The lighting unit according to appendix 45 or 46, comprising a fourth light source to emit fourth light, wherein the fourth light source is arranged at least on the second light source side with respect to the first light guide part or on the first light source side with respect to the second light guide part.

(Appendix 48)

The lighting unit according to appendix 47, wherein the first light guide part includes a fourth emission region on the same side in the second edge part as the side where the second emission region is formed for the first reflecting surface, the second light guide part includes a fifth emission region on the same side in the first edge part as the side where the third emission region is formed for the second reflecting surface, and the fourth light passes through the first light guide part provided with the fourth light source and is emitted from the fourth emission region, or passes through the second light guide part provided with the fourth light source and is emitted from the fifth emission region.

(Appendix 49)

The lighting unit according to appendix 47 or 48, wherein the fourth light source emits the fourth light of a plurality of different colors and changes ratio among light amounts of the fourth light of the different colors depending on a time of day.

(Appendix 50)

The lighting unit according to appendix 49, wherein the fourth light of the different colors includes light of white color, light of green color and light of orange color.

(Appendix 51)

The lighting unit according to appendix 50, wherein the light of white color includes light of seventh white color and light of eighth white color whose correlated color temperature is lower than that of the light of the seventh white color.

(Appendix 52)

A lighting fixture comprising:

the lighting unit according to any one of appendixes 1 to 51; and a light absorber that absorbs light, where the light absorber is arranged on a side opposite to the first emission region with respect to the diffusive body.

(Appendix 53)

The lighting fixture according to appendix 52, comprising a fifth light source provided between the diffusive body and the light absorber, wherein the fifth light source emits fifth light towards the diffusive body.

(Appendix 54)

The lighting fixture according to appendix 53, wherein the fifth light source emits the fifth light of a plurality of different colors and changes ratio among light amounts of the fifth light of the different colors depending on a time of day.

(Appendix 55)
The lighting fixture according to appendix 54, wherein the fifth light of the different colors includes light of white color, light of green color and light of orange color.

(Appendix 56)
The lighting fixture according to appendix 55, wherein the light of white color includes light of ninth white color and light of tenth white color whose correlated color temperature is lower than that of the light of the ninth white color.

(Appendix 57)
A lighting fixture comprising:
the lighting unit according to any one of appendixes 1 to 51; and
a light reflector that reflects light,
wherein the light reflector is arranged on a side opposite to the first emission region with respect to the diffusive body.

(Appendix 58)
The lighting fixture according to appendix 57, wherein the light reflector diffusively reflects light.

(Appendix 59)
A lighting fixture comprising:
the lighting unit according to any one of appendixes 1 to 20; and
a first light scatterer that lets through and scatters the first reflected light.

(Appendix 60)
The lighting fixture according to appendix 59, wherein the first light scatterer is arranged to cover the second emission region.

(Appendix 61)
The lighting fixture according to appendix 59 or 60, wherein the first light scatterer includes a lenticular lens having curvature in a direction in which the first light is guided in the diffusive body.

(Appendix 62)
The lighting fixture according to any one of appendixes 59 to 61, comprising a sixth light source that is arranged on the second emission region side with respect to the diffusive body and emits sixth light, wherein
the sixth light source emits the sixth light towards the first light scatterer, and
the sixth light passes through the first light scatterer.

(Appendix 63)
The lighting fixture according to appendix 62, wherein the sixth light source emits the sixth light of a plurality of different colors and changes ratio among light amounts of the sixth light of the different colors depending on a time of day.

(Appendix 64)
The lighting fixture according to appendix 63, wherein the sixth light of the different colors includes light of white color, light of green color and light of orange color.

(Appendix 65)
The lighting fixture according to appendix 64, wherein the light of white color includes light of eleventh white color and light of twelfth white color whose correlated color temperature is lower than that of the light of the eleventh white color.

(Appendix 66)
A lighting fixture comprising:
the lighting unit according to any one of appendixes 21 to 51; and
a second light scatterer that lets through and scatters the second reflected light.

(Appendix 67)
The lighting fixture according to appendix 66, wherein the second light scatterer is arranged to cover the third emission region.

(Appendix 68)
The lighting fixture according to appendix 66 or 67, wherein the second light scatterer includes a lenticular lens having curvature in a direction in which the second light is guided in the diffusive body.

(Appendix 69)
The lighting fixture according to any one of appendixes 66 to 68, comprising a seventh light source that is arranged on the third emission region side with respect to the diffusive body and emits seventh light, wherein
the seventh light source emits the seventh light towards the second light scatterer, and
the seventh light passes through the second light scatterer.

(Appendix 70)
The lighting fixture according to appendix 69, wherein the seventh light source emits the seventh light of a plurality of different colors and changes ratio among light amounts of the seventh light of the different colors depending on a time of day.

(Appendix 71)
The lighting fixture according to appendix 70, wherein the seventh light of the different colors includes light of white color, light of Green color and light of orange color.

(Appendix 72)
The lighting fixture according to appendix 71, wherein the light of white color includes light of thirteenth white color and light of fourteenth white color whose light emission amount is lower than that of the light of the thirteenth white color.

(Appendix 73)
A lighting fixture comprising:
the lighting unit according to any one of appendixes 38 to 43; and
a third light scatterer that lets through and scatters the third light.

(Appendix 74)
The lighting fixture according to appendix 73, wherein the third light scatterer includes a lenticular lens having curvature in a direction in which the first light is guided in the diffusive body.

(Appendix 75)
A lighting fixture comprising:
the lighting unit according to appendix 47 or 51; and
a fourth light scatterer that lets through and scatters the fourth light.

(Appendix 76)
The lighting fixture according to appendix 75, wherein the fourth light scatterer includes a lenticular lens having curvature in a direction in which the first light is guided in the diffusive body.

(Appendix 77)
A lighting fixture comprising a plurality of lighting units according to any one of appendixes 1 to 51, wherein the plurality of lighting units is arranged with the diffusive bodies overlaid on each other and with the first emission regions facing the same direction, and
the first scattered light emitted from the plurality of lighting units is emitted in superimposition with each other.

(Appendix 78)
A lighting fixture comprising a plurality of lighting units according to any one of appendixes 21 to 51, wherein
the plurality of lighting units is arranged with the diffusive bodies overlaid on each other and with the first emission regions facing the same direction, and the first scattered light and the second scattered light emitted from the plurality of lighting units are emitted in superimposition with each other.

(Appendix 79)

The lighting fixture according to appendix 77 or 78, wherein in a set of the lighting units overlaid on each other, the first light in each lighting unit is guided in a direction different from each other.

(Appendix (4))

A second light source in appendix (4) corresponds to the third light source appendix (3). Further, a third light source in appendix (4) corresponds to the second light source in appendix (3).

(Appendix 1)

A lighting unit comprising:

a first light source to emit first light from a first light emission surface; and a diffusive body including a first incidence surface that allows the first light to enter, a diffusive part that includes nanoparticles, guides the entered first light and makes the first light be scattered by the nanoparticles into first scattered light, and an emission surface that emits the first scattered light, wherein the first incidence surface is formed on a first edge part of the diffusive body, the first scattered light is emitted from a first region of the emission surface, and a correlated color temperature of the first scattered light is higher than a correlated color temperature of the first light.

(Appendix 2)

The lighting unit according to appendix 1, wherein the first region is formed in the diffusive part.

(Appendix 3)

The lighting unit according to appendix 1 or 2, wherein the first light is guided by means of total reflection.

(Appendix 4)

The lighting unit according to any one of appendixes 1 to 3, wherein the first light source emits the first light of a plurality of different colors and changes ratio among light amounts of the first light of the different colors depending on a time of day.

(Appendix 5)

The lighting unit according to appendix 4, wherein the first light of the different colors includes light of white color, light of green color and light of orange color.

(Appendix 6)

The lighting unit according to appendix 5, wherein the light of white color includes light of first white color and light of second white color whose correlated color temperature is lower than that of the light of the first white color.

(Appendix 7)

The lighting unit according to any one of appendixes 1 to 6, comprising a light condenser, for condensing the first light towards the first incidence surface, provided between the first light emission surface and the first incidence surface.

(Appendix 8)

The lighting unit according to appendix 7, wherein the light condenser is a light guide body that guides the first light.

(Appendix 9)

The lighting unit according to appendix 7, wherein the light, condenser is a lens.

(Appendix 10)

The lighting unit according to appendix 9, wherein the diffusive body is in a plate-like shape having two surfaces facing each other and connected to each other by a side face, the first incidence surface is formed on the side face, and the lens is a cylindrical lens having curvature in a thickness direction of the plate-like shape.

(Appendix 11)

The lighting unit according to any one of appendixes 1 to 10, wherein the diffusive body is in a plate-like shape having two surfaces facing each other and connected to each other by a side face.

(Appendix 12)

The lighting unit according to appendix 11, wherein the first edge part and the second edge part include the side face.

(Appendix 13)

The lighting unit according to appendix 11 or 12, wherein the first incidence surface is formed on the side face.

(Appendix 14)

The lighting unit according to any one of appendixes 11 to 13, wherein the first region is formed on one of the surfaces.

(Appendix 15)

The lighting snit according to appendix 14, wherein the other of the surfaces is a back surface.

(Appendix 16)

The lighting unit according to any one of appendixes 10 to 15, wherein a haze value in the thickness direction of the plate-like shape is larger than or equal to 0.005 and smaller than or equal to 30, the haze value being a value obtained by multiplying power of scattered light by 100 to obtain a product and dividing the product by power of whole transmitted light.

(Appendix 17)

The lighting unit according to any one of appendixes 10 to 16, comprising a second light source to emit second light, wherein the emission surface includes a second region and a third region that are different from the first region, the second region is formed in a second edge part where the first light guided in the diffusive part without being scattered by the nanoparticles reaches, the third region is formed in the first edge part, and the second light source makes the second light enter through at least one of a region on a back surface side facing the second region and a region on the back surface side facing the third region.

(Appendix 18)

The lighting unit according to appendix 17, wherein the second light is emitted after passing through the first edge part or the second edge part where the second light source made the second light enter.

(Appendix 19)

The lighting unit according to appendix 17 or 18, wherein the second light is emitted from the third region in the first edge part where the second light source made the second light enter or the second region in the second edge part where the second light source made the second light enter.

(Appendix 20)

The lighting unit according to any one of appendixes 17 to 19, wherein the second light source emits the second light of a plurality of different colors and changes ratio among light amounts of the second light of the different colors depending on a time of day.

(Appendix 21)

The lighting unit according to appendix 20, wherein the second light of the different colors includes light of white color, light of green color and light of orange color.

(Appendix 22)

The lighting unit according to appendix 21, wherein the light of white color includes light of third white color and light of fourth white color whose correlated color temperature is lower than that of the light of the third white color.

(Appendix 23)

The lighting unit according to any one of appendixes 17 to 22, comprising a first light scattering part, for letting through and scattering the second light, on at least one of the second region and the third region.

(Appendix 24)

The lighting unit according to appendix 23, wherein the first light scattering part includes a lenticular lens having curvature in a direction in which the first light is Guided in the diffusive body.

(Appendix 25)

The lighting unit according to any one of appendixes 1 to 16, comprising a third light source to emit third light from a third light emission surface, wherein the diffusive body includes a second incidence surface that allows the third light to enter, the second incidence surface is formed on a second edge part where the first light guided without being scattered by the nanoparticles reaches, the diffusive part guides the entered third irons and makes the third light be scattered by the nanoparticles into second scattered light, the second scattered light is emitted from the first region, and a correlated color temperature of the second scattered light is higher than a correlated color temperature of the third light.

(Appendix 26)

The lighting unit according to appendix 25, wherein the third light is guided by means of total reflection.

(Appendix 27)

The lighting unit according to appendix 25 or 26, wherein the third light source emits the third light of a plurality of different colors and changes ratio among light amounts of the third light of the different colors depending on a time of day.

(Appendix 28)

The lighting unit according to appendix 27, wherein the third light of the different colors includes light of white color, light of green color and light of orange color.

(Appendix 29)

The lighting unit according to appendix 28, wherein the light of white color includes light of fifth white color and light of sixth white color whose correlated color temperature is lower than that of the light of the fifth white color.

(Appendix 30)

The lighting unit according to any one of appendixes 25 to 29, comprising a light condenser, for condensing the third light towards the second incidence surface, provided between the second light emission surface and the second incidence surface.

(Appendix 31)

The lighting unit according to appendix 30, wherein the light condenser is a light guide body that guides the third light.

(Appendix 32)

The lighting unit according to appendix 30, wherein the light condenser is a lens.

(Appendix 33)

The lighting unit according to appendix 32, wherein the diffusive body is in a plate-like shape having two surfaces facing each other and connected to each other by a side face, the second incidence surface is formed on the side face, and the lens is a cylindrical lens having curvature in a thickness direction of the plate-like shape.

(Appendix 34)

The lighting unit according to any one of appendixes 25 to 33, wherein the diffusive body is in a plate-like shape having two surfaces facing each other and connected to each other by a side face, the first incidence surface is formed on the side face, and the second incidence surface is formed on a part of the side face different from the first incidence surface.

(Appendix 35)

The lighting unit according to any one of appendixes 25 to 34, comprising a fourth light source to emit fourth light, wherein the emission surface includes a second region and a third region that are different from the first region, the second region is formed in the first edge part, the third region is formed in the second edge part, and the fourth light source makes the fourth light enter through at least one of a region on a back surface side facing the second region and a region on the back surface side facing the third region.

(Appendix 36)

The lighting unit according to appendix 35, wherein the fourth light is emitted after passing through the first edge part or the second edge part where the fourth light source made the fourth light enter.

(Appendix 37)

The lighting unit according to appendix 35 or 36, wherein the fourth light is emitted from the third region in the first edge part where the fourth light source made the fourth light enter or the second region in the second edge part where the fourth light source made the fourth light enter.

(Appendix 38)

The lighting unit according to any one of appendixes 35 to 37, wherein the fourth light source emits the fourth light of a plurality of different colors and changes ratio among light amounts of the fourth light of the different colors depending on a time of day.

(Appendix 39)

The lighting unit according to appendix 38, wherein the fourth light of the different colors includes light of white color, light of green color and light of orange color.

(Appendix 40)

The lighting unit according to appendix 39, wherein the light of white color includes light of seventh white color and light of eighth white color whose correlated color temperature is lower than that of the light of the seventh white color.

(Appendix 41)

The lighting unit according to any one of appendixes 35 to 40, comprising a second light scattering part, for letting through and scattering the fourth light, on at least one of the second region and the third region.

(Appendix 42)

The lighting unit according to appendix 41, wherein the second light scattering part includes a lenticular lens having curvature in a direction in which the first light is guided in the diffusive body.

(Appendix 43)

A lighting fixture comprising:

the lighting unit according to any one of appendixes 1 to 42; and a light absorber that absorbs light, wherein the light absorber is arranged on a side opposite to the first region with respect to the diffusive body.

(Appendix 44)

The lighting fixture according to appendix 43, comprising a fifth light source provided between the diffusive body and the light absorber, wherein the fifth light source emits fifth light towards the diffusive body.

(Appendix 45)

The lighting fixture according to appendix 44, wherein the fifth light source emits the fifth light of a plurality of different colors and changes ratio among light amounts of the fifth light of the different colors depending on a time of day.

(Appendix 46)

The lighting fixture according to appendix 45, wherein the fifth light of the different colors includes light of white color, light of green color and light of orange color.

(Appendix 47)

The lighting fixture according to appendix 46, wherein the light of white color includes light of ninth white color and light of tenth white color whose correlated color temperature is lower than that of the light of the ninth white color.

(Appendix 48)

A lighting fixture comprising:

the lighting unit according to any one of appendixes 1 to 42; and a light reflector that reflects light, wherein the light reflector is arranged on a side opposite to the first region with respect to the diffusive body.

(Appendix 49)

The lighting fixture according to appendix 48, wherein the light reflector diffusively reflects light.

(Appendix 50)

A lighting fixture comprising:

the lighting according to any one of appendixes 17 to 24; and a first light scatterer that lets through and scatters the second light.

(Appendix 51)

The lighting fixture according to appendix 50, wherein the first light scatterer is arranged to cover at least one of the second region and the third region.

(Appendix 52)

The lighting fixture according to appendix 50 or the first light scatterer includes a lenticular lens having curvature in a direction in which the first light is guided in the diffusive body.

(Appendix 53)

The lighting fixture according to any one of appendixes 50 to 52, comprising a sixth light source that is arranged on a side where the first Light scatterer is arranged with respect to the diffusive body, and specifically, on at least one of the first edge part side and the second edge part side with respect to the diffusive body, and emits sixth light, wherein the sixth light source emits the sixth light towards the first light scatterer, and the sixth light passes through the first light scatterer.

(Appendix 54)

The lighting fixture according to appendix 53, wherein the sixth light source emits the sixth light of a plurality of different colors and changes ratio among light amounts of the sixth light of the different colors depending on a time of day.

(Appendix 55)

The lighting fixture according to appendix 54, wherein the sixth light of the different colors includes light of white color, light of green color and light of orange color.

(Appendix 56)

The lighting fixture according to appendix 55, wherein the light of white color includes light of eleventh white color and light of twelfth white color whose correlated color temperature is lower than that of the light of the eleventh white color.

(Appendix 57)

A lighting fixture comprising:

the lighting unit according to any one of appendixes 35 to 42; and a second light scatterer that lets through and scatters the fourth light.

(Appendix 58)

The lighting fixture according to appendix 57, wherein the second light scatterer is arranged to cover at least one of the second region and the third region.

(Appendix 59)

The lighting fixture according to appendix 57 or 58, wherein the second light scatterer includes a lenticular lens having curvature in a direction in which the first light is guided in the diffusive body.

(Appendix 60)

The lighting fixture according to any one of appendixes 57 to 59, comprising a seventh light source that is arranged on a side where the second light scatterer is arranged with respect to the diffusive body, and specifically, on at least one of the first edge part side and the second edge part side with respect to the diffusive body, and emits seventh light, wherein the seventh light source emits the seventh light towards the second light scatterer, and the seventh light passes through the second light scatterer.

(Appendix 61)

The lighting fixture according appendix 60, wherein the seventh light source emits the seventh light of a plurality of different colors and changes ratio among light amounts of the seventh light of the different colors depending on a time of day.

(Appendix 62)

The lighting fixture according to appendix 61, wherein the seventh light of the different colors includes light of white color, light of green color and light of orange color.

(Appendix 63)

The lighting fixture according to appendix 62, wherein the light of white color includes light of thirteenth white color and light of fourteenth white color whose correlated color temperature is lower than that of the light of the thirteenth white color.

(Appendix 64)

A lighting fixture comprising:

the lighting unit according to any one of appendixes 1 to 16 and 25 to 34;

an eighth light source to emit eighth light; and a third light scatterer that lets through and scatters the eighth light, wherein the third light scatterer is arranged on the emission surface side, and specifically, on at least one of the first edge part side and the second edge part side, with respect to the diffusive body, the eighth light source is arranged between the diffusive body and the third light scatterer and emits the eighth light towards the third light scatterer, and the eighth light passes through the third light scatterer.

(Appendix 65)

The lighting fixture according to appendix 64, wherein the third light scatterer is arranged to cover at least one of the second region and the third region.

(Appendix 66)

The lighting fixture according to appendix 64 or 65, wherein the third light scatterer includes a lenticular lens having curvature in a direction in which the first light is guided in the diffusive body.

(Appendix 67)

A lighting fixture comprising a plurality of lighting units according to any one of appendixes 1 to 42, wherein the plurality of lighting units is arranged with the diffusive bodies overlaid on each other and with the first regions facing the same direction, and the first scattered light emitted from the plurality of lighting units is emitted in superimposition with each other.

(Appendix 68)

A lighting fixture comprising a plurality of lighting units according to any one of appendixes 25 to 42, wherein the plurality of lighting units is arranged with the diffusive bodies overlaid on each other and with the first regions facing the same direction, and the first scattered light and the second scattered light emitted from the plurality of lighting units are emitted in superimposition with each other.

(Appendix 69)

The lighting fixture according to appendix 64 or 65, wherein the first light in each of the lighting units overlaid on each other as a set is guided in a direction different from each other.

DESCRIPTION OF REFERENCE CHARACTERS 100, 110, 120, 130, 140, 150, 160$a$, 160$b$, 160$c$, 170, 180: lighting unit, 200, 210, 220, 230, 240, 250, 260, 270, 280: lighting fixture, 10, 10$a$, 10$b$, 10$c$, 10$d$, 10$e$: light source, 20: LED element, 121: base material, 122: particle, 11: light emission surface, 12: diffusive body, 13, 13$a$, 13$b$: incidence surface, 135, 135$a$, 135$b$: entry part, 14: emission surface, 14$a$, 14$b$, 14$b$, 14$c$: region, 15: back surface, 16, 16$a$, 16$b$: reflecting surface, 17: light absorber, 18: light absorption surface, 23, 23$a$, 23$b$: edge part, 30, 30$a$, 30$b$: light guide part, 31, 31$a$, 31$b$: region, 40, 41: light scatterer, 40$a$, 40$b$, 41$a$, 41$b$: region, 50: light reflector, 51: reflecting surface, 60: light condenser, 61$a$, 61$b$: reflecting surface, 62$a$, 62$b$, 63$a$, 63$b$: edge part, 64: light guide body, 65$a$, 65$b$: reflecting surface, 66: incidence surface, 67: emission surface, 70: lens, 71: incidence surface, 72: emission surface, 80: light scatterer, d: grain diameter, H: haze value, Li, Lia, Lib, Lic, Lid, Lie, Lt, Lta, Ltb: light, Ls, Lsa, Lsb, Lse: scattered light, Ll, Lla, Llb: reflected light (illuminating light), n: refractive index, $\alpha$: size parameter, $\sigma$: scattering cross section, $\lambda$: wavelength.

What is claimed is:

1. A lighting unit comprising:
   a first light source to emit first light; and
   a diffusive body including a first incidence surface that allows the first light to enter, a diffusive part that includes nanoparticles, guides the entered first light and makes the first light be scattered by the nanoparticles into first scattered light, and an emission surface that emits the first scattered light, wherein the first incidence surface is formed on a first edge part of the diffusive body, the first scattered light is emitted from a first region of the emission surface, and a correlated color temperature of the first scattered light is higher than a correlated color temperature of the first light.

2. The lighting unit according to claim 1, wherein
the diffusive body includes a first reflecting surface that reflects the first light guided in the diffusive part without being scattered by the nanoparticles into first reflected light, the first reflecting surface is formed in a second edge part where the first light guided in the diffusive part without being scattered by the nanoparticles reaches, and the first reflected light is emitted from a second region.

3. The lighting unit according to claim 2, wherein the correlated color temperature of the first reflected light is lower than a correlated color temperature of the first light.

4. The lighting unit according to claim 2, wherein the first reflected light is emitted from the second region different from the first region.

5. The lighting unit according to claim 2, wherein the diffusive body includes the second region formed on a same surface side as a surface side where the first region is formed.

6. The lighting unit according to claim 2, wherein the first region is formed in the diffusive part, and the second region is formed in the second edge part.

7. The lighting unit according to claim 1, wherein a haze value in a thickness direction of the diffusive body is larger than or equal to 0.005 and smaller than or equal to 30, the haze value being a value obtained by multiplying power of scattered light by 100 to obtain a product and dividing the product by power of whole transmitted light.

8. The lighting unit according to claim 1, wherein the diffusive body is in the form of a plate having two surfaces facing each other and connected to each other by a side face.

9. The lighting unit according to claim 1, comprising a second light source to emit second light, wherein the diffusive body includes a second incidence surface that is formed on a second edge part and allows the second light to enter, the diffusive part guides the entered second light and makes the second light be scattered by the nanoparticles into second scattered light, the second scattered light is emitted from the first region, and a correlated color temperature of the second scattered light is higher than a correlated color temperature of the second light.

10. The lighting unit according to claim 9, wherein the diffusive body includes a second reflecting surface that is formed in the first edge part and reflects the second light guided in the diffusive part without being scattered by the nanoparticles into second reflected light, the emission surface includes a third region, and the second reflected light is emitted from the third region.

11. The lighting unit according to claim 10, wherein the third region is formed in the first edge part.

12. The lighting unit according to claim 10, wherein
the first incidence surface and the second reflecting surface are arranged in the first edge part at different positions in a direction orthogonal to a thickness of the diffusive body, and
the second incidence surface and the first reflecting surface are arranged in the second edge part at different positions in the direction orthogonal to the thickness of the diffusive body.

13. The lighting unit according to claim 1, comprising a third light source to emit third light, wherein
a second edge part represents a part of the diffusive body where the first light guided in the diffusive part without being scattered by the nanoparticles reaches, and
the third light source makes the third light enter the diffusive body through at least one of a first region on a back surface side of the second edge part and a second region of the first edge part.

14. The lighting unit according to claim 1, wherein
light emission color of the first light source is changed dynamically.

15. The lighting unit according to claim 14, wherein
the first light source emits the first light in a plurality of different colors, and a ratio among light amounts of the first light of the different colors depending on time of day is changed.

16. A lighting fixture comprising:
the lighting unit according to claim 1; and
a light scatterer that is arranged on a light emission side with respect to the diffusive body, and lets through and scatters light.

17. A lighting fixture comprising:
the lighting unit according to claim 13; and
a light scatterer that is arranged on a light emission side with respect to the diffusive body, and lets through and scatters light, wherein
the light scatterer lets through and scatters the third light that passed through at least one of the first edge part and the second edge part where the third light entered.

18. A lighting fixture comprising:
the lighting unit according to claim 1; and
a light scatterer that is arranged on a light emission side with respect to the diffusive body, and lets through and scatters light; and
a fourth light source to emit fourth light, wherein
a second edge part represents a part of the diffusive body where the first light guided in the diffusive part without being scattered by the nanoparticles reaches,
the light scatterer is arranged on an emission surface side and on at least one of a first edge part side and a second edge part side, with respect to the diffusive body, and
the fourth light source is arranged between the diffusive body and the light scatterer.

19. The lighting fixture according to claim 16, comprising:
a fifth light source to emit fifth light towards a back surface of the diffusive body.

20. A lighting unit comprising:
a first light source to emit first light; and
a diffusive body including a first incidence surface that allows the first light to enter, a diffusive part that includes nanoparticles, guides the entered first light and makes the first light be scattered by the nanoparticles into first scattered light, and a first reflecting surface that reflects the first light guided in the diffusive part without being scattered by the nanoparticles into first reflected light, wherein
the first incidence surface is formed on a first edge part of the diffusive body,
the first reflecting surface is formed in a second edge part where the first light guided in the diffusive part without being scattered by the nanoparticles reaches,
the first scattered light is emitted from a first region,
the first reflected light is emitted from a second region different from the first region, and
a correlated color temperature of the first scattered light is higher than a correlated color temperature of the first light.

* * * * *